US010865032B2

(12) United States Patent
Leser et al.

(10) Patent No.: US 10,865,032 B2
(45) Date of Patent: *Dec. 15, 2020

(54) INSULATED CONTAINER

(71) Applicant: Berry Plastics Corporation, Evansville, IN (US)

(72) Inventors: Chris K. Leser, Mahomet, IL (US); Philip A. Driskill, Newburgh, IN (US); Charles T. Wallace, Evansville, IN (US); John B. Euler, Evansville, IN (US); Jason J. Paladino, Newburgh, IN (US); Milan C. Maravich, Newburgh, IN (US); Daniel O. Davis, Cynthiana, IN (US); Jeffrey A. Mann, Evansville, IN (US); Randy A. Bowlds, Evansville, IN (US)

(73) Assignee: Berry Plactics Corporation, Evansville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/651,284

(22) Filed: Jul. 17, 2017

(65) Prior Publication Data
US 2017/0313493 A1  Nov. 2, 2017

Related U.S. Application Data

(63) Continuation of application No. 13/491,007, filed on Jun. 7, 2012, now Pat. No. 9,758,292.

(Continued)

(51) Int. Cl.
*A47J 41/00* (2006.01)
*B65D 3/14* (2006.01)
(Continued)

(52) U.S. Cl.
CPC .......... *B65D 81/3874* (2013.01); *B29C 65/02* (2013.01); *B29C 66/1122* (2013.01);
(Continued)

(58) Field of Classification Search
CPC ............. A47J 41/0055; A47G 19/2288; B65D 81/3867; B65D 81/3874; B65D 3/14;
(Continued)

(56) References Cited

U.S. PATENT DOCUMENTS 3,182,882 A    5/1965  Aellen
5,669,553 A    9/1997  Smith
(Continued)

FOREIGN PATENT DOCUMENTS

BE    898053    4/1984
CA    2078123   9/1991
(Continued)

OTHER PUBLICATIONS

Australian Notice of Acceptance for Australian App. No. 2016204692 dated Apr. 3, 2018, 3 pages.
(Continued)

*Primary Examiner* — Shawn M Braden
*Assistant Examiner* — Niki M Eloshway
(74) *Attorney, Agent, or Firm* — Barnes & Thornburg LLP

(57)  ABSTRACT

A container is formed to include an interior region and a mouth opening into the interior region. The container includes a floor and a side wall coupled to the floor to define the interior region between the floor and the side wall.

17 Claims, 32 Drawing Sheets

Related U.S. Application Data

(60) Provisional application No. 61/618,587, filed on Mar. 30, 2012, provisional application No. 61/498,455, filed on Jun. 17, 2011.

(51) Int. Cl.

| | | |
|---|---|---|
| *B65D 81/38* | (2006.01) | |
| *B31F 1/00* | (2006.01) | |
| *B29C 65/00* | (2006.01) | |
| *B29C 65/02* | (2006.01) | |
| *B65D 3/06* | (2006.01) | |
| *B31B 105/00* | (2017.01) | |
| *B31B 110/10* | (2017.01) | |
| *B31B 110/20* | (2017.01) | |
| *B29L 31/00* | (2006.01) | |

(52) U.S. Cl.
CPC .... *B29C 66/1282* (2013.01); *B29C 66/12881* (2013.01); *B29C 66/14* (2013.01); *B29C 66/4322* (2013.01); *B29C 66/727* (2013.01); *B29C 66/73132* (2013.01); *B31F 1/0038* (2013.01); *B65D 3/14* (2013.01); *B29C 66/341* (2013.01); *B29C 66/71* (2013.01); *B29C 66/723* (2013.01); *B29C 66/73713* (2013.01); *B29L 2031/7132* (2013.01); *B31B 2105/00* (2017.08); *B31B 2105/0022* (2017.08); *B31B 2110/10* (2017.08); *B31B 2110/20* (2017.08)

(58) Field of Classification Search
CPC ................. B65D 3/0038; B31F 1/0038; B31B 2217/062; B31B 2217/064; B31B 2217/082; B29L 2031/7132; B29C 66/1122; B29C 66/1282; B29C 66/12881; B29C 66/14; B29C 66/341; B29C 66/4322; B29C 66/71; B29C 66/723; B29C 66/727; B29C 65/02; B29C 66/73713
USPC .......... 220/592.17, 592.16, 592.25, 670, 612
See application file for complete search history.

(56) References Cited

U.S. PATENT DOCUMENTS

| | | | | |
|---|---|---|---|---|
| 6,010,062 | A * | 1/2000 | Shimono | B29C 57/125 229/4.5 |
| 6,417,240 | B1 | 7/2002 | Park | |
| 7,759,404 | B2 | 7/2010 | Burgun | |
| 7,818,866 | B2 * | 10/2010 | Hollis | B29C 63/06 156/212 |
| 8,444,905 | B2 | 5/2013 | Li | |
| 9,102,461 | B2 | 8/2015 | Leser | |
| 9,758,292 | B2 * | 9/2017 | Leser | B65D 3/14 |
| 9,758,293 | B2 | 9/2017 | Leser | |
| 9,993,098 | B2 * | 6/2018 | Leser | A47G 19/2288 |
| 2001/0039299 | A1 | 11/2001 | Park | |
| 2002/0035164 | A1 | 3/2002 | Wu | |
| 2003/0069362 | A1 | 4/2003 | Ramanathan | |
| 2004/0162363 | A1 | 8/2004 | Yamamoto | |
| 2008/0044617 | A1 | 2/2008 | Schmitz | |
| 2008/0187694 | A1 * | 8/2008 | Alvarez | B32B 7/12 428/34.3 |
| 2008/0302800 | A1 | 12/2008 | Chou | |
| 2009/0041965 | A1 | 2/2009 | Kochem | |
| 2010/0112247 | A1 * | 5/2010 | Rasanen et al. | D21H 17/00 428/34.2 |
| 2010/0215934 | A1 | 8/2010 | Fabian Mariezkurrena | |
| 2013/0052358 | A1 | 2/2013 | Alessandro | |
| 2014/0262916 | A1 * | 9/2014 | Minnette | B65D 1/0215 206/524.2 |
| 2015/0051302 | A1 * | 2/2015 | Leser | C08J 9/08 521/91 |
| 2016/0082693 | A1 | 3/2016 | Li | |
| 2019/0045954 | A1 | 2/2019 | Euler | |

FOREIGN PATENT DOCUMENTS

| | | | |
|---|---|---|---|
| CA | 2291607 | A1 | 6/2000 |
| CN | 1118239 | A | 3/1996 |
| CN | 1523051 | | 8/2004 |
| CN | 101044195 | | 9/2007 |
| CN | 101104716 | | 1/2008 |
| CN | 101352923 | | 1/2009 |
| CN | 101370873 | | 2/2009 |
| CN | 101531260 | | 9/2009 |
| CN | 101560307 | | 10/2009 |
| CN | 201347706 | Y | 11/2009 |
| CN | 102030960 | | 4/2011 |
| CN | 102115561 | A | 7/2011 |
| CN | 102245368 | | 11/2011 |
| CN | 102762350 | | 10/2012 |
| DE | 102008031812 | | 12/2009 |
| EP | 0086869 | A1 | 8/1983 |
| EP | 0318167 | A2 | 5/1989 |
| EP | 879844 | | 11/1998 |
| EP | 1704047 | | 9/2006 |
| EP | 1939099 | A1 | 7/2008 |
| GB | 2322100 | | 8/1998 |
| GB | 2485077 | | 5/2012 |
| GB | 2485077 | A | 5/2012 |
| GB | 2504166 | A * | 1/2014 ............... B65D 3/22 |
| GB | 2506796 | | 4/2014 |
| JP | S5641146 | A | 4/1981 |
| JP | H02129040 | U | 5/1990 |
| JP | H02269683 | | 11/1990 |
| JP | H0543967 | | 6/1993 |
| JP | H06322167 | A | 11/1994 |
| JP | H08067758 | | 3/1996 |
| JP | 2000128255 | | 5/2000 |
| JP | 2001315277 | | 11/2001 |
| JP | 2001329099 | A | 11/2001 |
| JP | 2001348454 | A | 12/2001 |
| JP | 2003321566 | | 11/2003 |
| JP | 200418101 | | 1/2004 |
| JP | 2004067820 | A | 3/2004 |
| JP | 2004330464 | | 11/2004 |
| JP | 2005138508 | A | 6/2005 |
| JP | 2005272542 | | 10/2005 |
| JP | 2006142008 | A | 6/2006 |
| JP | 200791323 | | 4/2007 |
| JP | 2007154172 | | 6/2007 |
| JP | 2008162700 | | 7/2008 |
| JP | 2009126922 | | 6/2009 |
| JP | 2010173258 | | 8/2010 |
| JP | 2011104890 | | 6/2011 |
| JP | 2011132420 | A | 7/2011 |
| JP | 2011207958 | A | 10/2011 |
| JP | 2011212968 | A | 10/2011 |
| MX | 2004008491 | A | 7/2005 |
| MX | 347519 | | 4/2014 |
| RU | 2232781 | C2 | 7/2004 |
| RU | 2254347 | C2 | 6/2005 |
| TW | 393427 | | 6/2000 |
| TW | 200404848 | | 4/2004 |
| TW | M362648 | | 8/2009 |
| TW | 201021747 | | 6/2010 |
| TW | 201021747 | A | 6/2010 |
| TW | 201309757 | | 3/2013 |
| WO | 1991013933 | | 9/1991 |
| WO | 1994013460 | A1 | 6/1994 |
| WO | 2005097878 | | 10/2005 |
| WO | 2007003523 | | 1/2007 |
| WO | 2007003523 | A1 | 1/2007 |
| WO | 2007090845 | A2 | 8/2007 |
| WO | 2008145267 | | 12/2008 |
| WO | 2011036272 | | 3/2011 |
| WO | 2011038081 | A1 | 3/2011 |
| WO | 2011144705 | | 11/2011 |

(56) References Cited

FOREIGN PATENT DOCUMENTS

| WO | 2012020106 A1 | 2/2012 |
|---|---|---|
| WO | 2012025584 A1 | 3/2012 |
| WO | 2014066761 | 5/2014 |

OTHER PUBLICATIONS

First Substantive Examiantion Report for European App. No. 14775300.8 dated Apr 6, 2018, 4 pages.

Taiwan Office Action for Taiwan App. No. 101121655 dated Apr. 25, 6 pages, (no English translation available).

Office Action dated Jun. 6, 2018 for U.S. Appl. No. 15/388,319 (pp. 1-19).

Notice of Opposition for EP2751194 submitted May 28, 2018, 11 pages.

Grounds of Opposition for EP2751194 submitted May 28, 2018, 40 pages.

Pasquini, Nello, "Polypropylene Handbook," Carl Hanser Verlag, 2005, 7 pages.

Himont, Pro-fay PF814 brochure, 1992, 1 page.

Maier et al., "Polypropylene: The Definitive User's Guide and Databook" Plastics Design Library, 1998, 19 pages.

Gachter et al., "Taschenbuch der Kunststoff-Additive" Carl Hanser Verlag, 1983, 17 pages, (no English translation available).

Wypych, "Handbook of Antiblocking, Release, and Slip Additives" ChemTec Publishing, 2011, 10 pages.

Zweifel, Hans, "Plastics Additives Handbook" Carl Hanser Verlag, 2001, 6 pages.

Wiesner et al. "The Right Chemical Foaming Agent for Your Application" The Sixth International Conference "Blowing Agents and Foaming Processes 2004", 11 pages.

Hydrocerol—Chemical Foaming and Nucleating Agents, 2007, 8 pages.

Montelll at K98—presentation of extrusion line, 1998, 2 pages.

Montell Polyolefins "PP meets foam in sheet—Pro-fax PF-814 paves the way to PP foam growth", available at least by May 28, 2018, 4 pages.

Glossary of Terms for the chemical Fabrics & Film Industry, available at least by May 28, 2018, 5 pages.

ASTM D 883-08, Standard Terminology Relating to Plastics, 2008, 15 pages.

ASTM D 1922-93, Standard Test Method for Propagation Tear Resistance of Plastic Film and Thin Sheeting by Pendulum Method, 1993, 5 pages.

ASTM D3763-02, Standard Test Method for High Speed Puncture Properties of Plastics Using Load and Displacement SEnsors, 2002, 10 pages.

Tolinski, "Additives for Polyolefins: Getting the Most Out of Polypropylene, Polyethylene, and TPO" Elsevier, 2009, 25 pages.

Borealis, DaployTM HMS Polypropylene for Foam Extrusion, 2007, 20 pages.

Borealis, DaployTM HMS Polypropylene for Foam Extrusion, 2010, 20 pages.

Documents from Inter Parte Review of U.S. Pat. No. 8,883,280, entered Jan. 26, 2016, 26 pages.

Clarian, Technical Product Information "Hydrocerol CF40E", 2004, 1 page.

Clariant, Technical Product Information "Hydrocerol CF20E", 2004, 6 pages.

Clariant, Data sheet Hydrocerol CT516, 2004, 5 pages.

Jan-Erik Wegner, Affidavit regarding Hydrocerol, available at least by May 28, 2018, 22 pages.

Borealis HC600TF, 2008, 3 pages.

Borealis HC205TF, 2007, 3 pages.

Isplen codes, available at least by May 28, 2018, 1 page.

Quimica Chemicals—Isplen Polypropylene Compounds, brochure Apr. 2010, 20 pages.

Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.

Tiemblo, P. et al., "The autoacceleration of polypropylene thermooxidation in reduced coordinates: effect of the oxidation temperature and of polyolefin structure" Polymer Degradation and Stability, vol. 72, No. 1, 2001, 8 pages.

Bezati, F. et al., "Addition of tracers into the polypropylene in view of automatic sorting of plastic wastes using X-ray fluorescence spectrometry" Waste Management, vol. 30, No. 4, May 2010, 6 pages.

Translation of CN101560307A, 19 pages.

Gotsis, A. D. et al., "The Effect of Long Chain Branching on the Processability of Polypropylene in Thermoforming" Polymer Engineering and Science, vol. 44, No. 5, May 2004, 10 pages.

"Product News" Daploy WB135HMS—High Melt Strength Polyproyplene for Foam Extrusion, 2004, 2 pages.

Naguib, Hani E. et al., "Effects of Blending of Branched and Linear Polypropylene Materials on the Foamability" Technical Papers of the Annual Technical Conference-Society of Plastics Engineers Incorporated, 2001, 8 pages.

Antunes, Marcelo et al., "Heat Transfer in Polypropylene-Based Foams Produced Using Different Foaming Processes" Advanced Engineering Materials, vol. 11, No. 1 0, May 2009, 7 pages.

R0hne Gunhild. Foaming of Soft Polyproyplene Blends. Conference Proceedings: Zlin Czech Republic, Aug. 16-18, 2000, 4 pages.

Mikell Knights, "Theres Plenty of Fizz in Foam Blow Molding" Plastics Technology, available from https:llwww.ptonline.com/articles/there%27s-plenty-of-fizz-in-foam-blow-molding, 1999, 4 pages.

Crodamide brochure Feb. 2000, 4 pages.

Tabatabaei, Seyed H. et al., "Rheological and thermal properties of blends of a long-chain branched polypropylene and different linear polypropylenes" Chemical Engineering Science, vol. 64, No. 22, 2009, 13 pages.

Stange, Jens et al., "Rheological properties and foaming behavior of polypropylenes with different molecular structures" Journal of Rheology, vol. 50, No. 6, 2006, 18 pages.

Clariant, Cesa Slip, Sep. 2000, 6 pages.

Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.

Office Action dated Jun. 22, 2018 for U.S. Appl. No. 15/004,263 (pp. 1-20).

Excerpts from Frank Kreith, Principles of Heat Transfer, 3rd ed., Intext Educational Publishers (1973).

Excerpts from James M. Gere, Mechanics of Materials, 5th ed., Brooks/Cole (2001).

Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.

Michel Biron, "Chapter 4—Detailed Accounts of Thermoplastic Resins," Thermoplastics and Thermoplastic Composites, Technical Information for Plastics Users, Elsevier Ltd. (2007), 217-714.

Excerpts from Cornelia Vasile, "Mechanical Properties and Parameters of Polyolefins", Handbook of Polyolefins, 2nd ed., Marcel Dekker, Inc. (2000).

Williams et al., "Thermal Connectivity of Plastic Foams", Polymer Engineering and Science, Apr. 1983, vol. 23, No. 6., 293-298.

Excerpts from M.G. McCrum et al., Principles of Polymer Engineering, 2nd ed., Oxford Science Publications (1997).

Excerpts from Robert H. Perry, Perry's Chemical Engineers Handbook, 7th ed., The McGraw-Hill Companies, Inc. (1997).

Martinez-Diez et al., "The Thermal Conductivity of a Polyethylene Foam Block Produced by a Compression Molding Process", Journal of Cellular Plastics, vol. 37 (2001), 21-42.

R. Coquard and D. Baillis, Journal of Heat Transfer, 2006, 128(6): 538-549.

A. R. Katritzky et al., "Correlation and Prediction of the Refractive Indices of Polymers by QSPR," J. Chem. Inf. Comput. Sci., 38 (1998), 1171-1176.

M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.

(56) References Cited

OTHER PUBLICATIONS

Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, dated Apr. 27, 2016, 5 pages.
Japanese Office Action for Japanese Patent Application No. 2014-528384, dated Mar. 1, 2016.
International Preliminary Report on Patentability dated Feb. 16, 2016, relating to International Application No. PCT/US2014/051508.
English Summary of Chinese Office Action for Application Serial No. 201380041896.1, dated Mar. 18, 2016, 7 pages.
Extended European Search Report for European Application No. 13827981.5-1708/2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, dated Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/462,073.
Notice of Acceptance dated Jun. 10, 2016 for Australian Application No. 2012302251.
Office Action dated Jul. 28, 2016 for U.S. Appl. No. 14/211,553.
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Extended European Search Report for European Application No. 13863308.6 dated Jul. 19, 2016, 8 pages.
Office Action dated Aug. 11, 2016 for U.S. Appl. No. 14/108,110.
Chinese Office Action dated Aug. 3, 2016 for Chinese Patent Application 201480007369.3, 13 pages.
Office Action dated Sep. 1, 2016 for U.S. Appl. No. 14/106,212.
Australian First Patent Examination Report for Application No. 2013359097 dated Aug. 26, 2016, 3 pages.
British Examination Report for GB Application No. GB1400762.9, dated Aug. 8, 2016, 2 pages.
Extended European Search Report for European Application No. 13863546.1 dated Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T dated Jul. 19, 2016, 7 pages
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dated Aug. 30, 2016, 6 pages.
Mexican Office Action for Mexican Application MX/a/2013/014993 dated Sep. 27 2016, 6 pages.
New Zealand Examination Report for New Zealanc Application No. 708463 dated Oct. 3, 2016, 3 pages.
New Zealand Examination Report for New Zealand Application No. 708552 dated Oct. 7, 2016, 4 pages.
New Zealand First Examination Report for New Zealand Application 708546 dated Sep. 26, 2016, 4 pages.
Russian Office Action for Russian Application No. 2014101298 dated Sep. 30, 2016, 6 pages.
European Examination Report for European App. No. 12727994.1 dated Sep. 23, 2016, 4 pages.
Chinese Office Action for Chinese App. No. 201380065089.3 dated Sep. 30, 2016, 12 pages.
European Search Report for European App. No. 13849152.7 dated Sep. 16, 2016, 3 pages.
Australian Patent Examination Report for Australian App. No. 2013334155 dated Oct. 24, 2016, 7 pages.
Taiwan Office Action for Taiwan Pat. App. No. 102146299 dated Oct. 21, 2016, 7 pages.
Third Party Observation filed in European Patent App. No. 12727994.1 dated Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 dated Oct. 12, 2016, 4 pages.
British Examination Report for GB App. No. 1400762.9 dated Oct. 12, 2016, 2 pages.
Chinese Office Action for Chinese Applicaiton 201380065781.6 dated Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3 dated Sep. 27, 2016, 9 pages.
Office Action dated Nov. 4, 2016 for U.S. Appl. No. 13/961,411.
Chinese Office Action for Chinese Application No. 201280051426.9 dated Nov. 1, 2016, 9 pages.

(56) References Cited

OTHER PUBLICATIONS

English Summary of Chinese Office Action for Application Serial No. 201380041896.1, dated Nov. 11, 2016, 11 pages.
Extended European Search Report for European App. No. 14775300.8 dated Oct. 24, 2016, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529 dated Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 dated Dec. 23, 2016, 5 pages.
Japanese Office Action for Japanese Patent App. 2014-516089 dated Dec. 20, 2016, 6 pages.
European Examination Report for European App. No. 12727994.1 dated Jan. 25, 2016, 4 pages.
Japanese Office Action for Japanese App. No. 2014-528384 dated Dec. 6, 2016, 15 pages.
Singapore Office Action and Written Opinion dated Feb. 6, 2017 for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 dated Jan. 30, 2017, 3 pages.
Chinese Rejection Decision for Chinese App. No. 201380065781.6 dated Jul. 12, 2018, 15 pages, (No English Translation available).
Indian Examination Report for Indian App. No. 3919/DELNP/2015, dated Aug. 21, 2018, 5 pages.
Markus Gahleitner et al., "Heterophasic Copolymers of Polypropylene: Development, Design, Principles, and Future Challenges," Journal of Applied Polymer Science, 2013, Wiley Periodicals, 10 pages.
Sadiqali Cheruthazhekatt et al., "Multidimensional Analysis of the Complex Composition of Impact Polypropylene Copolymers: Combination of TREF, SEC-FTIR-HPer DSC, and High Temperature 2D-LC," Macromolecules 2012, 45, 2025-2305, ACS Publications, American Chemcial Society, 10 pages.
English Summary of Chinese Rejection Decision for Chinese App. No. 201380065781.6 dated Jul. 12, 2018, 4 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546 dated Feb. 23, 2017, 2 pages.
Singapore Office Action and Written Opinion dated Dec. 13, 2016 and on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action dated Mar. 10, 2017 for Chinese Patent Application 201480007369.3, 11 pages.
New Zealand Examination Report for New Zealanc Application No. 708463 dated Mar. 16, 2017, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552 dated Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Chinese Office Action for Chinese App. No. 201380065089.3 dated Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426.9 dated May 15, 2017, 12 pages.
Chinese Office Action for Chinese App. No. 201380041896.1 dated May 22, 2017, 9 pages.
Taiwan Office Action for Taiwan App. No. 101121655 dated Jun. 14, 2017, 29 pages.
Australian Examiner's Report for Australian App. No. 2014244210 dated Jun. 16, 2017, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.
New Zealand Examination Report for New Zealand Application 708546 dated Jul. 11, 2017, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.
Chinese Office Action for Chinese Application No. 201380065127.5, dated Jul. 26, 2016, 11 pages.
Shutov, Fyodor, "Foamed Polymers. Cellular Structure and Properties", Springer Berlin Heidelberg Industrial Developments vol. 51, Jun. 2005, p. 176-182, 8 pages.
Taiwan Office Action for Taiwan App. No. 102146298 dated Oct. 26, 2016, 9 pages.
European Examination Report for European App. No. 13849152.7 dated Jan. 4, 2018, 3 pages.
"All you need to know about Polypropylene, Part 1," Creative Mechanisms. (Year: 2017), 6 pages.
Chinese Office Action for Chinese App. No. 201380065781.6 dated Nov. 28, 2017, 10 pages.
"Polypropylene, Impact Copolymer," Lyondell Basell. (Year: 2017).
Office Action dated Jan. 16, 2018 for U.S. Appl. No. 15/388,319 (pp. 1-13).
Office Action dated Jan. 19, 2018 for U.S. Appl. No. 15/004,263; (pp. 1-18).
Canadian Examiner's Report for Canadian App. No. 2845225 dated Feb. 6, 2018, 5 pages.
Taiwan Office Action for Taiwan App. No. 103128338 dated Feb. 21, 2018, 9 pages.
Japanese Office Action for Japanese Patent App. No. 2015-539838 dated Feb. 27, 2018, 10 pages.
Taiwan Office Action for Taiwan App. No. 102138786 dated Mar. 1, 2018, 20 pages.

(56) References Cited

OTHER PUBLICATIONS

Chinese Office Action dated Mar. 22, 2018 for Chinese Patent Application 201480007369.3, 5 pages.
Office Action dated Mar. 29, 2018 for U.S. Appl. No. 14/862,552, (pp. 1-10).
Extended European Search Report for European App. No. 14836418.5 dated Jan. 30, 2018, 4 pages.
Canadian office action for Canadian App. No. 2,842,325 dated Jan. 24, 2018, 4 pages.
Japanese Office Action for Japanese App. No. 2016-501945 dated Jan. 23, 2018.
Office Action dated Nov. 14, 2017 for U.S. Appl. No. 14/862,552; (pp. 1-14).
"All You Need to Know About Polypropylene, Part 1," Creative Mechanisms Blog. (Year: 2016).
Rejection Decions for Chinese Patent App. No. 201280051426.9 dated Nov. 14, 2017, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.
German Office Action for German App. No. 11 2012 002 042.1 dated Sep. 8, 2017, 20 pages.
Chinese Office Action dated Sep. 21, 2017 for Chinese Patent Application 201480007369.3, 4 pages.
Taiwan Office Action for Taiwan Pat. App. No. 101121656 dated Aug. 1, 2017, 16 pages.
Office Action dated Oct. 18, 2017 for U.S. Appl. No. 14/063,252; (pp. 1-17).
Chinese Office Action for Chinese Application No. 201380065127.5 dated Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 dated Oct. 19, 2017, 5 pages.
Extended European Search Report for European App. No. 17181231.6 dated Nov. 7, 2017, 5 pages.
Taiwan Office Action for Taiwan App. No. 102138786 dated Aug. 9, 2017, 25 pages.
Office Action dated Aug. 22, 2017 for U.S. Appl. No. 14/188,504; (pp. 1-9).
Australian Examination REport for Australian App. No. 2016204692 dated Aug. 15, 2017, 3 pages.
Office Action dated Dec. 6, 2018 for U.S. Appl. No. 15/388,319, (pp. 1-10).
Office Action dated Dec. 13, 2018 for U.S. Appl. No. 15/672,688, (pp. 1-13).
Office Action dated Jan. 14, 2019 for U.S. Appl. No. 15/004,263, (pp. 1-15).
Office Action dated Mar. 7, 2019 for U.S. Appl. No. 16/023,218, (pp. 1-5).
Canadian Examiner's Report for Canadian App. No. 2845225 dated Mar. 1, 2019, 3 pages.
First Examination Report for Indian Patent App. No. 110/DELNP/2014 dated Dec. 26, 2019, 8 pages.
Substantive Examination Report for European App. No. 17182869.2 dated Nov. 12, 2018, 5 pages.
Canadian office action for Canadian App. No. 2842325 dated Oct. 26, 2018, 4 pages.
Re-examination Notification for Chinese Patent App. No. 201280051426.9 dated Feb. 11, 2019, 19 pages.
Rogers, "All you Need to Know About Polypropylene, Part 1," Creative Mechanisms Blog. (Year: 2014), 6 pages.
Office Action dated Apr. 2, 2019 for U.S. Appl. No. 15/388,319, (pp. 1-17).
First Examination Report for Indian Patent App. No. 111/DELNP/2014 dated Apr. 22, 2019, 7 pages.
Office Action dated Apr. 30, 2019 for U.S. Appl. No. 15/004,263 (pp. 1-10).
Mexican Office Action for Mexican App. No. MX/a/2014/002373 dated Jul. 1, 2019, 7 pages.
ISO, "Plastics—Determination of drawing characteristics of thermoplastics in the molten state", ISO, First edition, Jun. 15, 2005, 22 pages.
Indian First Examination Report for Indian Application No. 8947/DELNP/2015 dated Jul. 2019, 7 pages.
Office Action dated Jul. 26, 2019 for U.S. Appl. No. 16/149,351, (pp. 1-6).
Indian First Examination Report for Indian Pat. App. No. 2179/DELNP/2014 dated May 24, 2019, 6 pages.
Examination Report for Indian Patent App. No. 5758/DELNP/2015 dated Aug. 28, 2019, 7 pages.
First Examination Report for Indian App. No. 5804/DELNP/2015, sent Aug. 5, 2019, 7 pages.
Lyondellbasell Technical Data Sheet for Pro-fax SC204 dated Mar. 17, 2016, 3 pages.
Examination Report for GB1405600.6 dated Oct. 15, 2019, 4 pages.
Second Re-examination Notification for Chinese Patent App. No. 201280051426.9 received on Oct. 8, 2019, 21 pages.
Office Action dated Oct. 18, 2019 for U.S. Appl. No. 16/546,723, (pp. 1-6).
Canadian Examiner's Report for Canadian App. No. 2845225 dated Nov. 18, 2019, 4 pages.
Canadian Examiner's Report and Examination Search Report for Canadian App. No. 2,889,280, dated Apr. 14, 2020, 5 pages.
Japanese Office Action for Japanese Patent App. No. 2019-045572 dated Jan. 14, 2020, 6 pages.
Canadian Examiner's Report for Canadian App. No. 2896256, dated Feb. 6, 2020, 4 pages.
Mexican Office Action for Mexican App. No. MX/a/2014/002373 dated Mar. 6, 2020, 10 pages.
First Examination Report for Indian App. No. 5756/DELNP/2015 dated Dec. 12, 2019, 5 pages.
Office Action dated Apr. 27, 2020 for U.S. Appl. No. 16/058,126, (pp. 1-12).
Korean Notice of Preliminary Rejection for Korean Pat. App. No. 10-2015-7021888 dated Apr. 21, 2020, 11 pages.
Office Action dated Jun. 23, 2020 for U.S. Appl. No. 16/058,131, (pp. 1-8).
Hearing Notice for Indian Application No. 8947/DELNP/2015 dated Jul. 23, 2020, 3 pages.
Notice to Attend Hearing for Indian Patent App. No. 2179/DELNP/2014 dated Aug. 17, 2020, 2 pages.
Mexican Office Action for Mexican Patent App. No. MX/a/2015005207 dated Jul. 22, 2020, 5 pages.
Notice of Appeal Decision for Japanese App. No. 2016-501945 sent Aug. 18, 2020, 15 pages.
Office Action dated Sep. 3, 2020 for U.S. Appl. No. 16/858,778 (pp. 1-10).
Office Action dated Sep. 30, 2020 for U.S. Appl. No. 16/058,126, (pp. 1-11).
Office Action dated Sep. 30, 2020 for U.S. Appl. No. 16/531,530, (pp. 1-10).

* cited by examiner

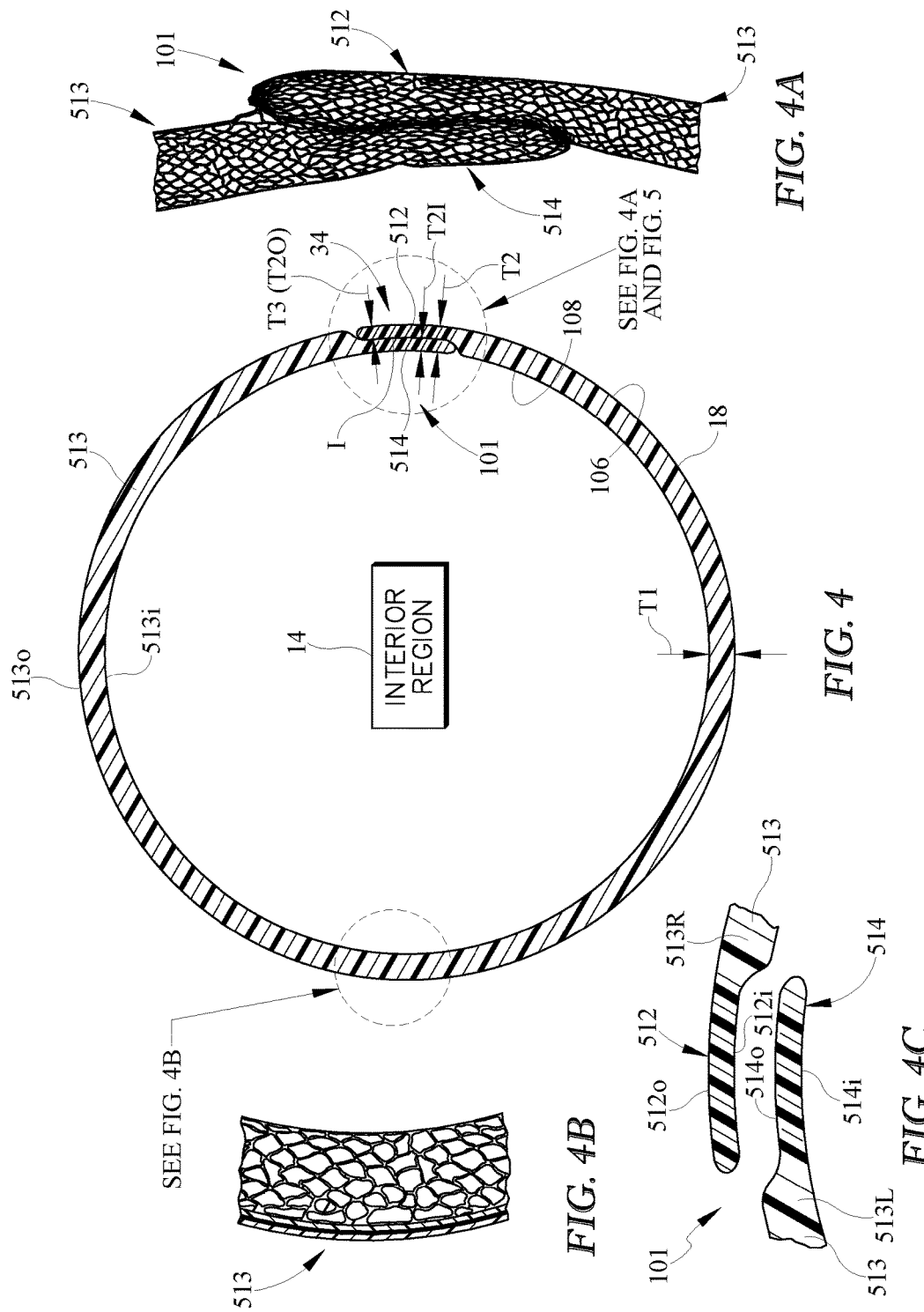

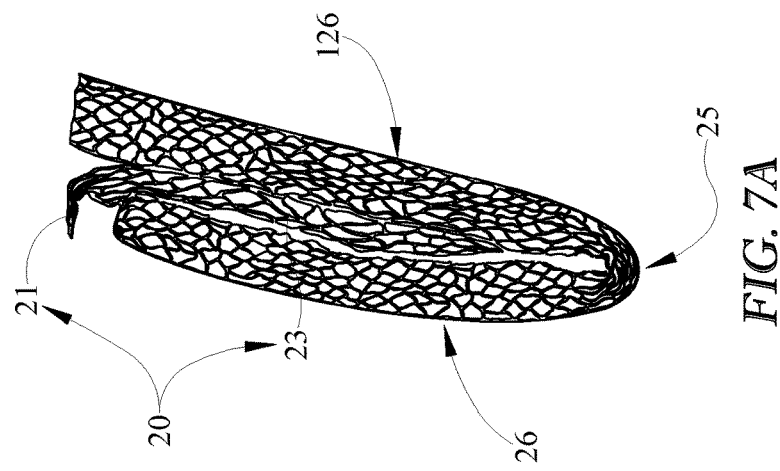
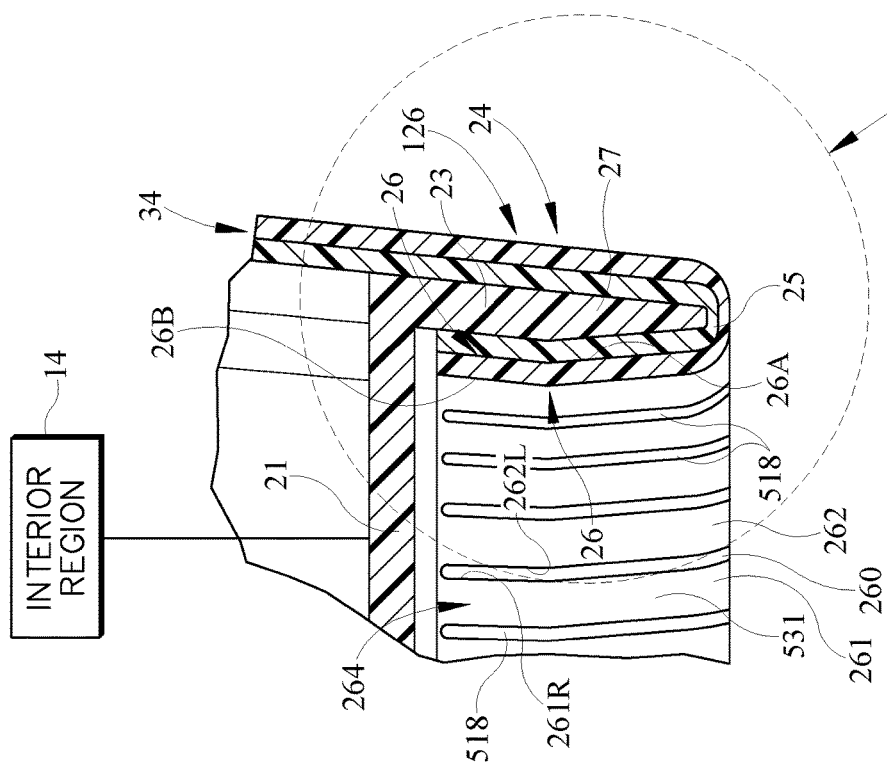
FIG. 7A
FIG. 7

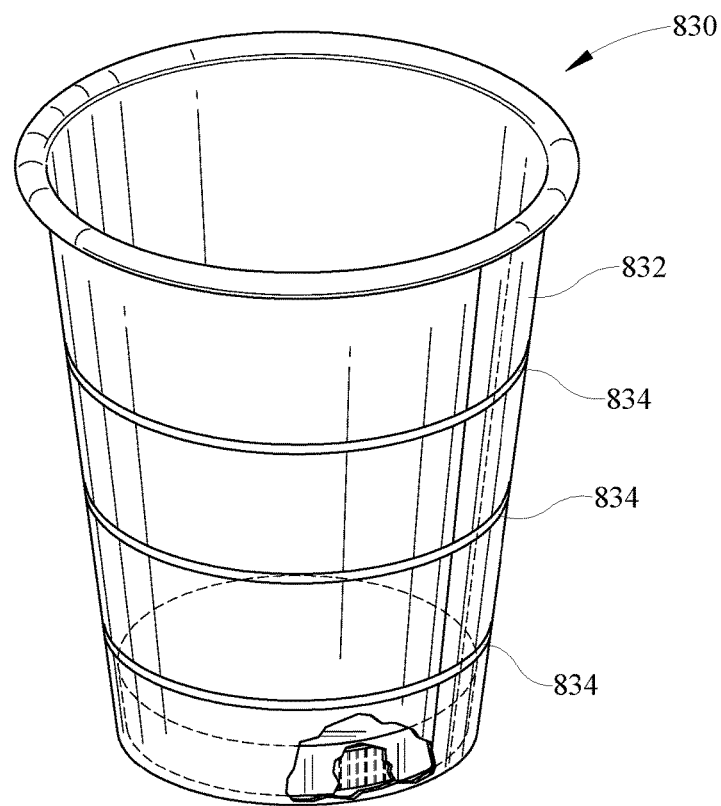
FIG. 25
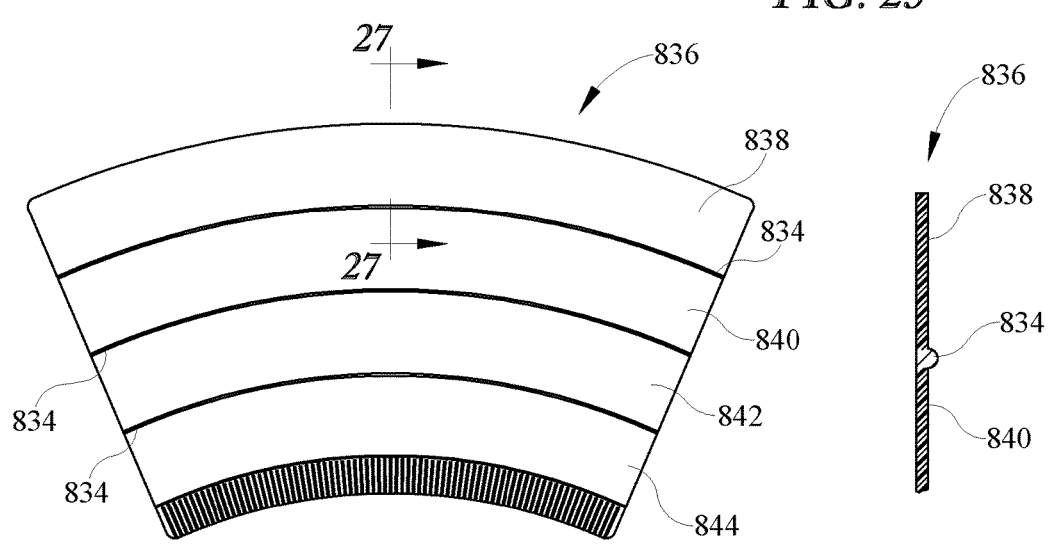
FIG. 26
FIG. 27

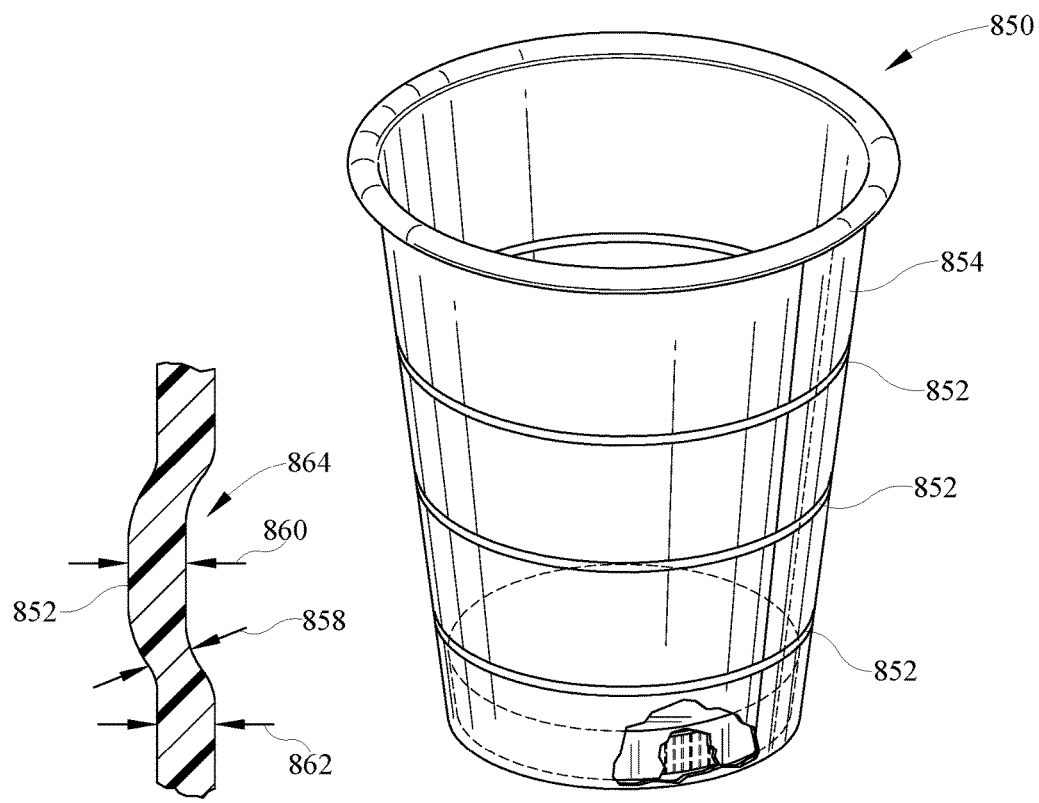
FIG. 31
FIG. 28
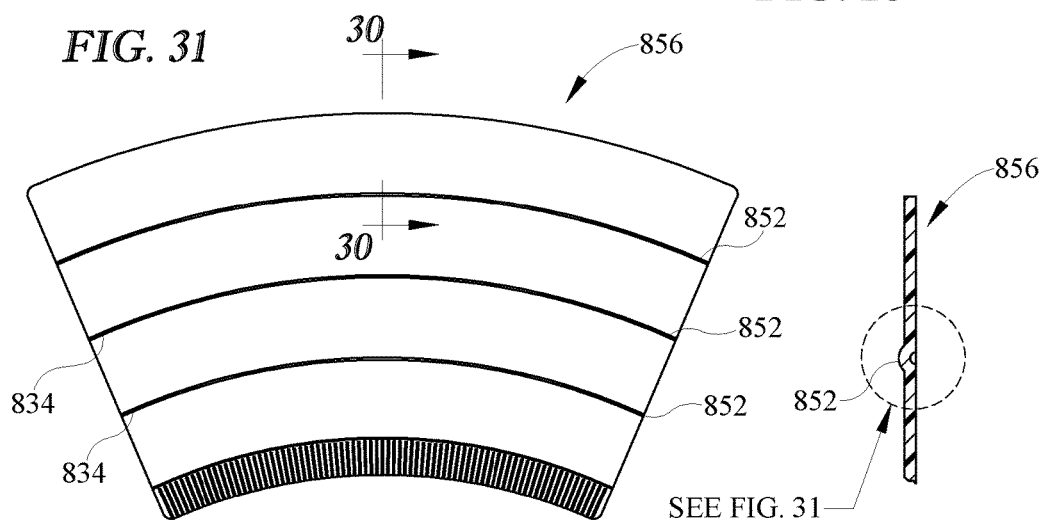
FIG. 29
FIG. 30

INSULATED CONTAINER

PRIORITY CLAIM

This application is a continuation of U.S. patent application Ser. No. 13/491,007 filed Jun. 7, 2012, which claims priority under 35 U.S.C. § 119(e) to U.S. Provisional Application Nos. 61/498,455, filed Jun. 17, 2011 and Ser. No. 61/618,587, filed Mar. 30, 2012, each of which are expressly incorporated by reference herein.

BACKGROUND

The present disclosure relates to vessels, and in particular to insulated containers, such as cups, for containing hot or cold beverages or food. More particularly, the present disclosure relates to an insulated cup formed from polymeric materials.

SUMMARY

A vessel in accordance with the present disclosure is configured to hold a product in an interior region. In illustrative embodiments, the vessel is an insulated container such as a drink cup, a food-storage cup, or a dessert cup.

In illustrative embodiments, an insulative cup includes a body having a sleeve-shaped side wall and a floor coupled to the body to cooperate with the side wall to form an interior region for storing food, liquid, or any suitable product. The body also includes a rolled brim coupled to an upper end of the side wall and a floor mount coupled to a lower end of the side wall and to the floor.

In illustrative embodiments, the body is made of a sheet comprising an insulative cellular non-aromatic polymeric material. In some embodiments of the present disclosure, the body is made of a multi-layer sheet including a substrate layer comprising the insulative cellular non-aromatic polymeric material and an outer layer comprising a skin coupled to the substrate layer and configured to display artwork and text. In other embodiments of the present disclosure, such text and artwork are printed directly on an exterior surface of the insulative cellular non-aromatic polymeric material. In illustrative embodiments, the floor also comprises insulative cellular non-aromatic polymeric material.

The insulative cellular non-aromatic polymer material included in the body is configured in accordance with the present disclosure to provide means for enabling localized plastic deformation in at least one selected region of the body (e.g., the side wall, the rolled brim, the floor mount, and a floor-retaining flange included in the floor mount) to provide (1) a plastically deformed first material segment having a first density in a first portion of the selected region of the body and (2) a second material segment having a relatively lower second density in an adjacent second portion of the selected region of the body. In illustrative embodiments, the more dense first material segment is thinner than the second material segment.

In illustrative embodiments, the insulative cellular non-aromatic polymeric material comprises a polypropylene base resin having a high melt strength, a polypropylene copolymer or a homopolymer resin (or both), and cell-forming agents including primary and secondary nucleating agents and a blowing agent such as carbon dioxide gas that is injected into the resins to expand the resins and reduce density. The base resin comprises broadly distributed molecular weight polypropylene characterized by a distribution that is unimodal (not bimodal).

In illustrative embodiments, the skin is coupled to an exterior surface of the insulative cellular non-aromatic polymeric material. The skin includes a film, an adhesive interposed between the film and the exterior surface of the insulative cellular non-aromatic polymeric material, and an ink printed on the film to provide a graphic design including artwork, text, or both. The film is biaxially oriented polypropylene in illustrative embodiments.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3A is a partial section view taken along line 3-3 of FIG. 1 showing the first region is in the side wall of the body;

FIG. 3B is a partial section view taken along line 3-3 of FIG. 1 showing the second region is in the rolled brim of the body;

FIG. 3C is a partial section view taken along line 3-3 of FIG. 1 showing the third region is in a connecting web included in the floor mount of the body;

FIG. 3D is a partial section view taken along line 3-3 of FIG. 1 showing the fourth region is in a web-support ring included in the floor mount of the body;

FIG. 4 is a dead section view taken along line 4-4 of FIG. 1 showing that the side wall of the insulative cup includes a C-shaped fence, an upright outer tab coupled to one end of the C-shaped fence, and an upright inner tab coupled to an opposite end of the C-shaped fence and suggesting that the first and second tabs are arranged to overlap one another to establish a bridge extending between the ends of the C-shaped fence to define the interior region therebetween;

FIG. 4A is an enlarged dead section view of a bridge in accordance with the present disclosure showing how the insulative cellular non-aromatic polymer material has been compressed in both the first and second tabs to produce a bridge having a reduced thickness that is similar to a thickness of the side wall in the C-shaped fence opposite the bridge;

FIG. 4B is an enlarged dead section view of a portion of the C-shaped fence of FIG. 4A showing that the insulative cellular non-aromatic polymer material has not been compressed;

FIG. 4C is an enlarged dead section view of the first and second tabs prior to mating to one another to establish the bridge;

FIG. 7 is an enlarged partial elevation view of the insulative cup of FIGS. 1, 3, and 3C showing that the floor is coupled to the side wall by the floor mount and that the floor mount includes a web-support ring coupled to the side wall, a floor-retaining flange radially spaced-apart from the web-support ring, and a connecting web interconnecting the web-support ring and the floor-retaining flange;

FIG. 7A is a dead section view of a portion of an insulative cup in accordance with the present disclosure showing the third region of localized plastics deformation of the insulative cellular non-aromatic polymer material in the connecting web of the floor mount and showing melting of the insulative cellular non-aromatic polymer material along an interface between the floor-retaining flange and a portion of the floor;

FIG. 25 is a perspective view of another embodiment of an insulative cup in accordance with the present disclosure showing that the insulative cup includes a body including a rolled brim, a side wall, and a floor mount and a floor coupled to both the support structure and the bottom portion of the side wall and showing that portions of the side wall have been compressed to form a number of ribs extending outwardly away from the compressed portions of the side wall;

FIG. 26 is a plan view of the body blank used to form the body of the insulative cup shown in FIG. 25 showing that the body blank includes a first upper arcuate edge, a second lower arcuate edge, an arcuate fold line therebetween, a series of spaced apart channels extending between the arcuate fold line and the second lower arcuate edge, and compressed portions of the side wall that establish ribs therebetween to reduce the surface area of contact between the hand of a user and the outer surface of the cup;

FIG. 27 is a sectional view taken along line 27-27 of FIG. 26;

FIG. 28 is a perspective view of yet another embodiment of an insulative cup in accordance with the present disclosure showing that the insulative cup includes a body including a rolled brim, a side wall, and a floor mount and a floor coupled to both the support structure and the bottom portion of the side wall and showing a number of protruding ribs formed in the side wall as a result of displacing portions of the side wall;

FIG. 29 is a plan view of a body blank used to make the body of the insulative cup shown in FIG. 28 showing that the body blank includes a first upper arcuate edge, a second lower arcuate edge, an arcuate fold line therebetween, a series of spaced apart channels extending between the arcuate fold line and the second lower arcuate edge, and protruding ribs formed as a result of displacing material to form ribs that are used to reduce the surface area of contact between the hand of a user and the outer surface of the cup;

FIG. 30 is a sectional view taken along line 30-30 of FIG. 29;

FIG. 31 is an enlarged portion of FIG. 30 showing that material has been displaced in the side wall to form the rib;

DETAILED DESCRIPTION

Figures 1, 1A:
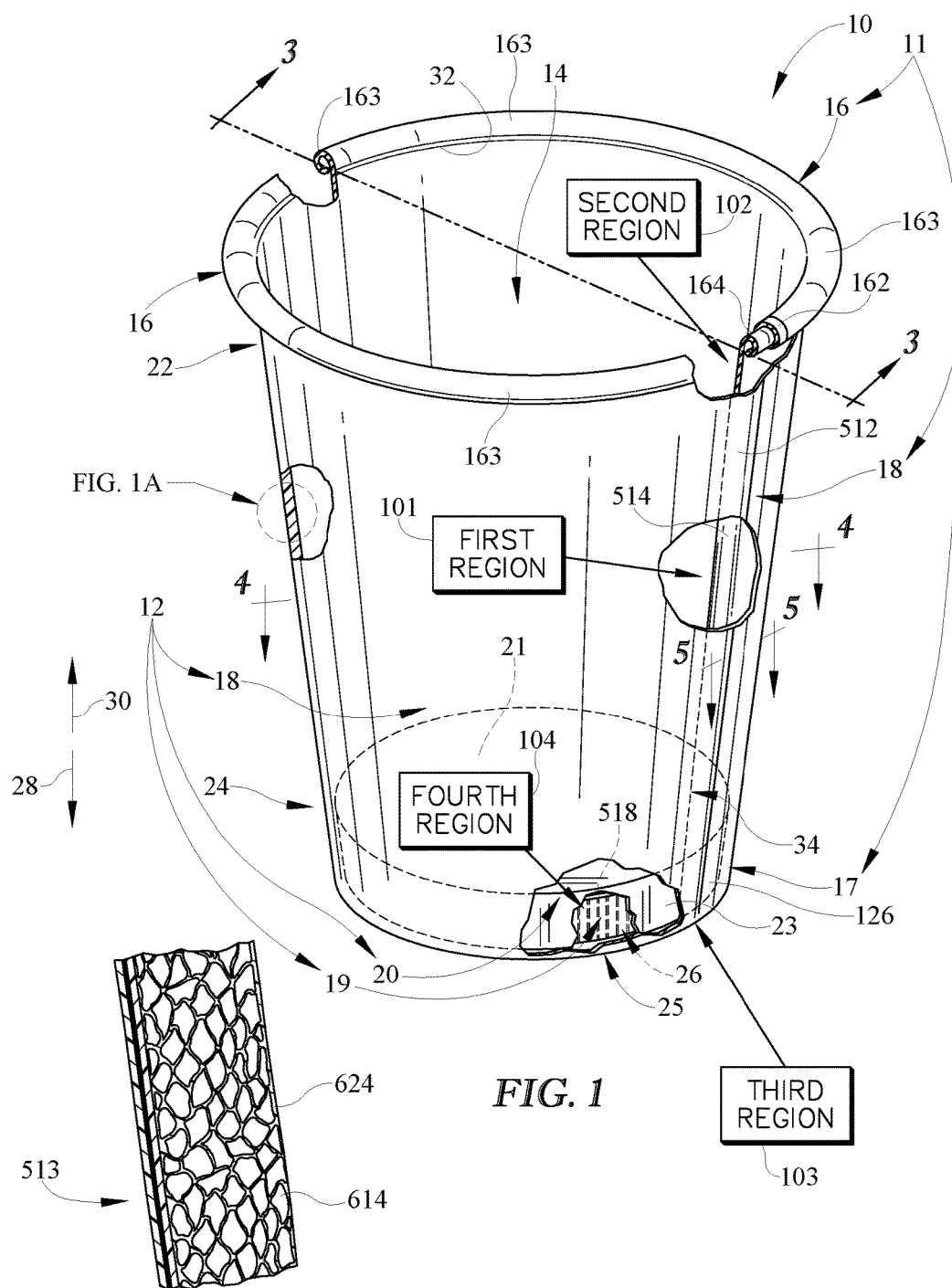
FIG. 1 is a perspective view of an insulative cup in accordance with the present disclosure showing that the insulative cup includes a body and a floor and showing that four regions of the body include localized areas of plastic deformation that provide for increased density in those areas while maintaining a predetermined insulative characteristic in the body.
FIG. 1A is an enlarged sectional view of a portion of a side wall included in the body of the insulative cup of FIG. 1 showing that the side wall is made from a sheet that includes, from left to right, a skin, an ink layer, an adhesive layer, and insulative cellular non-aromatic polymer material.
Figure 3:
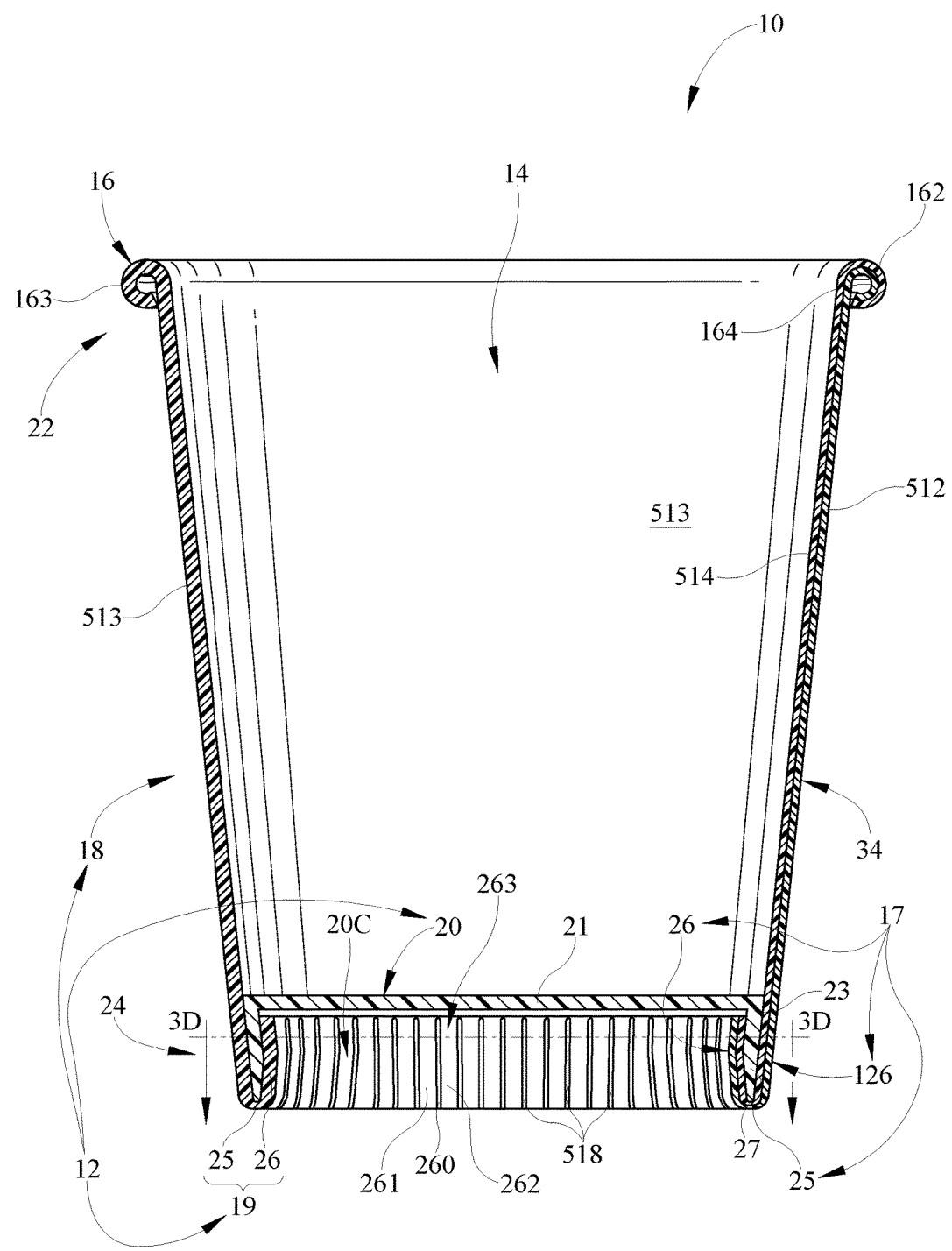
FIG. 3 is a sectional view taken along line 3-3 of FIG. 2 showing that the side wall included in the body of the insulative cup includes a generally uniform thickness and showing that the floor is coupled to a floor mount included in the body.
Figure 3A:
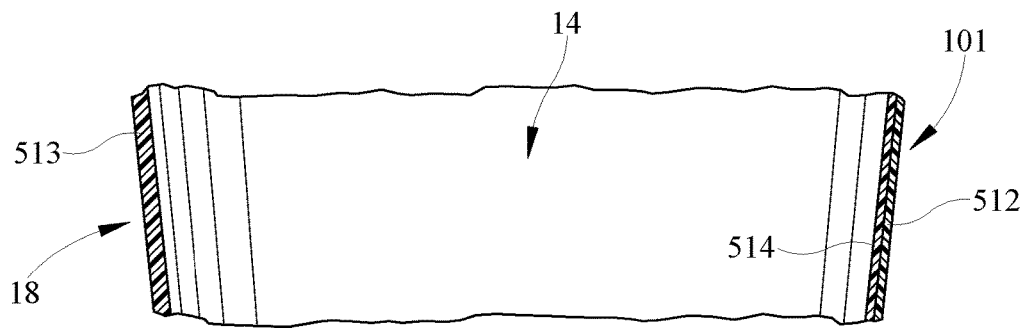
FIGS. 3A-3D are a series of views showing first, second, third, and fourth regions of the insulative cup of FIG. 1 that each include localized plastic deformation.
Figure 3B:
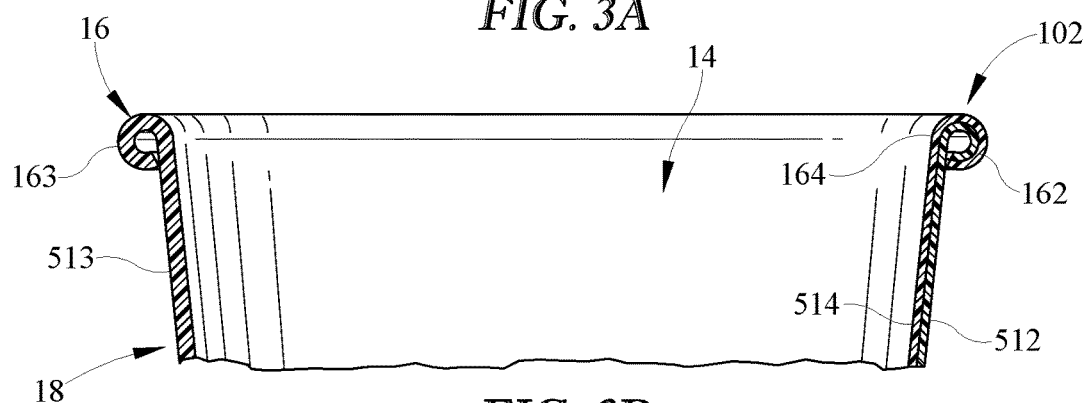
Figure 3C:
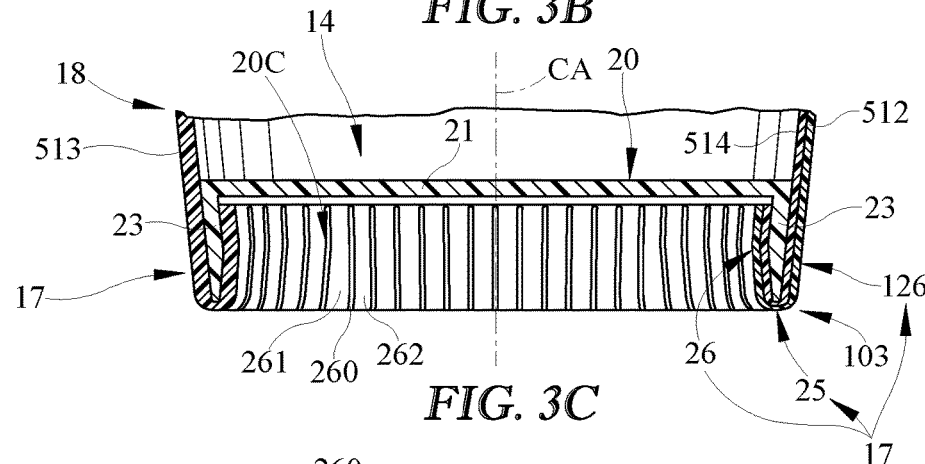
Figure 3D:
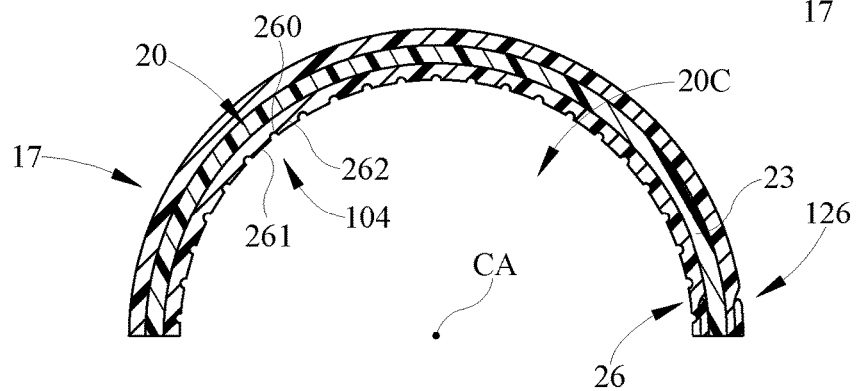

Localized plastic deformation is provided in accordance with the present disclosure in, for example, four regions 101, 102, 103, and 104 of a body 11 of an insulative cup 10 comprising an insulative cellular non-aromatic polymeric material as suggested in FIGS. 1 and 3-3D. A material has been plastically deformed, for example, when it has changed shape to take on a permanent set in response to exposure to an external compression load and remains in that new shape after the load has been removed. Insulative cup 10 disclosed herein is not a paper cup but rather a cup made of a cellular non-aromatic polymeric material with insulative qualities suitable for holding hot and cold contents.

Figure 32:
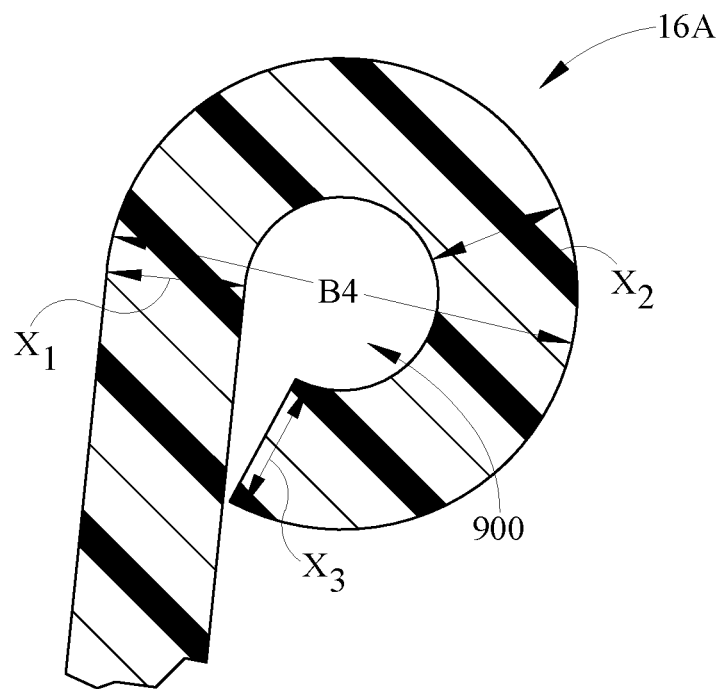
FIG. 32 is a dead section view of another embodiment of a rolled brim in accordance with the present disclosure showing that the rolled brim has a generally constant thickness throughout.
Figure 33:
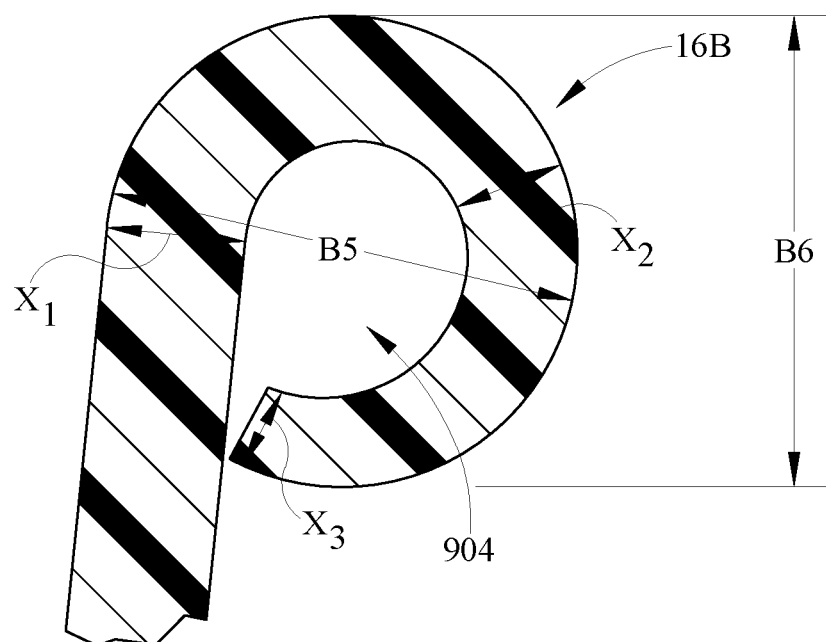
FIG. 33 is a dead section view of yet another embodiment of a rolled brim in accordance with the present disclosure showing that the rolled brim includes a thickness that becomes relatively thinner toward a free end of the rolled brim.
Figure 34:
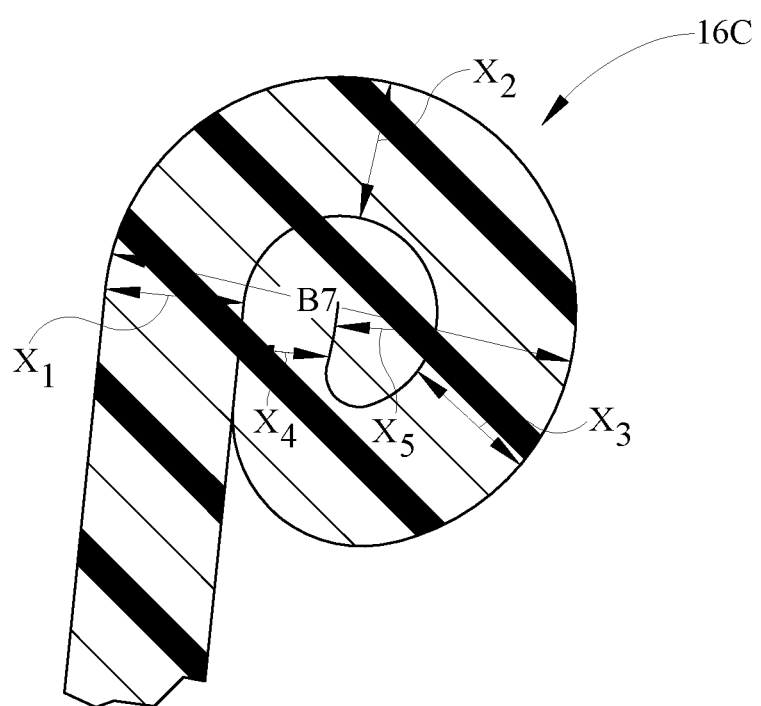
FIG. 34 is a dead section view of yet another embodiment of a rolled brim in accordance with the present disclosure showing that the rolled brim has been rolled upon itself so that generally no space is formed in the rolled brim.
Figure 37:
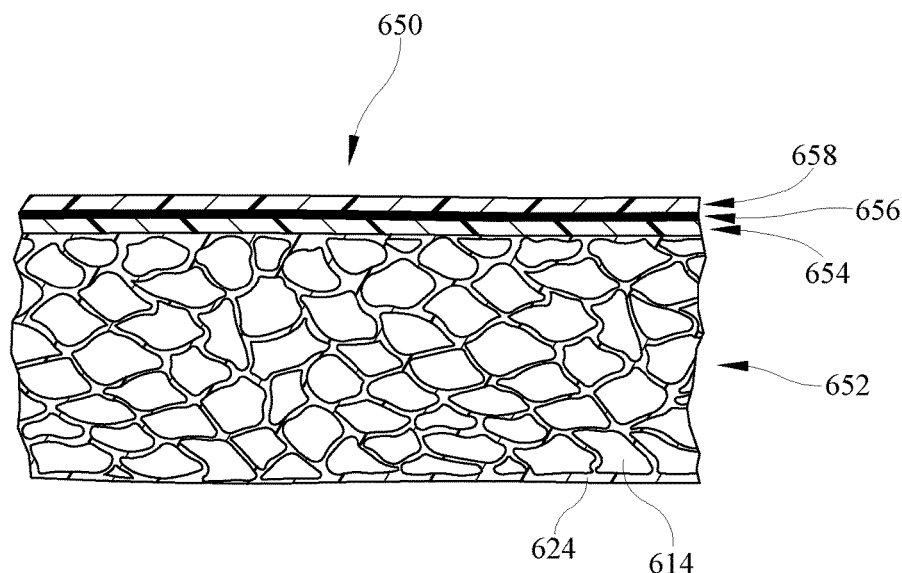
FIG. 37 is a view similar to FIG. 1A showing an embodiment of a sheet that includes, from top to bottom, a skin including a film, an ink layer, an adhesive layer, and a strip of insulative cellular non-aromatic polymeric material.
Figure 38:
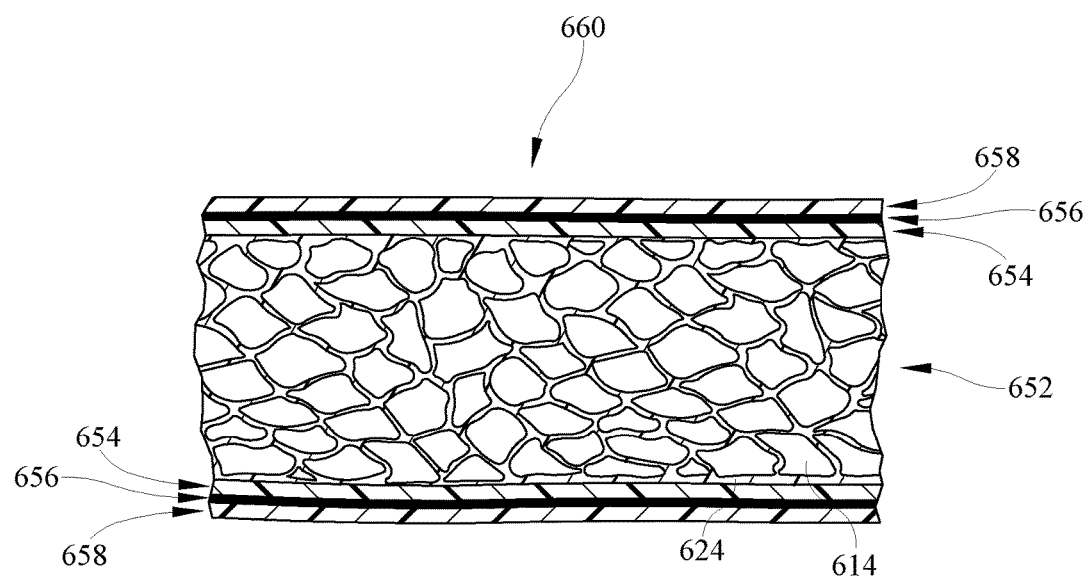
FIG. 38 is a view similar to FIG. 37 showing another embodiment of a sheet that includes, from top to bottom, an outer skin including a film, an ink layer, and an adhesive layer, a strip of insulative cellular non-aromatic polymeric material, and an inner skin including a film, an ink layer, and an adhesive layer.

A first embodiment of an insulative cup 10 having four regions 101-104 where localized plastic deformation provides segments of insulative cup 10 that exhibit higher material density than neighboring segments of insulative cup 10 in accordance with the present disclosure is shown in FIGS. 1 and 2-11. As an example, insulative cup 10 is made using an illustrative body blank 500 shown in FIGS. 12-14. A cup-manufacturing process 40 that makes body blank 500 and insulative cup 10 is shown in FIGS. 16-20. Other embodiments of body blanks 800, 820, 836, and 856 in accordance with the present disclosure that may be used to form insulative cups are illustrated in FIGS. 21-31. Rolled brims 16A, 16B, 16C that may be used with various insulative cups are illustrated in FIGS. 32-34. A first embodiment of an insulative cellular non-aromatic polymeric material used to form insulative cup 10 is shown in FIGS. 1A and 37. Another embodiment of an insulative cellular non-aromatic polymeric material in accordance with the present disclosure is shown in FIG. 38.

An insulative cup 10 comprises a body 11 including a sleeve-shaped side wall 18 and a floor 20 coupled to body 11 to define an interior region 14 bounded by sleeve-shaped side wall 18 and floor 20 as shown, for example, in FIG. 1. Body 11 further includes a rolled brim 16 coupled to an upper end of side wall 18 and a floor mount 17 coupled to a lower end of side wall 18 as suggested in FIGS. 1-3.

Body 11 is formed from a strip of insulative cellular non-aromatic polymeric material as disclosed herein. In accordance with the present disclosure, a strip of insulative cellular non-aromatic polymeric material is configured (by application of pressure—with or without application of heat) to provide means for enabling localized plastic deformation in at least one selected region (for example, regions 101-104) of body 11 to provide a plastically deformed first material segment having a first density located in a first portion of the selected region of body 11 and a second material segment having a second density lower than the first density located in an adjacent second portion of the selected region of body 11 without fracturing the insulative cellular non-aromatic polymeric material so that a predetermined insulative characteristic is maintained in body 11.

A first region 101 of the selected regions of body 11 in which localized plastic deformation is enabled by the insulative cellular non-aromatic polymeric material is in sleeve-shaped side wall 18 as suggested in FIGS. 1, 3A, and 4. Sleeve-shaped side wall 18 includes an upright inner tab 514, an upright outer tab 512, and an upright fence 513 extending between inner and outer tabs 514, 512 as suggested in FIGS. 1, 3, and 4. Upright inner tab 514 is arranged to extend upwardly from floor 20 and configured to provide the first material segment having the higher first density in the first region 101 of the selected regions of body 11. Upright outer tab 512 is arranged to extend upwardly from floor 20 and to mate with upright inner tab 514 along an interface I therebetween as suggested in FIG. 4. Upright fence 513 is arranged to interconnect upright inner and outer tabs 514, 512 and surround interior region 14. Upright fence 513 is configured to provide the second material segment having the lower second density in the first region 101 of the selected regions of body 11 and cooperate with upright inner and outer tabs 514, 512 to form sleeve-shaped side wall 18 as suggested in FIGS. 3 and 4.

Figure 6:
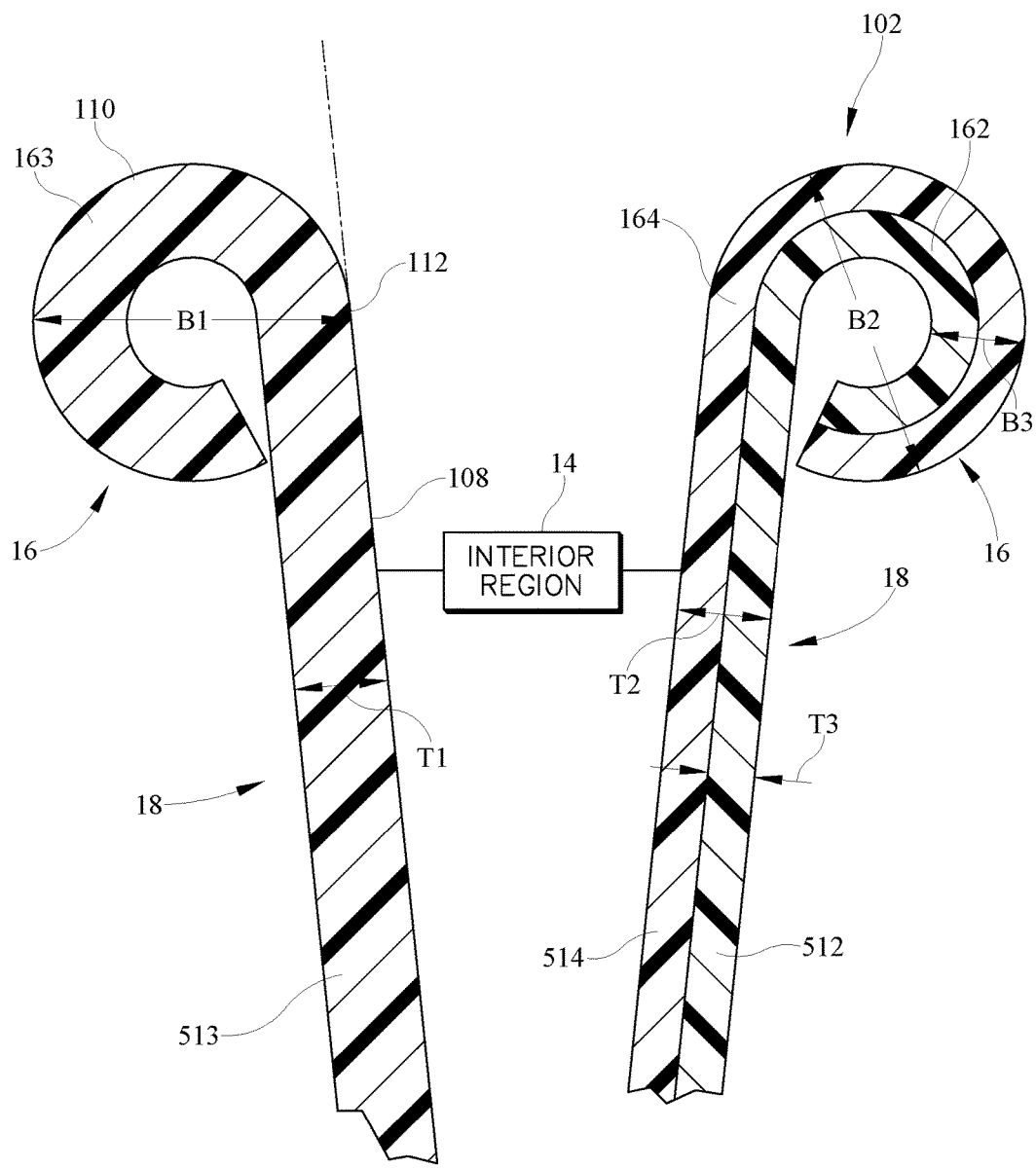
FIG. 6 is diagrammatic and dead section view of the rolled brim of FIGS. 1, 3, and 3B showing the second region of localized plastic deformation.

A second region 102 of the selected regions of body 11 in which localized plastic deformation is enabled by the insulative cellular non-aromatic polymeric material is in a rolled brim 16 included in body 11 as suggested in FIGS. 1, 3B, and 6. Rolled brim 16 is coupled to an upper end of sleeve-shaped side wall 18 to lie in spaced-apart relation to floor 20 and to frame an opening into interior region 14. Rolled brim 16 includes an inner rolled tab 164, an outer rolled tab 162, and a rolled lip 163 as suggested in FIGS. 1, 3, and 6. Inner rolled tab 164 is configured to provide the first material segment having the higher first density in the second region 102 of the selected regions of body 11. Inner rolled tab 164 is coupled to an upper end of upright outer tab 512 included in sleeve-shaped side wall 18. Outer rolled tab 162 is coupled to an upper end of upright inner tab 514 included in sleeve-shaped side wall 18 and to an outwardly facing exterior surface of inner rolled tab 164. Rolled lip 163 is arranged to interconnect oppositely facing side edges of each of inner and outer rolled tabs 164, 162. Rolled lip 163 is configured to provide the second material segment having the lower second density in the second 102 of the selected region of body 11 and cooperate with inner and outer rolled tabs 164, 162 to form rolled brim 16 as suggested in FIG. 1.

A third region 103 of the selected regions of body 11 in which localized plastic deformation is enabled by the insulative cellular non-aromatic polymeric material is in a floor mount 17 included in body 11 as suggested in FIGS. 1, 3C, 7, and 7A. Floor mount 17 is coupled to a lower end of sleeve-shaped side wall 18 to lie in spaced-apart relation to rolled brim 16 and to floor 20 to support floor 20 in a stationary position relative to sleeve-shaped side wall 18 to form interior region 14. Floor mount 17 includes a web-support ring 126, a floor-retaining flange 26, and a connecting web 25 extending between web-support ring 126 and floor-retaining flange 26 as suggested in FIG. 3. Web-support ring 126 is coupled to the lower end of sleeve-shaped side wall 18 and configured to provide the second material segment having the lower second density in the third region 103 of the selected regions of body 11. Floor-retaining flange 26 is coupled to floor 20 and arranged to be surrounded by web-support ring 126 as suggested in FIG. 3. Connecting web 25 is arranged to interconnect floor-retaining flange 26 and web-support ring 126. Connecting web 25 is configured to provide the first material segment having the higher first density in the third region 103 of the selected regions of body 11. Connecting web 25 is preformed in a body blank 500 in an illustrative embodiment before body blank 500 is formed to define insulative cup 10 as suggested in FIGS. 16-20.

A fourth region 104 of the selected regions of body 11 in which localized plastic deformation is enabled by the insulative cellular non-aromatic polymeric material is in floor-retaining flange 26 of floor mount 17 as suggested in FIGS. 1, 3D, 9, 9A, and 9B. Floor-retaining flange 26 includes an alternating series of upright thick and thin staves arranged in side-to-side relation to extend upwardly from connecting web 25 toward interior region 14 bounded by sleeve-shaped side wall 18 and floor 20. This alternating series of thick and thin staves is preformed in a body blank 500 in an illustrative embodiment before body blank 500 is formed to define insulative cup 10 as suggested in FIGS. 16-20. As suggested in FIG. 7, a first 261 of the upright thick staves is configured to include a right side edge 261R extending upwardly from web 25 toward interior region 14. A second 262 of the upright thick staves is configured to include a left side edge 262L arranged to extend upwardly from web 25 toward interior region 14 and lie in spaced-apart confronting relation to right side edge 261R of the first 261 of the upright thick staves. A first 260 of the upright thin staves is arranged to interconnect right side edge 261R of the first 261 of the upright thick staves and left side edge 262L of the second 262 of the upright thick staves and to cooperate with left and right side edges 262L, 261R to define therebetween a vertical channel 263 opening inwardly into a lower interior region 264 bounded by floor-retaining flange 26 and a horizontal platform 21 included in floor 20 and located above floor-retaining flange 26 as suggested in FIG. 7. The first 260 of the upright thin staves is configured to provide the first material segment having the higher first density in the fourth region 104 of the selected regions of body 11. The first 261 of the upright thick staves is configured to provide the second material segment having the lower second density in the fourth region 104 of the selected regions of the body 11.

Sleeve-shaped side wall 18 of body 11 includes a pair of tabs 514, 512 that mate to provide side wall 18 with a frustoconical shape in the illustrative embodiment shown in FIGS. 1, 3, 3A, and 4. Upright inner tab 514 of side wall 18 includes an inner surface 514*i* bounding a portion of interior region 14 and an outer surface 514*o* facing toward upright outer tab 512 as shown in FIGS. 4 and 4C. Upright outer tab 512 includes an inner surface 512*i* facing toward interior region 14 and mating with outer surface 514*o* of upright inner tab 514 to define the interface I between upright inner and outer tabs 514, 512. Upright outer tab 512 further includes an outer face 512*o* facing away from upright inner tab 514. Each of inner and outer surfaces of upright inner and outer tabs 514, 512 has an arcuate shape in a horizontal cross-section as suggested in FIG. 4C and subtends an acute angle of less than 20° as suggested in FIG. 4.

Upright fence 513 of side wall 18 is C-shaped in a horizontal cross-section and each of upright inner and outer tabs 514, 512 has an arcuate shape in a horizontal cross-section as suggested in FIG. 4. Upright fence 513 includes an upright left side edge 513L and an upright right side edge 513R that is arranged to lie in spaced-apart confronting relation to upright left side edge 513L in FIG. 4C. Upright outer tab 512 is configured to have the higher first density and mate with upright inner tab 514 also characterized by the higher first density to establish a bridge 512, 514 arranged to interconnect upright left and right side edges 513L, 513R of upright fence 513. Bridge 512, 514 is formed of plastically deformed material having the higher first density.

Upright fence 513 of side wall 18 has an inner surface 513i bounding a portion of interior region 14 and an outer surface 513o facing away from interior region 14 and surrounding inner surface 513i of upright fence 513 as shown, or example, in FIG. 4. Outer surface 513o cooperates with inner surface 513i of upright fence 513 to define a first thickness T1 therebetween. Upright inner tab 514 includes an inner surface 514i bounding a portion of interior region 14 and an outer surface 514o facing toward upright outer tab 512. Upright outer tab 512 includes an inner surface 512i facing toward interior region 14 and mating with outer surface 514o of upright inner tab 514 to define the interface I between upright inner and outer tabs 514, 512. Upright outer tab 512 further includes an outer face 512o facing away from upright inner tab 514. Inner and outer surfaces of upright inner tab 514 cooperate to define a second thickness T2I therebetween that is less than the first thickness T1. Inner and outer surfaces of upright outer tab 512 cooperate to define a third thickness T2O that is less than the first thickness T1.

Rolled brim 16 of body 11 is coupled to an upper end of sleeve-shaped side wall 18 to lie in spaced-apart relation to floor 20 and to frame an opening into interior region 14 as suggested in FIGS. 1 and 3B. Inner rolled tab 164 of rolled brim 16 is configured to provide the plastically deformed first material segment having the higher first density and to include oppositely facing left and right side edges. Rolled lip 163 of rolled brim 16 is arranged to interconnect the oppositely facing left and right side edges of inner rolled tab 164 and configured to provide the second material segment having the lower second density. Outer rolled tab 162 of rolled brim 16 is coupled to an outwardly facing surface of inner rolled tab 164 as suggested in FIG. 1 to provide an outer shell covering inner rolled tab 164 and formed of plastically deformed material having the higher first density. Outer rolled tab 162 includes oppositely facing left and right side edges. Rolled lip 163 is arranged to interconnect the oppositely facing left and right side edges of outer rolled tab 162. Rolled lip 163 is C-shaped in horizontal cross-section. Each of inner and outer rolled tabs 164, 162 has an arcuate shape between the oppositely facing left and right side edges thereof to provide rolled brim 16 with an annular shape.

Floor mount 17 of body 11 is coupled to a lower end of sleeve-shaped side wall 18 and to floor 20 to support floor 20 in a stationary position relative to sleeve-shaped side wall 18 to form interior region 14 as suggested in FIGS. 1-3 and 3C. Floor mount 17 includes a floor-retaining flange 26 coupled to floor 20, a web-support ring 126 coupled to the lower end of sleeve-shaped side wall 18 and arranged to surround floor-retaining flange 26, and a connecting web 25 arranged to interconnect floor-retaining flange 26 and web-support ring 126 as suggested in FIG. 3C. Connecting web 25 is configured to provide the first material segment having the higher first density. Connecting web-support ring 126 is configured to provide the second material segment having the lower second density. Each of connecting web 25 and web-support ring 126 has an annular shape. Floor-retaining flange 26 has an annular shape. Each of floor-retaining flange 26, connecting web 25, and web-support ring 126 includes an inner layer having an interior surface mating with floor 20 and an overlapping outer layer mating with an exterior surface of inner layer as suggested in FIGS. 3 and 7.

Figure 2:
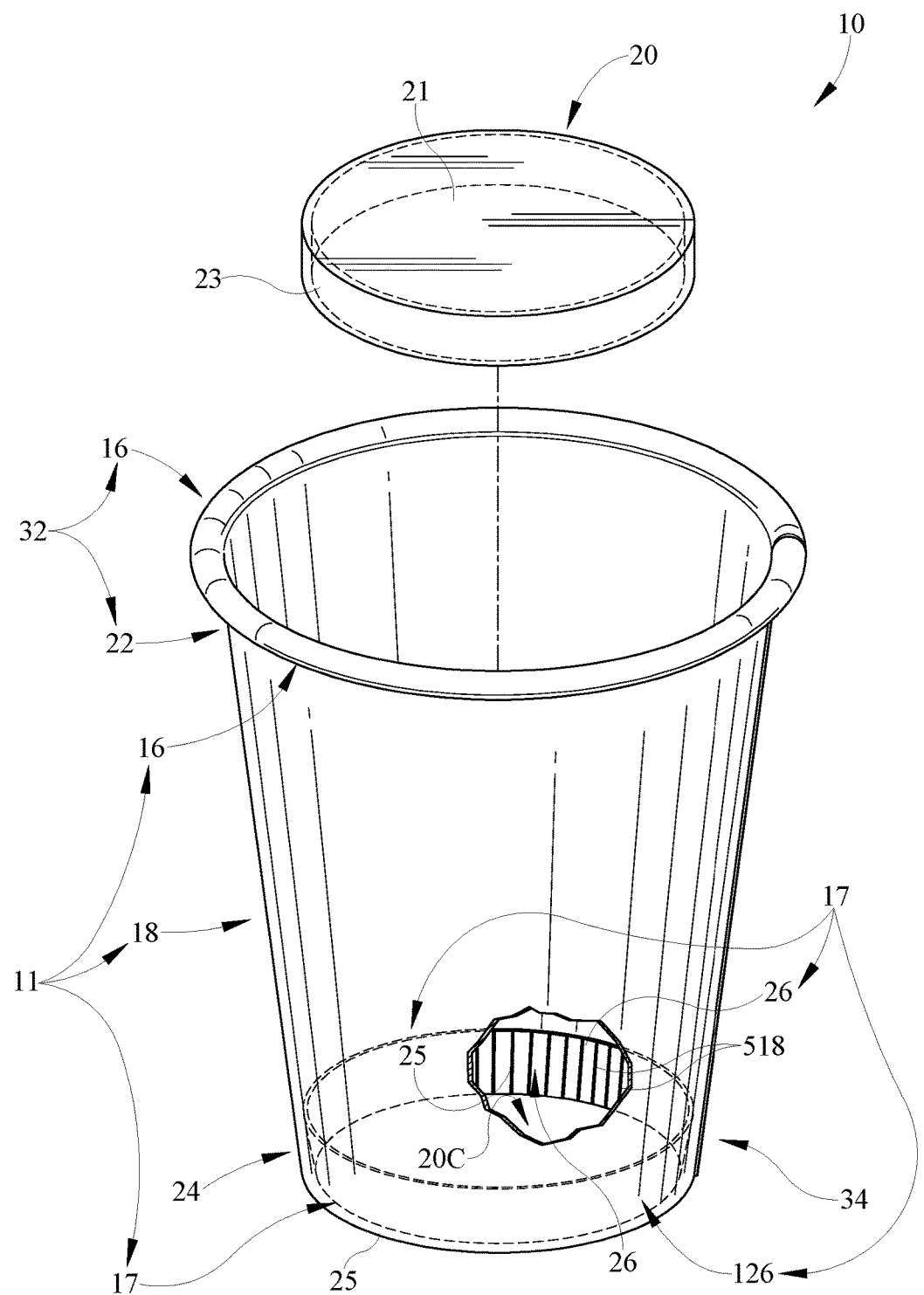
FIG. 2 is an exploded assembly view of the insulative cup of FIG. 1 showing that the insulative cup includes, from top to bottom, the floor and the body including a rolled brim, the side wall, and a support structure configured to mate with the floor as shown in FIG. 1.

Floor 20 of insulative cup 10 includes a horizontal platform 21 bounding a portion of interior region 14 and a platform-support member 23 coupled to horizontal platform 21 as shown, for example, in FIGS. 2 and 3C. Platform-support member 23 is ring-shaped and arranged to extend downwardly away from horizontal platform 21 and interior region 14 into a space 27 provided between floor-retaining flange 26 and the web-support ring 126 surrounding floor-retaining flange 26 to mate with each of floor-retaining flange 26 and web-support ring 126 as suggested in FIGS. 3 and 7.

Platform-support member 23 of floor 20 has an annular shape and is arranged to surround floor-retaining flange 26 and lie in an annular space provided between horizontal platform 21 and connecting web 25 as suggested in FIGS. 3, 3C, and 3D. Each of floor-retaining flange 26, connecting web 25, and web-support ring 126 includes an inner layer having an interior surface mating with floor 20 and an overlapping outer layer mating with an exterior surface of inner layer as suggested in FIGS. 3 and 6. Inner layer of each of floor-retaining flange 26, web 25, and web-support ring 126 is arranged to mate with platform-support member 23 as suggested in FIG. 3C.

Floor-retaining flange 26 of floor mount 17 is arranged to lie in a stationary position relative to sleeve-shaped side wall 18 and coupled to floor 20 to retain floor 20 in a stationary position relative to sleeve-shaped side wall 18 as suggested in FIGS. 3, 3C, and 7. Horizontal platform 21 of floor 20 has a perimeter edge mating with an inner surface of sleeve-shaped side wall 18 and an upwardly facing top side bounding a portion of interior region 14 as suggested in FIGS. 3 and 3C.

Floor-retaining flange 26 of floor mount 17 is ring-shaped and includes an alternating series of upright thick and thin staves arranged to lie in side-to-side relation to one another to extend upwardly toward a downwardly facing underside of horizontal platform 21. A first 261 of the upright thick staves is configured to include a right side edge 261R extending upwardly toward the underside of horizontal platform 21. A second 262 of the upright thick staves is configured to include a left side edge 262L arranged to extend upwardly toward underside of horizontal platform 21 and lie in spaced-apart confronting relation to right side edge 261R of the first 261 of the upright thick staves. A first 260 of the upright thin staves is arranged to interconnect left and right side edges 262L, 261R and cooperate with left and right side edges 262L, 261R to define therebetween a vertical channel 263 opening inwardly into a lower interior region 264 bounded by horizontal platform 21 and floor-retaining flange 26 as suggested in FIGS. 3D, 7, and 9. The first 260 of the thin staves is configured to provide the first material segment having the higher first density. The first 261 of the thick staves is configured to provide the second material segment having the lower second density.

Floor-retaining flange 26 of floor mount 17 has an annular shape and is arranged to surround a vertically extending central axis CA intercepting a center point of horizontal platform 21 as suggested in FIGS. 3C and 3D. The first 260 of the thin staves has an inner wall facing toward a portion of the vertically extending central axis CA passing through the lower interior region. Platform-support member 23 is arranged to surround floor-retaining flange 26 and cooperate with horizontal platform 21 to form a downwardly opening floor chamber 20C containing the alternating series of upright thick and thin staves therein.

Each first material segment in the insulative cellular non-aromatic polymeric material has a relatively thin first thickness. Each companion second material segment in the insulative cellular non-aromatic polymeric material has a relatively thicker second thickness.

Figure 12A:
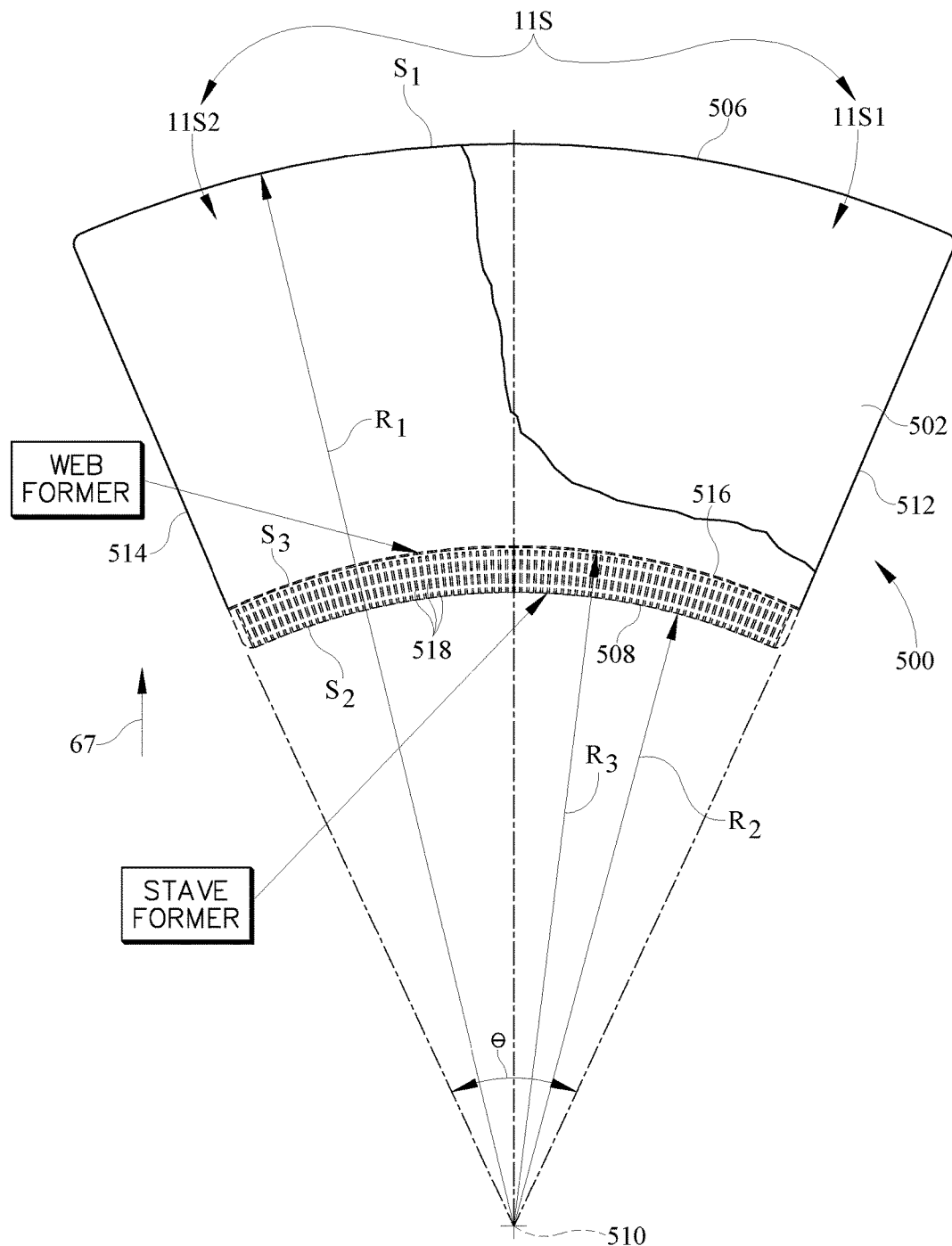
FIG. 12A is a plan view of a body blank used to make the body of FIG. 1 with portions broken away to reveal that the body blank is formed from a strip of insulative cellular non-aromatic polymeric material and a skin laminated to the strip of insulative cellular non-aromatic polymeric material and suggesting that during a blank forming process a web former compresses a portion of the body blank along an arcuate fold line to form the connecting web and a stave former compresses another portion of the body blank between the arcuate fold line and a lower arcuate edge to form a series of alternating thick and thin staves that extend between the arcuate fold line and the second lower arcuate edge.

Body 11 is formed from a sheet 11S of insulative cellular non-aromatic polymeric material that includes, for example, a strip of insulative cellular non-aromatic polymeric material 11S1 and a skin 11S2 coupled to one side of the strip of insulative cellular non-aromatic polymeric material 11S1 as shown in FIG. 12A. In one embodiment of the present disclosure, text and artwork or both can be printed on a film included in skin 11S2. Skin 11S2 may further comprise an ink layer applied to the film to locate the ink layer between the film and the strip of insulative cellular non-aromatic polymeric material. In another example, the skin and the ink layer are laminated to the strip of insulative cellular non-aromatic polymeric material by an adhesive layer arranged to lie between the ink layer and the insulative cellular non-aromatic polymer material. As an example, the skin may be biaxially oriented polypropylene.

Insulative cellular non-aromatic polymeric material comprises, for example, a polypropylene base resin having a high melt strength, one or both of a polypropylene copolymer and homopolymer resin, and one or more cell-forming agents. As an example, cell-forming agents may include a primary nucleation agent, a secondary nucleation agent, and a blowing agent defined by gas means for expanding the resins and to reduce density. In one example, the gas means comprises carbon dioxide. In another example, the base resin comprises broadly distributed molecular weight polypropylene characterized by a distribution that is unimodal and not bimodal.

An insulative cup 10 in accordance with one exemplary embodiment of the present disclosure includes a base 12 formed to include an interior region 14 and a rolled brim 16 coupled to base 12 as shown, for example, in FIG. 1. Base 12 includes a side wall 18, a support structure 19, and a floor 20 as shown in FIGS. 1, 2, 3C, and 9. Floor 20 is coupled to support structure 19 and side wall 18 to define interior region 14. Base 12 illustratively comprises an insulative cellular non-aromatic polymeric material that is configured (by application of pressure—with or without application of heat) to provide means for insulating a beverage or food placed in interior region 14, forming a structure having sufficient mechanical characteristics to support the beverage or food, and providing resistance to deformation and puncture. As shown for example in FIGS. 16-20, insulative cup 10 is formed in an illustrative cup-manufacturing process 40.

Side wall 18 extends between rolled brim 16 and support structure 19 as shown in FIG. 3. Side wall 18 includes a top portion 22 of base 12 that is coupled to rolled brim 16 and a bottom portion 24 that is coupled to support structure 19. Support structure 19 is arranged to interconnect floor 20 and bottom portion 24 of side wall 18. In the illustrative embodiment, brim 16, side wall 18, and support structure 19 are formed from a unitary body blank 500 shown in FIG. 12. Insulative cup 10 is an assembly comprising the body blank 500 and the floor 20. As an example, floor 20 is mated with bottom portion 24 during cup-manufacturing process 40 to form a primary seal therebetween. A secondary seal may also be established between support structure 19 and floor 20. An insulative container may be formed with only the primary seal, only the secondary seal, or both the primary and secondary seals.

Referring again to FIG. 1, top portion 22 of side wall 18 is arranged to extend in a downward direction 28 toward floor 20 and is coupled to bottom portion 24. Bottom portion 24 is arranged to extend in an opposite upward direction 30 toward rolled brim 16. Top portion 22 is curled during cup-manufacturing process 40 to form rolled brim 16. Rolled brim 16 and top portion 22 cooperate to form a mouth 32 that is arranged to open into interior region 14.

Support structure 19 includes a floor-retaining flange 26 and a connecting web 25 as shown in FIG. 3. Connecting web 25 is coupled to bottom portion 24 of side wall 18 and arranged to extend radially away from bottom portion 24 toward interior region 14. Floor-retaining flange 26 is coupled to connecting web 25 and is arranged to extend in upward direction 30 toward floor 20 and interior region 14. Together, floor-retaining flange 26, connecting web 25, and bottom portion 24 cooperate to define receiving well 27 therebetween. As suggested in FIG. 3, a portion of floor 20 is arranged to extend downwardly into receiving well 27 and be retained between floor-retaining flange 26 and bottom portion 24. In the illustrative embodiment of FIG. 3, platform-support member 23 of floor 20 extends completely into receiving well 27 and contacts connecting web 25.

Figure 36:
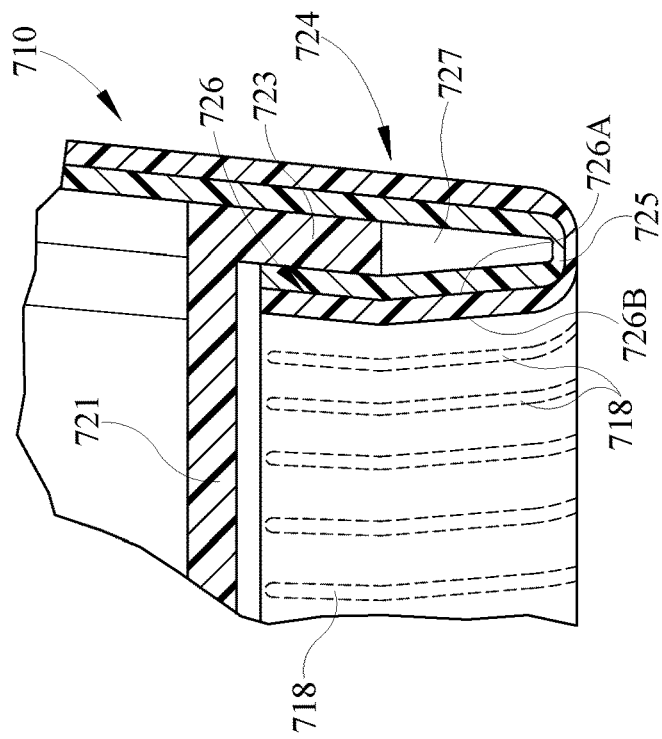
FIG. 36 is an enlarged partial elevation view of the floor similar to FIG. 35 showing the floor mating with a floor mount included in the insulative cup and that the channels are spaced apart from one another, the connecting web, and the floor.
Figure 35:
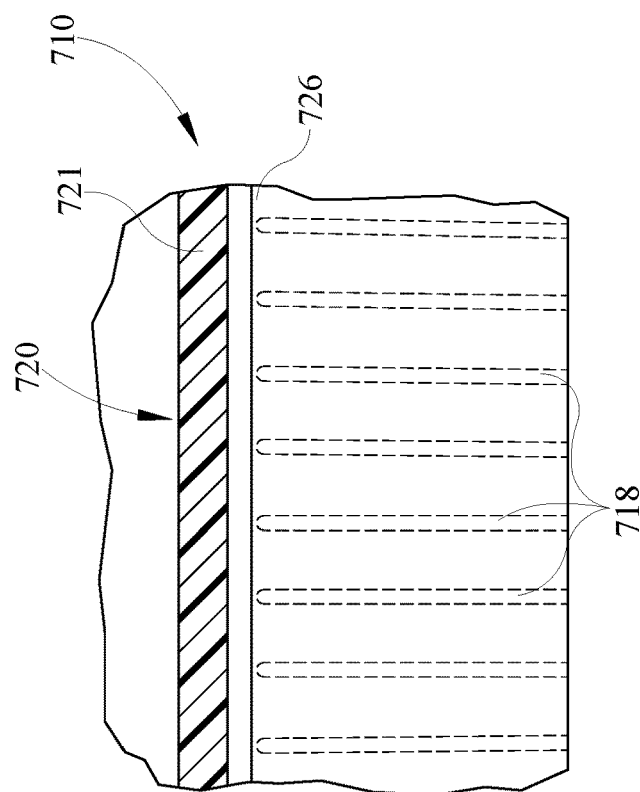
FIG. 35 is an enlarged partial elevation view of another embodiment of an insulative cup in accordance with the present disclosure showing a fourth region of localized plastic deformation in which channels are formed in an inner periphery of the floor-retaining flange so that the channels are hidden when the insulative cup is assembled.

In another embodiment shown in FIGS. 35 and 36, a cup 710 is similar to insulative cup 10, but a floor 720 includes a floor platform 721 and a floor ring 723 that is shorter than platform-support member 23 of insulative cup 10. Floor ring 723 does not extend completely into a receiving well 727 formed between a retaining flange 726, connecting web 725, and bottom portion 724. This approach allows floor 720 to be positioned during the cup-manufacturing process 40 without need for closely holding the dimensional length of floor ring 723 and reducing the chance for interference during cup-manufacturing process 40.

As shown in FIGS. 1, 2, 3C, and 9, floor 20 includes horizontal platform 21 and a platform-support member 23. Horizontal platform 21 is, for example, a flat round disc which cooperates with side wall 18 to define interior region 14 therebetween. Platform-support member 23 is coupled to a perimeter of horizontal platform 21 and is arranged to extend in downward direction 28 away from horizontal platform 21 toward and into receiving well 27. As a result, horizontal platform 21 is spaced apart from any surface on which insulative cup 10 rests.

The compressibility of the insulative cellular non-aromatic polymeric material used in accordance with the present disclosure to produce insulative cup 10 allows the insulative cellular non-aromatic polymeric material to be prepared for the mechanical assembly of insulative cup 10, without limitations experienced by other polymeric materials. The cellular nature of the insulative cellular non-aromatic polymeric material disclosed herein provides insulative characteristics as discussed below, while susceptibility to plastic deformation permits yielding of the insulative cellular non-aromatic polymeric material without fracture. The plastic deformation experienced when the strip of insulative cellular non-aromatic polymeric material is subjected to a pressure load is used to form a permanent set in the insulative cellular non-aromatic polymeric material after the pressure load has been removed. In some locations, the locations of permanent set are positioned in illustrative embodiments to provide, for example, controlled gathering of the insulative cellular non-aromatic polymeric material.

Figure 5:
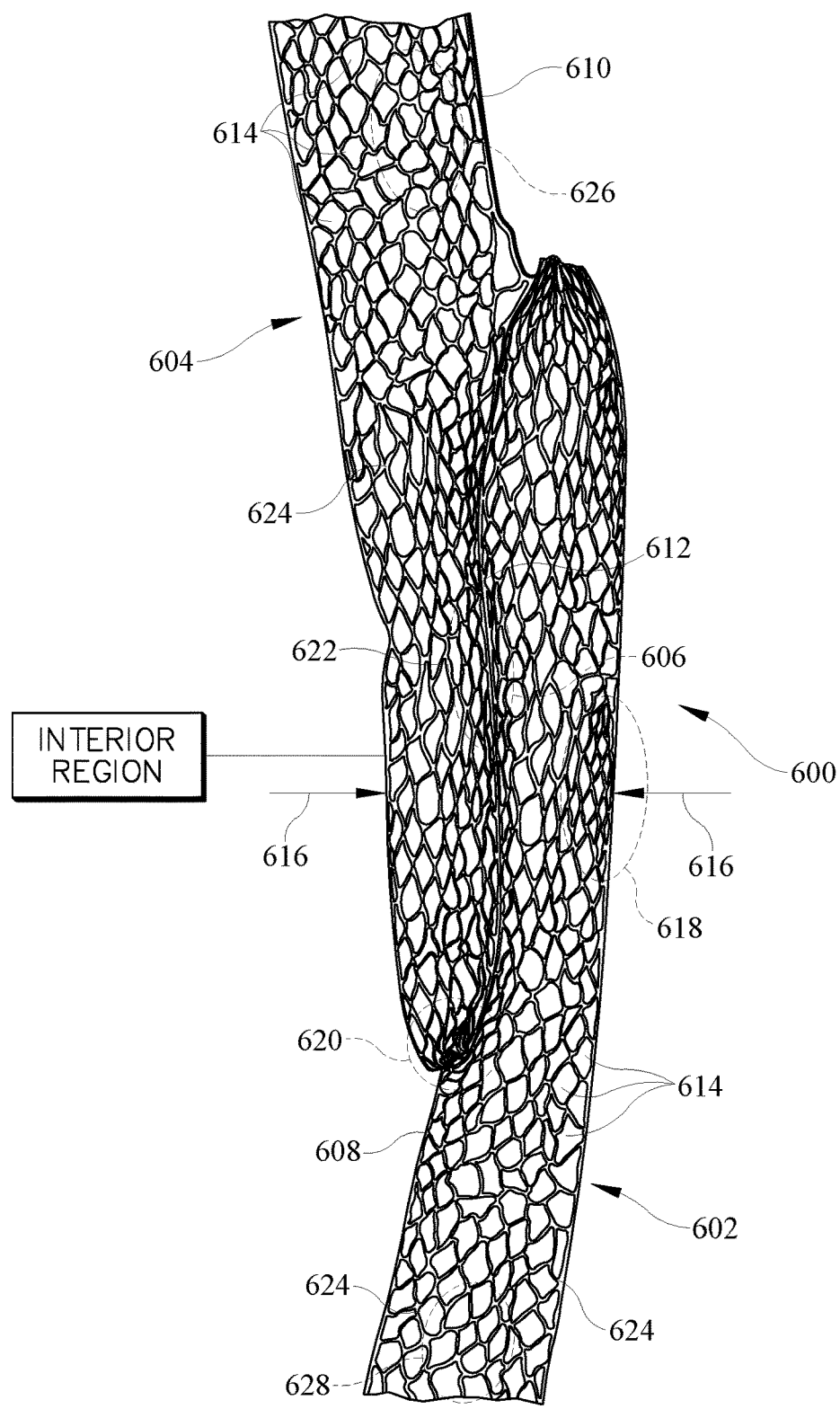
FIG. 5 is an enlarged view similar to FIG. 4A.

Plastic deformation may also be used to create fold lines in the insulative cellular non-aromatic polymeric material to control deformation of the material when being worked during a cup assembly process. When deformation is present the absence of material in the voids formed by the deformation provides relief to allow the material to be folded easily at the locations of deformation. Referring now to FIGS. 4A and 5, an exemplary joint 600 between two portions 602 and 604 of insulative cellular non-aromatic polymeric material includes an interface 606. Interface 606 includes contact between a surface 608 of portion 602 and a surface 610 of portion 604, where the surfaces have adhered to one another to create a seal and a mechanical interlock between portions 602 and 604. The interface includes a melt line 612 where the non-aromatic polymeric material of each portion 602 and 604 have commingled to secure to one another.

Portion 602 illustratively includes a structure of cells 614 that are enclosed by a non-aromatic polymeric material 624 with the cells 614 closed to encapsulate a blowing agent comprising a gas such as $CO_2$, for example. When pressure is applied at a location 616, localized areas 618, 620, 622 of reduced cell size are created as the cells 614 are reduced in size and the non-aromatic polymeric material 624 flows to alter the shape of the cells 614. The flow of non-aromatic polymeric material 624 results in more non-aromatic polymeric material 624 being contained within a unit of volume than in undeformed areas such as areas 626 and 628, for example. Thus, when a sufficient load is applied, the thickness of the insulative cellular non-aromatic polymeric material is reduced and the density in localized areas is increased.

In some instances, plastic deformation is achieved with a combination of force and heat. Heating the insulative cellular non-aromatic polymeric material may reduce the force necessary to deform the material. Localized heating results in softening that permits plastic flow, at lower forces, to accomplish the desirable permanent set. This permits deformation of the cells to achieve a thinner, denser material in localized areas in the insulative cellular non-aromatic polymeric material.

In one illustrative embodiment, the present disclosure provides a strip 652 of insulative cellular non-aromatic polymeric material having predominantly closed cells 614 dispersed in the insulative cellular non-aromatic polymeric material 624 that exhibits unexpected, desirable physical properties at a given material thickness. Such properties include, for example, insulative properties, strength/rigidity properties, and puncture resistance properties. The illustrative material may be provided in a form such as, for example, an insulative cellular non-aromatic polymeric material sheet, strip, tube, thread, pellet, granule or other structure that is the result of extrusion of a polymer-based formulation, as herein described, through an extruder die. As described herein, an insulative cellular non-aromatic polymeric material may be mated with a biaxially oriented polypropylene film (i.e., film produced via a sequential biaxial stretching process involving two consecutive stretching steps conducted at two different temperatures) to establish a laminated sheet as well as a variety of final products such as cups or insulative containers, wraps, wound rolls of material, and the like.

In one embodiment shown in FIG. 37, sheet 650 includes insulative cellular non-aromatic polymeric material 652 and a skin including a film 658, an ink layer 656, and an adhesive layer 654. As an example, ink layer 656 may be printed on film 658 prior to adhering the skin to insulative cellular non-aromatic polymeric material 652. In the illustrative embodiment of FIG. 37, film 658 comprises biaxially oriented polypropylene film.

In another embodiment shown in FIG. 38, a sheet 660 is similar to sheet 650, but includes adhesive layer 654, ink layer 656, and film 658 on both sides of a strip of insulative cellular non-aromatic polymeric material 652. In other embodiments, ink layer(s) 656 may be omitted on one or both sides.

In illustrative embodiments, an insulative cup is assembled from components that are formed from a material that is insulative. The insulative material includes a cellular non-aromatic polymeric structure that is tough and rigid. The insulative cellular non-aromatic polymeric material is deformable plastically under pressure load such that the material takes a permanent set after the pressure load has been removed to create structural features facilitating formation of the insulative cup. In some embodiments, orderly gathering of the material when folded or deformed is facilitated by the structure of the insulative cellular non-aromatic material. In illustrative embodiments, the insulative cellular non-aromatic polymeric material is flexible to permit the cup to be used in sub-freezing temperatures without fracturing the material. As used herein, the term non-aromatic polymer refers to a polymer that is devoid of aromatic ring structures (e.g., phenyl groups) in its polymer chain.

Aromatic molecules typically display enhanced hydrophobicity when compared to non-aromatic molecules. As a result, it would be expected that changing from a polystyrene-based insulative cellular polymeric material to a polypropylene-based insulative cellular polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based insulative cellular polymeric materials would be found in another aromatic polymer rather than in a non-aromatic polymer.

In illustrative embodiments, the insulative cellular non-aromatic polymeric material is used as a substrate in a composite sheet that includes a film laminated to the insulative cellular non-aromatic polymeric material. The film is reverse printed before being laminated to the substrate so that the printing is visible through the film, with the film forming a protective cover over the printing.

In illustrative embodiments, the insulative cellular non-aromatic polymeric material may includes one or more polypropylene materials as a base material. The laminated film is also polypropylene so that the entire cup may be ground up and re-used in the same process.

Illustratively, in one exemplary embodiment, an insulative cellular non-aromatic polymeric material may be polypropylene-based and may be formed from a composition comprising (a) a first material comprising at least one high melt strength polypropylene resin; (b) a second material comprising at least one polypropylene resin selected from the group consisting of impact copolymers and high crystalline homopolymers; (c) at least one nucleating agent; (d) a blowing agent; and (e) a slip agent.

In one illustrative aspect, a polypropylene-based insulative cellular non-aromatic polymeric material comprises a high melt strength polypropylene as a first material or base polymer resin. Melt strength, i.e., maximum drawdown force in a tensile experiment, is essentially non-existent for linear polypropylene. Melt strength is significantly increased, however, by the presence of long-chain branching. The resulting high melt strength polypropylene, which contains long-chain branches, provides a balance of processability and high melt elasticity required for foaming, thermoforming, and extrusion processes.

Suitable high melt strength polypropylenes have desirable gas retention properties, and impart desirable cell size and smooth surface finish to an insulative cellular non-aromatic polymer material, while also having an acceptable odor, if any. One illustrative example of a suitable high melt strength polypropylene resin is DAPLOY™ WB140 polypropylene homopolymer (available from Borealis A/S):

| Property | Typical Value | Unit | Test Method |
|---|---|---|---|
| Melt Strength | 36 | cN | ISO 16790 |
| Melt Temperature | 163 | ° C. | ISO 11357 |
| Melt Flow Rate (230/2.16) | 2.1 | g/10 min | ISO 1133 |
| Flexural Modulus | 1900 | MPa | ISO 178 |
| Tensile Strength at Yield | 40 | MPa | ISO 527-2 |
| Elongation at Yield | 6 | % | ISO 527-2 |
| Tensile Modulus | 2000 | MPa | ISO 527-2 |
| Charpy impact strength, notched (+23° C.) | 3.0 | kJ/m$^2$ | ISO 179/1eA |
| Charpy impact strength, notched (−20° C.) | 1.0 | kJ/m$^2$ | ISO 179/1eA |
| Heat Deflection Temperature A | 60 | ° C. | ISO 75-2 |
| Heat Deflection Temperature B | 110 | ° C. | ISO 75-2 |

In another illustrative aspect, a polypropylene-based insulative cellular non-aromatic polymeric material comprises a secondary polymer resin that is used in combination with the base polymer resin. The secondary polymer may be, for example, an impact polypropylene copolymer, a high crystalline polypropylene homopolymer, or the like as well as mixtures thereof. One illustrative example of an impact polypropylene copolymer is a resin commercially available as PRO-FAX SC204™ (available from LyndellBasell Industries Holdings, B.V.). Exemplary homopolymers include, but are not limited to, Homo PP-INSPIRE 222, available from Braskem, and high crystalline polypropylene homopolymer, available as F020HC from Braskem. Several different secondary polymers may be used and mixed together.

In certain alternative exemplary embodiments, the secondary polymer may be polyethylene, low density polyethylene, linear low density polyethylene, high density polyethylene, ethylene-vinyl acetate copolymers, ethylene-ethylacrylate copolymers, ethylene-acrylic acid copolymers, and like polymers. However, the use of non-polypropylene resin materials may affect recyclability, insulation, microwavability, impact resistance, and/or other properties of the resulting insulative cellular non-aromatic polymeric material.

In another illustrative aspect, a polypropylene-based insulative cellular non-aromatic polymeric material comprises at least one nucleating agent. One or more nucleating agents are used to provide and control nucleation sites to promote formation of bubbles, voids or cells in the molten resin during an extrusion process. Suitable nucleating agents will have desirable particle size, aspect ratio and top-cut properties. Examples include, but are not limited to, talc, $CaCO_3$, mica and mixtures of at least two of the foregoing.

In another illustrative aspect, a polypropylene-based insulative cellular non-aromatic polymeric material comprises a blowing agent. Blowing agents introduce gas that expands cells in the resin mixture. Nucleating agents, in comparison, facilitate the formation of cells by providing sites at which bubbles can form. As such, nucleating agents and blowing agents work together to provide a cell-forming agent. Blowing agents act to reduce density by expanding cells in the molten resin. Blowing agents may be physical or chemical agents. Physical blowing agents are typically gases that are introduced into the molten resin via a port in the extruder. Representative examples of gaseous blowing agents include, but are not limited to, carbon dioxide, nitrogen, pentane, butane or other alkanes, mixtures of gases and the like. Alternatively, the gas may be a hydrofluorocarbon, such as 1,1,1,2-tetrafluoroethane, also known as R134a, or other haloalkane refrigerant. Selection of the blowing agent may be made to take environmental impact into consideration.

Chemical blowing agents degrade or react at a particular temperature to decompose and produce a gas. Chemical blowing agents may be endothermic or exothermic. One illustrative example of an endothermic chemical blowing agent is citric acid or a citric acid-based material. One representative example is Hydrocerol™ CF-40E™ (available from Clariant Corporation). Additional illustrative examples of chemical blowing agents include, but are not limited to, azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; carbon dioxide; nitrogen; argon; water; air; nitrogen; helium; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

In another illustrative aspect, a polypropylene-based insulative cellular non-aromatic polymeric material comprises a slip agent. Slip agent is a term used to describe a general class of materials that are added to a resin mixture to reduce or eliminate so-called die drool. Representative examples of slip agent materials include fats or fatty acids, such as erucamide and oleamide. Combinations of two or more slip agents can be used.

Illustratively, a polypropylene-based insulative cellular non-aromatic polymeric material may be formed as an insulative cellular non-aromatic polymeric material sheet by a process comprising (a) providing a first material comprising at least one high melt strength polypropylene resin; (b) providing a second material comprising at least one polypropylene resin selected from the group consisting of impact copolymers and high crystalline homopolymers; (c) mixing the first and second resins to form a resin mixture; (d) adding to the resin mixture at least one nucleating agent; (e) adding to the resin mixture a slip agent; (f) adding to the resin mixture an inert gas as a blowing agent; (g) extruding the resin mixture to form an insulative cellular non-aromatic polymer material mixture having cells therein; and (h) forming a strip of the insulative cellular non-aromatic polymer material mixture.

In one illustrative aspect, an exemplary polypropylene-based insulative cellular non-aromatic polymeric material formed as an insulative cellular non-aromatic polymeric material sheet may have a thickness ranging from about 60 mil to about 80 mil. In another illustrative aspect, an exemplary polypropylene-based insulative cellular non-aromatic polymeric material formed as an insulative cellular non-aromatic polymeric material sheet may have a density ranging from about 0.15 g/cm$^3$ to about 0.20 g/cm$^3$. The insulative cellular non-aromatic polymeric material is used in cup-manufacturing process 40 to produce insulative cup 10 having a region of localized plastic deformation. The region of localized plastic deformation may be the result of compressing the insulative cellular non-aromatic polymeric material. The region of localized plastic deformation has a first density in a range of about 0.3 g/cm$^3$ to about 0.4 g/cm$^3$. The insulative cellular non-aromatic polymeric material surrounding the region of localized plastic deformation is uncompressed and has a second density in a range of about 0.15 g/cm$^3$ to about 0.20 g/cm$^3$.

Figure 10:
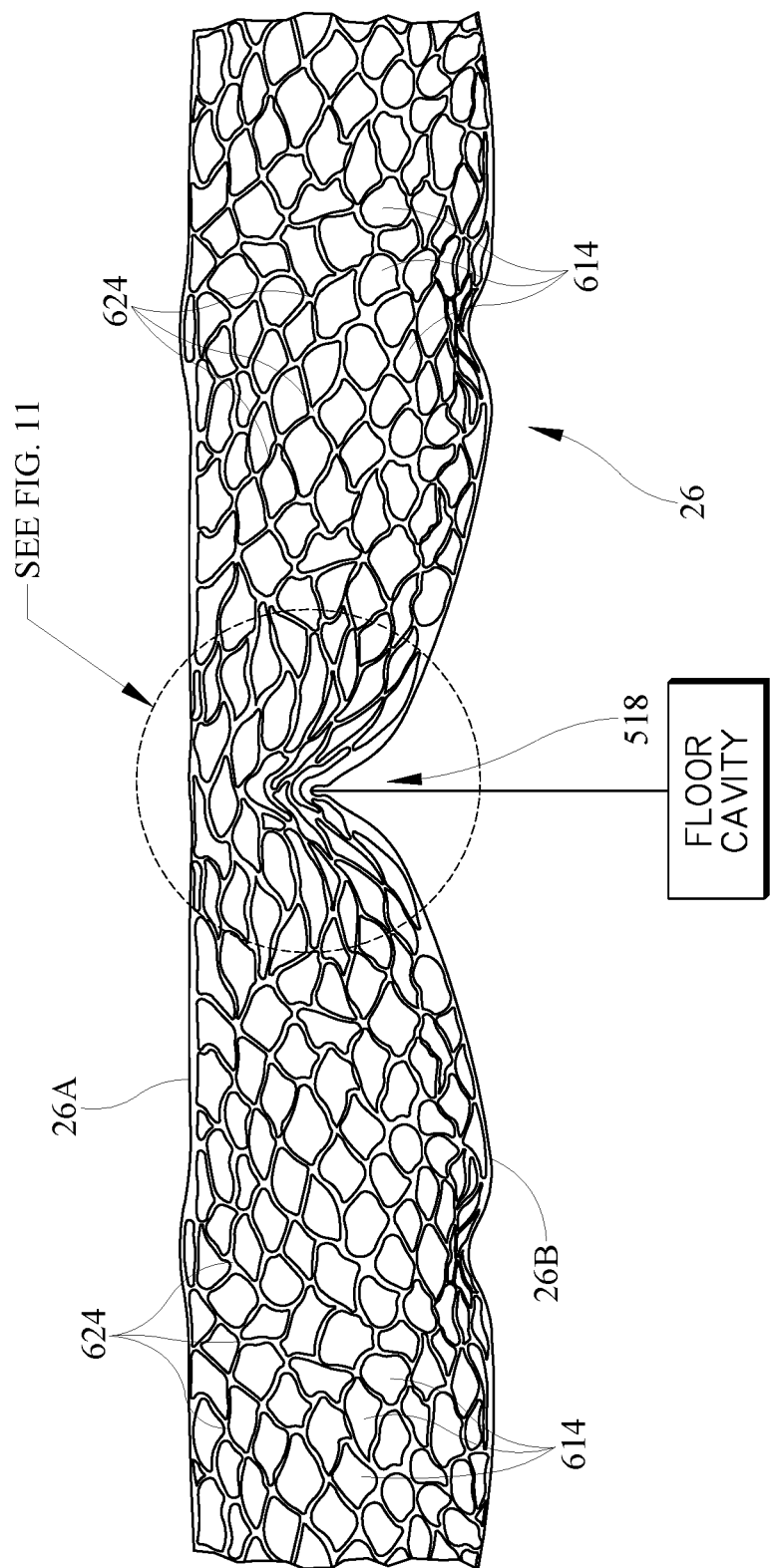
FIG. 10 is an enlarged view similar to FIG. 9B.
Figure 11:
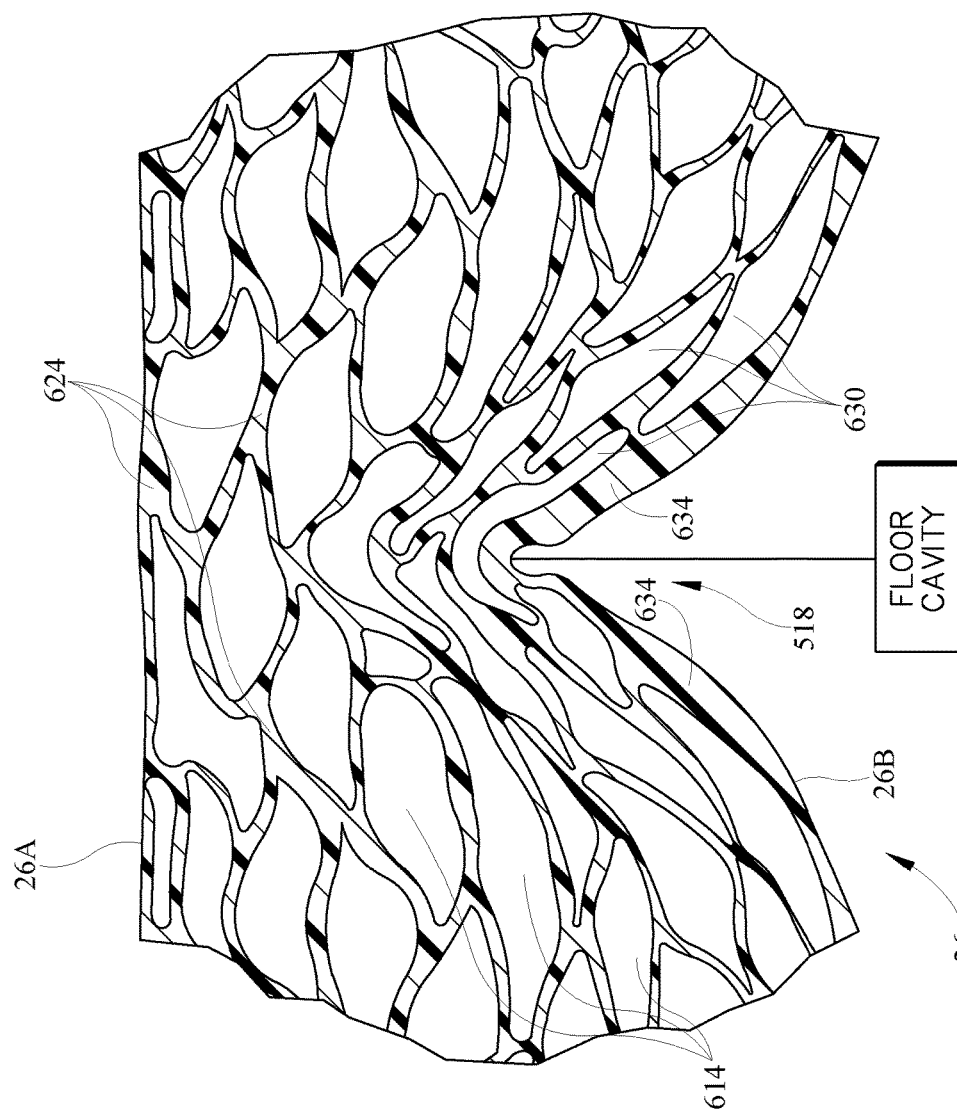
FIG. 11 is an enlarged view of the channel of FIG. 10 showing that the insulative cellular non-aromatic polymeric material is formed to include cells filled with gas, that each cell is bounded by a cell wall that is shared with neighboring cells, and that the cell walls are deformed during a cup-forming process suggested in FIGS. 15-19 to cause density to be increased in the area of localized plastic deformation.

As suggested in FIGS. 10 and 11, the density of the insulative cellular non-aromatic polymeric material is indirectly proportional to the change in thickness of the material. As an example, if the material thickness is reduced by half, then the density in the compressed area would about double.

In another illustrative aspect, an exemplary polypropylene-based insulative cellular non-aromatic polymeric material formed as a strip of insulative cellular non-aromatic polymeric material may have tensile strength in the machine direction and cross direction ranging from about 4.0 MPa to about 7.0 MPa and from about 3.0 MPa to about 6.0 MPa, respectively. In another illustrative aspect, an exemplary polypropylene-based insulative cellular non-aromatic polymeric material formed as a strip of insulative cellular non-aromatic polymeric material may have an elastic modulus in the machine direction and cross direction ranging from about 160 MPa to about 240 MPa and from about 120 MPa to about 170 MPa, respectively.

In another illustrative aspect, an exemplary insulative cellular non-aromatic polymeric material formed as a strip of insulative cellular non-aromatic polymer material may have cells in the shape of oriented, stretched ovals. In another illustrative aspect, an exemplary polypropylene-based insulative cellular non-aromatic polymeric material formed as a strip of insulative cellular non-aromatic polymeric material may average cell dimensions in machine direction 67 of about 0.0362 inches (0.92 mm) in width by 0.0106 inches (0.27 mm) in height, resulting in a machine direction cell size aspect ratio of about 3.5. The average cell dimensions in cross direction or transverse to machine direction 67 are about 0.0204 inches (0.52 mm) in width and about 0.0106 inches (0.27 mm) in height, resulting in a cross direction cell size aspect ration of 1.94. As a result, the aspect ratio of foam cells is between about 1.0 and 3.0. In another example, the aspect ratio of foam cells is between about 1.0 and about 2.0.

Strip 82 of insulative cellular non-aromatic polymeric material is used form insulative cup 10. Insulative cup 10 includes, for example body 11 and floor 20 as shown in FIG. 1. Body 11 includes side wall 18 and floor mount 17 which is coupled to floor 20 to support floor 20 in a stationary position relative to sleeve-shaped side wall 18. Floor mount 17 includes floor-retaining flange 26 coupled to floor 20, web-support ring 126 coupled to the lower end of sleeve-shaped side wall 18 and arranged to surround floor-retaining flange 26, and connecting web 25 arranged to interconnect floor-retaining flange 26 and web-support ring 126 as suggested in FIG. 3C.

Figure 12B:
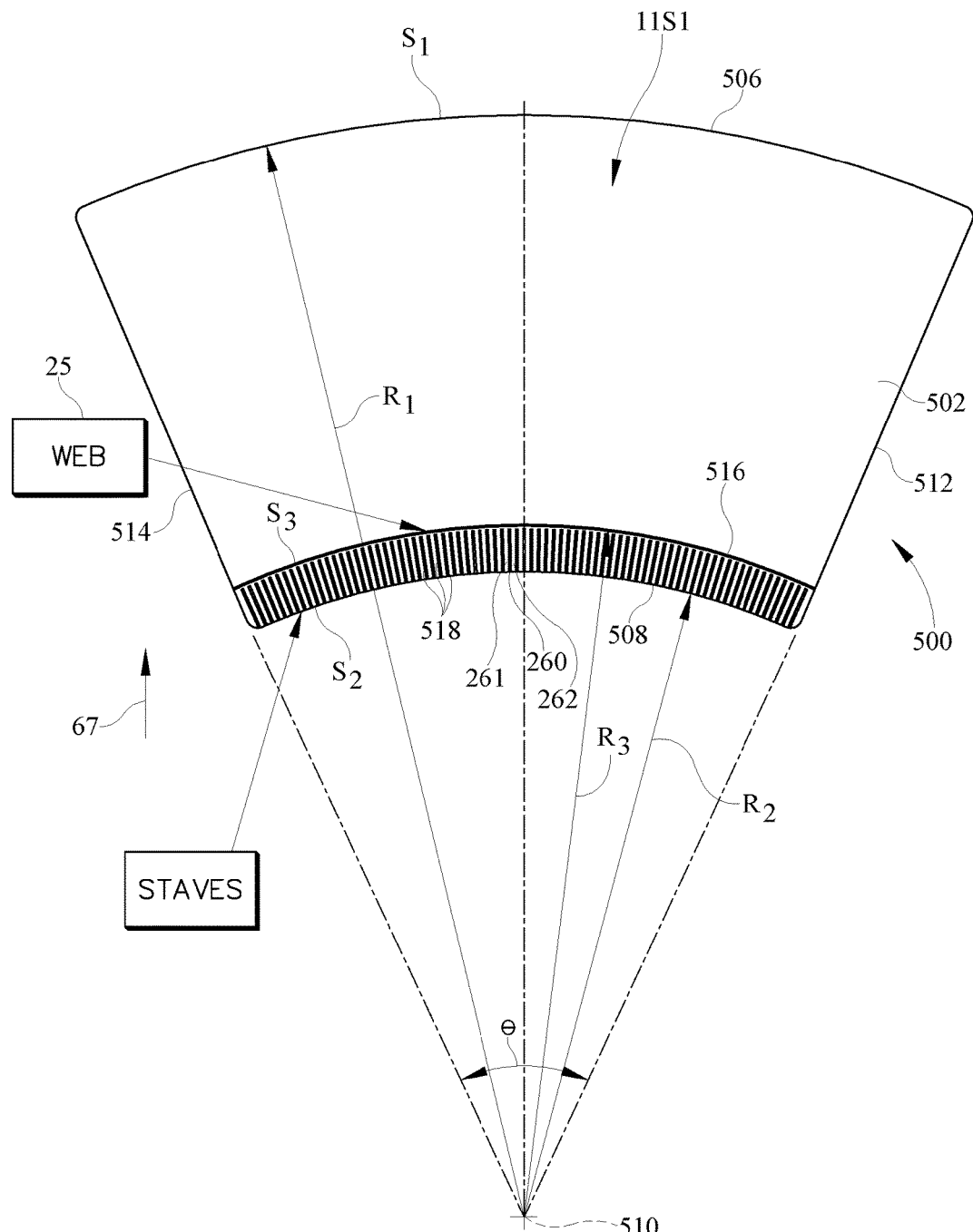
FIG. 12B is a view similar to FIG. 12A after the blank forming process has been performed showing that both the connecting web and the staves have been formed in the body blank.
Figure 12C:
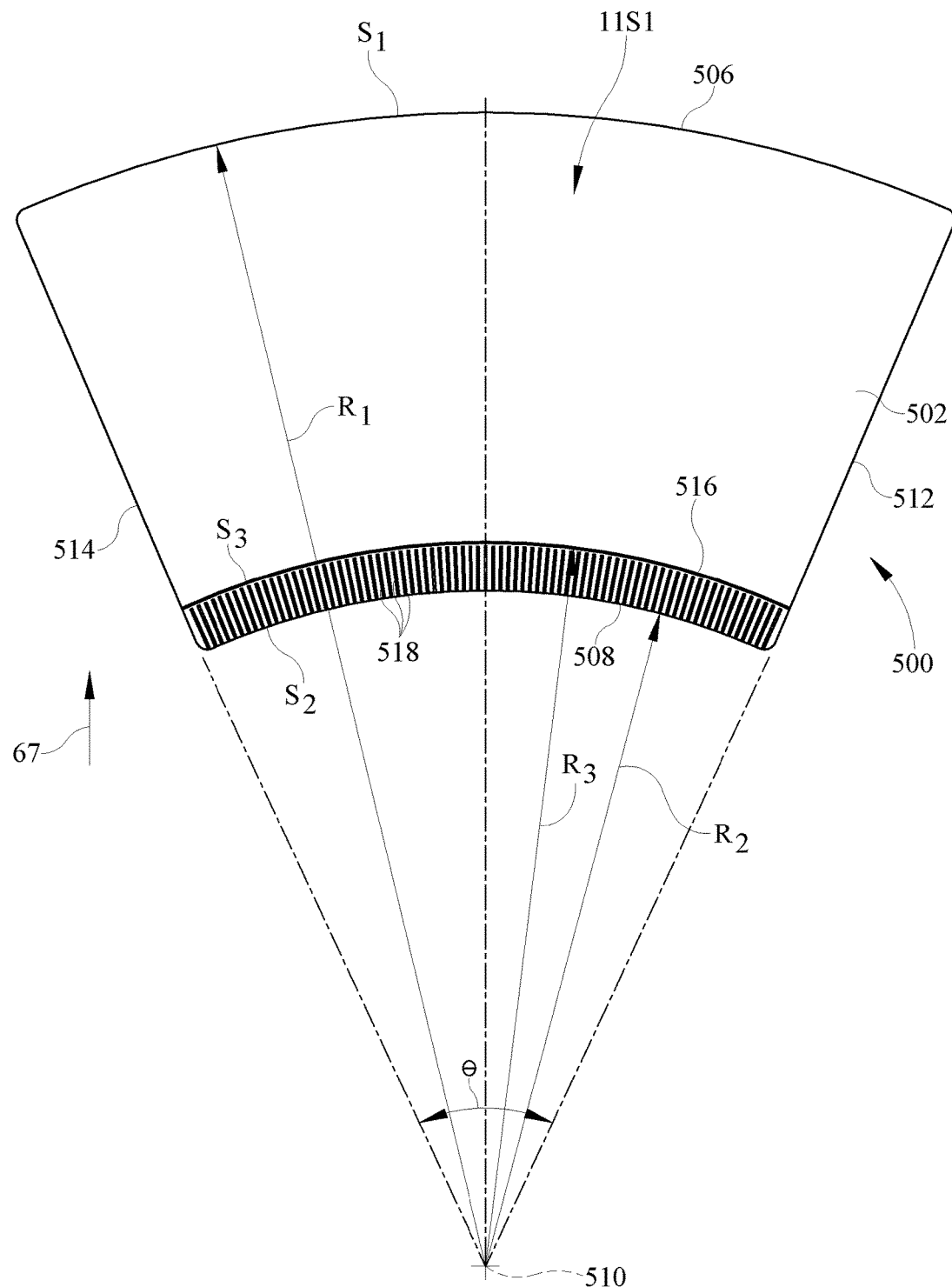
FIG. 12C is a plan view of another embodiment of a body blank in accordance with the present disclosure showing that the body blank is formed from a sheet that includes only insulative cellular non-aromatic polymeric material.

As shown in FIG. 7, floor-retaining flange 26 includes an inner surface 26A and an outer surface 26B. Inner surface 26A is arranged to face toward platform-support member 23 and outer surface 26B is arranged to face opposite inner surface 26A. Floor-retaining flange 26 is further formed to include a series of spaced-apart depressions 518 formed in outer surface 26B. As an example, each depression 518 is linear having a longitudinal axis that overlies a ray emanating from a center 510 as shown in FIG. 12. In another example, depressions may be angular, diamond shaped, or one or more combinations thereof.

The resultant effect of the formation of depressions 518 on the insulative cellular non-aromatic polymeric material is shown in FIGS. 9B, 10, 11, and 14. Depressions 518 are formed in surface 26B and some cells 630 are reduced as the insulative cellular non-aromatic polymeric material is worked so that the insulative cellular non-aromatic polymeric material takes a permanent set to form the depressions 518. The material 624 flows in the area of material flow such that cell walls 632 of cells 630 are thinned while the skin 634 thickens in some areas. In the illustrative embodiment of FIGS. 10 and 11, the tool forming depressions 518 has been heated so that there is some melting of the material 624 which causes the flow to thickened areas 634.

Figure 16:
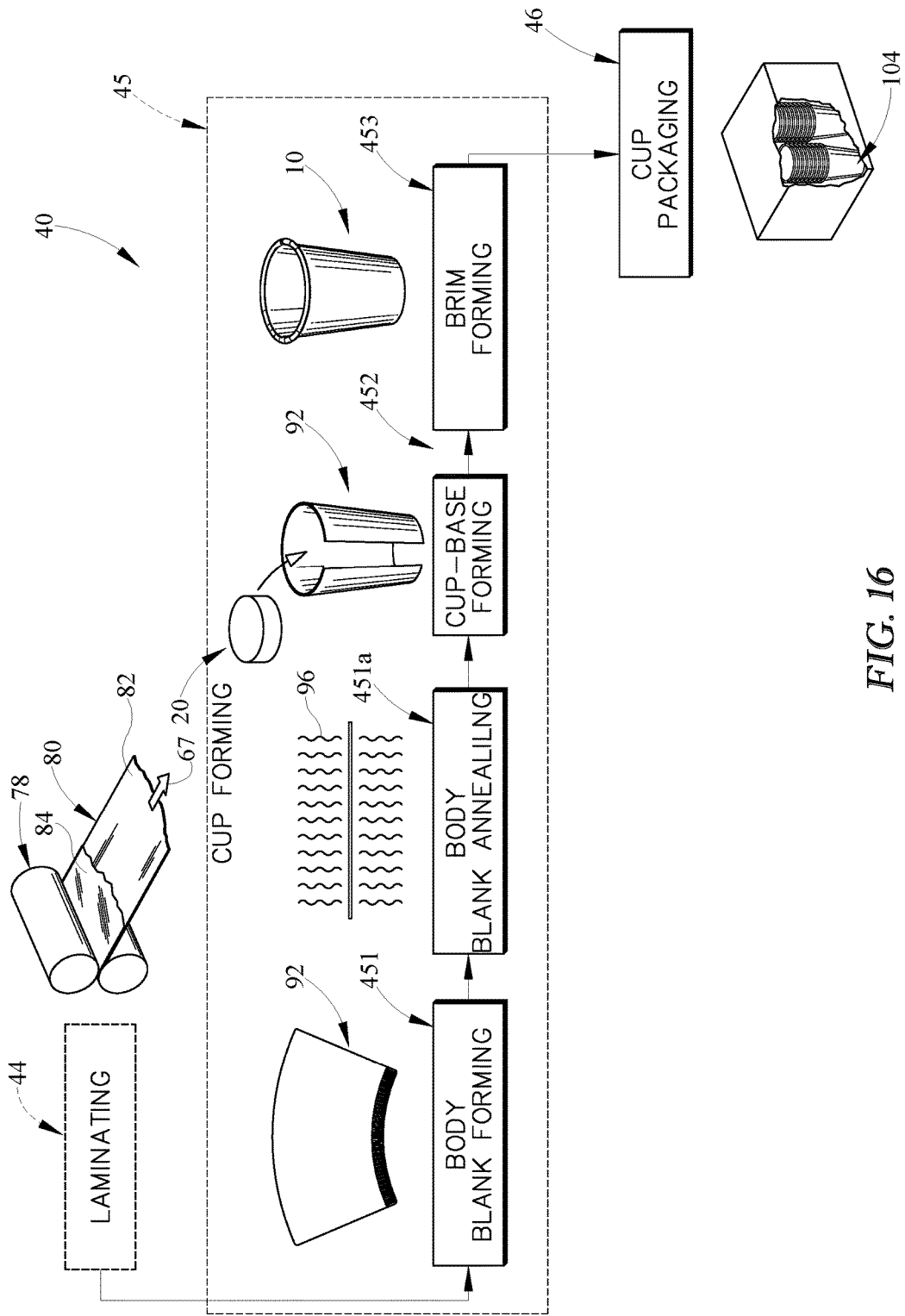
FIG. 16 is a perspective and diagrammatic view of a cup-manufacturing process in accordance with the present disclosure showing that the cup-manufacturing process includes providing a laminated roll of laminated sheet, forming an insulative cup as suggested in detail in FIGS. 17-19, and packaging stacks of insulative cups as suggested in detail in FIG. 20 and showing that forming an insulative cup includes the steps of forming a body blank as suggested in detail in FIG. 17, annealing the body blank, forming a cup base as suggested in detail in FIG. 18, and forming a rolled brim as suggested in detail in FIG. 19.

As shown in FIGS. 1, 2, and 3-3C, side wall 18 is formed to include a side wall seam 34 during an exemplary embodiment of cup-manufacturing process 40 illustrated in FIG. 16. Side wall 18 has a first wall thickness T1 which is present in both bottom portion 24 and retaining flange 26. Side wall 18 has a second wall thickness T2 which is present at side wall seam 34. As shown in FIG. 6, thickness T2 is about equal thickness T1 as a result of compression of edges (inner and outer tabs) 514, 512 (seen in FIG. 12) during cup-manufacturing process 40. As a result, each tab 514, 512 has a third wall thickness T3 which is about 50% of thicknesses T1, T2. Connecting web 25 also has an illustrative third wall thickness T3 as a result of compression during cup-manufacturing process 40. The connecting web 25 may have a different thickness, other than thickness T3, in some embodiments. For example, the extent of the compression of connecting web 25 may be different than the extent of the compression of edges 512 and 514. Likewise, the extent of compression of one or the other of edges 512 and 514 may be different, depending on application requirements.

In another exemplary embodiment, the side wall is not compressed about the first and second edges. As a result, a thickness T2 may be greater than thickness T1. In one example where compression does not occur, thickness T2 may be about twice thickness T1.

In another exemplary embodiment, just one edge is compressed. Further, in another embodiment, a portion of one or both edges is compressed.

Side wall seam 34 continues up base 12 and into rolled brim 16 as shown in FIGS. 3 and 3B. As a result, rolled brim 16 has a first brim dimension B1 and a relatively equal second brim dimension B2 at the side wall seam 34. The thickness of the material at the brim B3 is about equal to both first wall thickness T1 and second wall thickness T2. As shown in FIG. 6, brim dimension B2 is about equal to brim dimension B1 as a result of compression of first and second edges 512, 514 during cup-manufacturing process 40. As a result, each edge 512, 514 in rolled brim 16 has a third brim thickness B3 which is about 50% of thicknesses B1, B2.

Figure 6A:
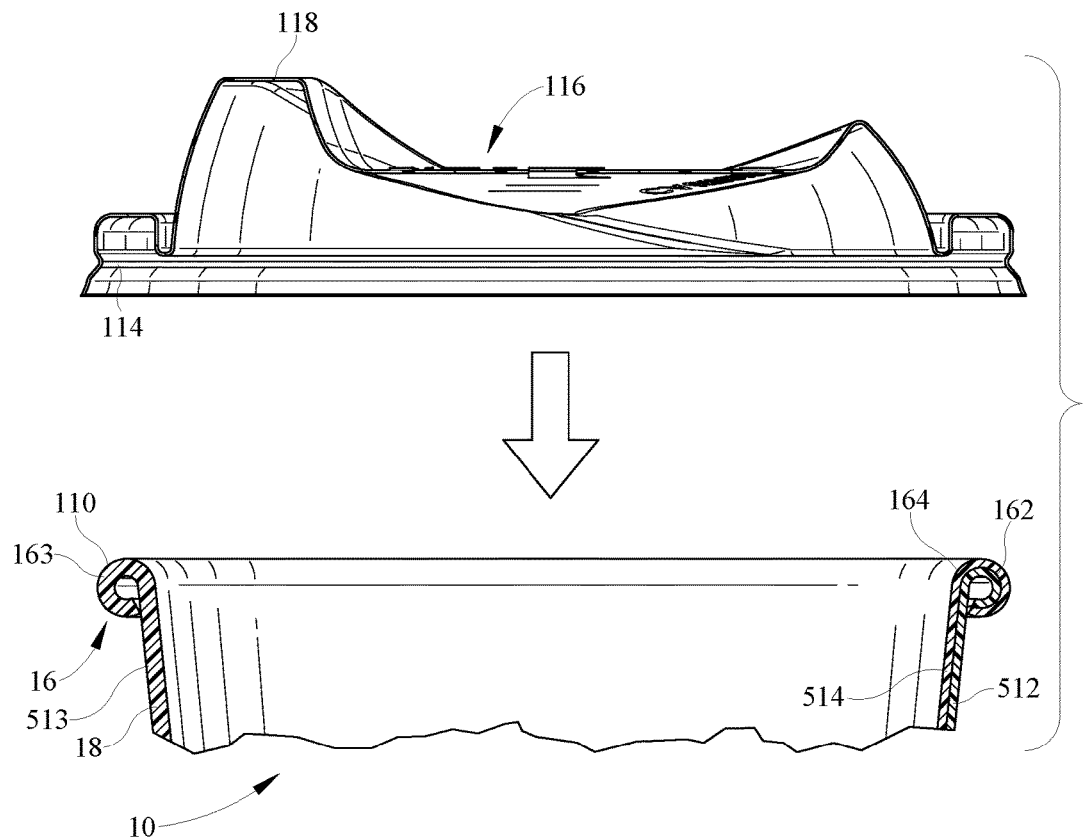
FIG. 6A is a partial sectional view of a combination of the insulative cup of FIG. 1 and a lid showing that the lid includes a rim that mates with the rolled brim of the insulative cup as suggested in FIG. 6B.
Figure 6B:
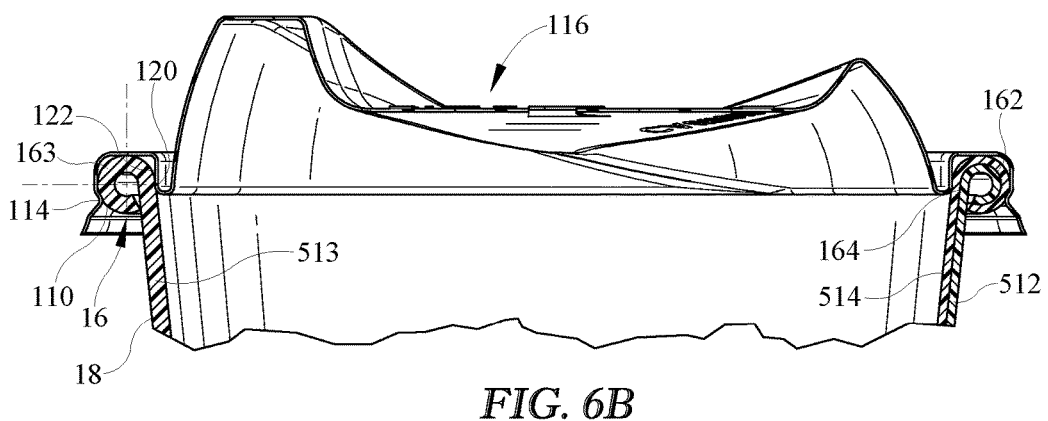
FIG. 6B is a partial sectional view of the lid and insulative cup of FIG. 5 with the lid mated to the cup so that the rim of the lid engages the rolled brim of the insulative cup to close a mouth opening into the interior region.

The compression of first and second edges 512, 514 permits brim dimension B2 to match brim dimension B1, regardless of the brim geometry. As will be discussed in further detail below, the shape of the brim may vary from the geometry of brim 16 in other embodiments. Brim 16 is configured to serve as both a drinking brim and a sealing brim. As seen in FIG. 6, an inner surface 108 of side wall 18 tangentially intersects an outer diameter 110 of brim 16 at a point 112 while an outer surface 106 terminates at brim 16. Transition point 112 provides a smooth transition for a flow of liquid if a user were to drink from insulative cup 10, without spilling or disrupting flow over brim 16. Referring now to FIGS. 6A and 6B, brim 16 also serves to cooperate with a retainer 114 of a lid 116 to secure lid 116 to insulative cup 10 with a liquid seal so that a user may use a drinking spout 118 of lid 116 without having liquid escape between lid 116 and brim 16. Retainer 114 snaps over and engages diameter 110 of brim 16 so that a flange 122 of lid 116 engages diameter 110 at a point 120 to seal lid 116 to insulative cup 10.

Alternative embodiments of a rolled brim are disclosed in FIGS. 32-34 and each embodiment may be substituted for rolled brim 16. For example, rolled brim 16A shown in FIG. 32 has a constant thickness of insulative cellular non-aromatic polymeric material with dimensions $X_1$, $X_2$, and $X_3$ being generally equal, but with a brim thickness B4 that is greater than the brim thickness B1 of insulative cup 10. A larger brim thickness B4 provides clearance in the interior space 900 of brim 16A, improving the manufacturability of brim 16A by allowing clearance during brim rolling.

A rolled brim 16B has wall thickness $X_1$ that is reduced and thinned during the brim rolling process that results in a reduction at $X_2$ and a further reduction at $X_3$ as shown in FIG. 33. Brim 16B is relatively easier to manufacture than brim 16A and provides a brim with a brim thickness B5 that is approximately the same as brim thickness B4, but has a brim height B6 that is larger than B5. This results in additional relief in an interior space 904 of brim 16B. Brim 16B is more suitable for use with lids by providing additional contact area for sealing.

In still another embodiment, rolled brim 16C approximates a solid brim with a first wall dimension $X_1$ that is reduced to $X_2$, further reduced at $X_3$, and rolled about itself at $X_4$ and $X_5$ as shown in FIG. 34. With heating and or compression, brim 16C provides a solid brim structure with a high rigidity due to the lack of relief in an interior space of brim 16C. Such a brim is suitable for drinking and provides a rigidity that assists with maintaining a snap fit lid, such as lid 116 in place during use. In the embodiment of FIG. 34, the brim thickness B7 is approximately equal to brim thickness B1 in insulative cup 10.

Figure 13:
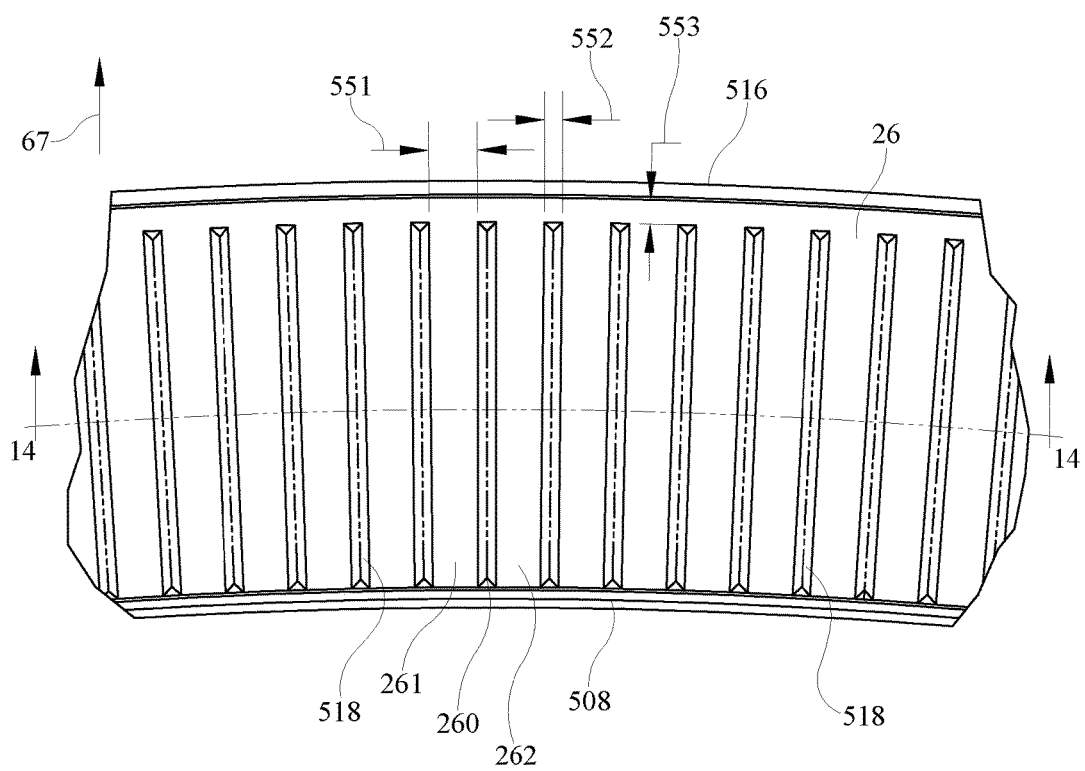
FIG. 13 is an enlarged partial plan view of the side-wall blank of FIG. 12B showing the arcuate fold line and alternating thick and thin staves which cooperate to define channels in the floor-retaining flange.
Figure 14:
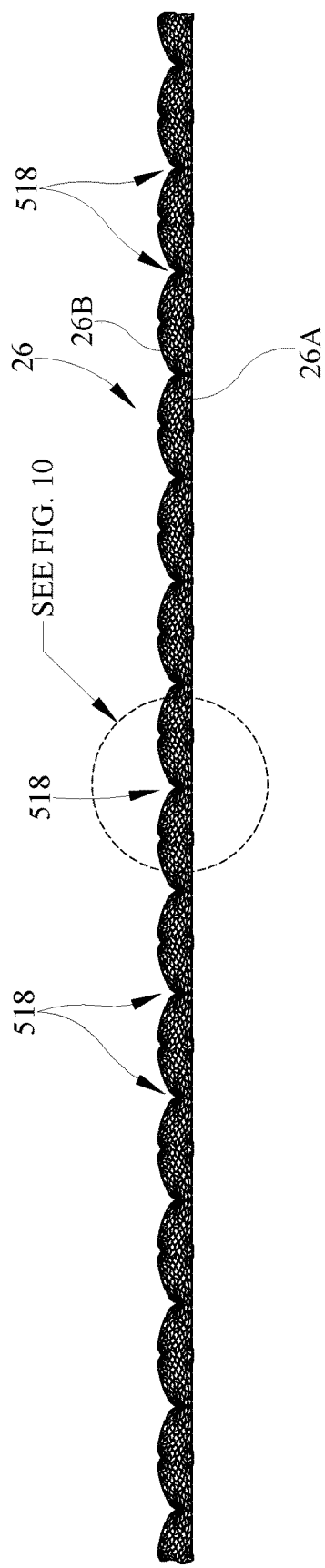
FIG. 14 is a dead section view taken along line 14-14 of FIG. 13 showing a number of channels formed between neighboring pairs of thick sections of a floor-retaining flange included in the side-wall blank.
Figure 15:
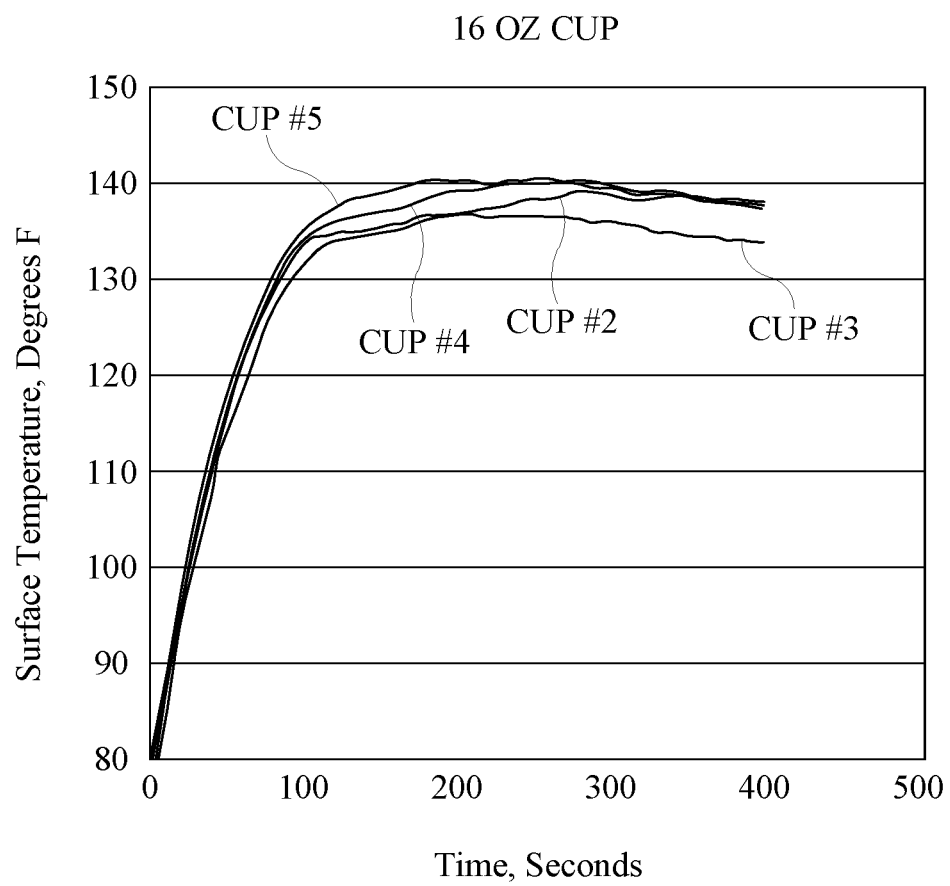
FIG. 15 is a graph showing performance over time of insulative cups in accordance with the present disclosure undergoing temperature testing.

Side wall 18 is formed during cup-manufacturing process 40 using a body blank 500 as suggested in FIGS. 16-20. Body blank 500 may be produced from a strip of insulative cellular non-aromatic polymeric material, a laminated sheet 80 as shown in FIG. 16 and discussed in further detail below, or a strip of insulative cellular non-aromatic polymeric material that has been printed on. Referring now to FIGS. 12 and 13, body blank 500 is generally planar with a first side 502 and a second side 504 (seen in FIG. 12). Body blank 500 is embodied as a circular ring sector with an outer arc length $S_1$ that defines a first edge 506 and an inner arc length $S_2$ that defines a second edge 508. The arc length $S_1$ is defined by a subtended angle $\Theta$ in radians times the radius $R_1$ from an axis 510 to the edge 506. Similarly, inner arc length $S_2$ has a length defined as subtended angle $\Theta$ in radians times the radius $R_2$. The difference of $R_1$-$R_2$ is a length h which is the length of two linear edges 512 and 514. Changes in $R_1$, $R_2$ and $\Theta$ can will result in changes in the size of insulative cup 10. First linear edge 512 and second linear edge 514 each lie on a respective ray emanating from center 510. Thus, body blank 500 has two planar sides, 502 and 504, as well as four edges 506, 508, 512, and 514 which define the boundaries of body blank 500. The edges 512 and 514 may correspond to and have treatments as described below.

Fold line 516 has a radius R3 measured between center 510 and a fold line 516 and fold line 516 has a length $S_3$. As shown in FIG. 12, $R_1$ is relatively greater than $R_3$. $R_3$ is relatively greater than $R_2$. The differences between $R_1$, $R_2$, and $R_3$ may vary depending on the application.

Fold line 516 shown in FIG. 12 is a selected region of a strip of insulative cellular non-aromatic polymeric material that has been plastically deformed in accordance with the present disclosure (by application of pressure—with or without application of heat) to induce a permanent set resulting in a localized area of increased density and reduced thickness. The thickness of the insulative cellular non-aromatic polymeric material at fold line 516 is reduced by about 50% as shown in FIG. 12. In addition, the blank is formed to include a number of depressions 518 or ribs 518 positioned between the arcuate edge 508 and fold line 516 with the depressions 518 creating a discontinuity in a surface 531. Each depression 518 is linear having a longitudinal axis that overlies a ray emanating from center 510. As discussed above, depressions 518 promote orderly forming of floor-retaining flange 26. The insulative cellular non-aromatic polymer material of reduced thickness at fold line 516 ultimately serves as connecting web 25 in the illustrative insulative cup 10. As noted above, connecting web 25 promotes folding of floor-retaining flange 26 inwardly toward interior region 14. Due to the nature of the insulative cellular non-aromatic polymeric material used to produce illustrative body blank 500, the reduction of thickness in the material at fold line 516 and depressions 518 owing to the application of pressure—with or without application of heat—increases the density of the insulative cellular non-aromatic polymeric material at the localized reduction in thickness.

As shown in FIG. 13, each depression 518 is spaced apart from each neighboring depression a first distance 551. In an illustrative example, first distance 551 is about 0.067 inches (1.7018 mm). Each depression 518 is also configured to have a first width 552. In an illustrative example, first width 552 is about 0.028 inches (0.7112 mm). Each depression 518 is also spaced apart from fold line 516 a second distance 553. In an illustrative example, second distance 553 is about 0.035 inches (0.889 mm).

Depressions 518 and fold line 516 are formed by a die that cuts body blank 500 from a strip of insulative cellular non-aromatic polymeric material, laminated sheet 80, or a strip of printed-insulative cellular non-aromatic polymeric material and is formed to include punches or protrusions that reduce the thickness of the body blank 500 in particular locations during the cutting process. The cutting and reduction steps could be performed separately as suggested in FIG. 17, performed simultaneously, or that multiple steps may be used to form the material. For example, in a progressive process, a first punch or protrusion could be used to reduce the thickness a first amount by applying a first pressure load. A second punch or protrusion could then be applied with a second pressure load greater than the first. In the alternative, the first punch or protrusion could be applied at the second pressure load. Any number of punches or protrusions may be applied at varying pressure loads, depending on the application.

As shown in FIGS. 7-11, depressions 518 permit controlled gathering of floor-retaining flange 26 supporting a platform-support member 23 and horizontal platform 21. Floor-retaining flange 26 bends about fold line 516 to form receiving well 27 with fold line 516 forming connecting web 25. The absence of material in depressions 518 provides relief for the insulative cellular non-aromatic polymeric material as it is formed into floor-retaining flange 26. This controlled gathering can be contrasted to the bunching of material that occurs when materials that have no relief are formed into a structure having a narrower dimension. For example, in traditional paper cups, a retaining flange type will have a discontinuous surface due to uncontrolled gathering. Such a surface is usually worked in a secondary operation to provide an acceptable visual surface, or the uncontrolled gathering is left without further processing, with an inferior appearance. The approach of forming the depressions 518 in accordance with the present disclosure is an advantage of the insulative cellular non-aromatic polymeric material of the present disclosure in that the insulative cellular non-aromatic polymeric material is susceptible to plastic deformation in localized zones in response to application of pressure (with or without application of heat) to achieve a superior visual appearance.

Figure 8:
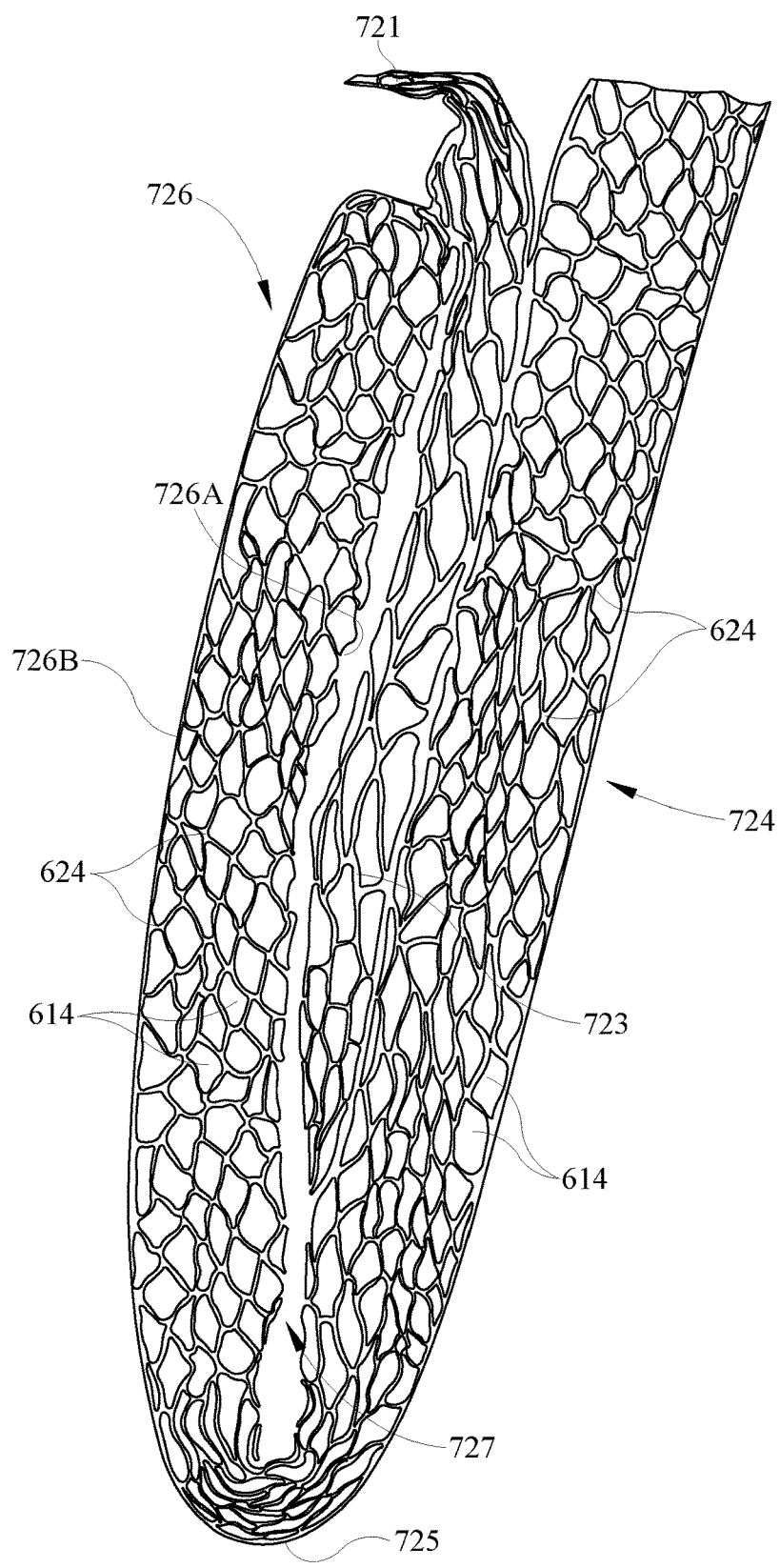
FIG. 8 is an enlarged view similar to FIG. 7A.
Figure 9A:
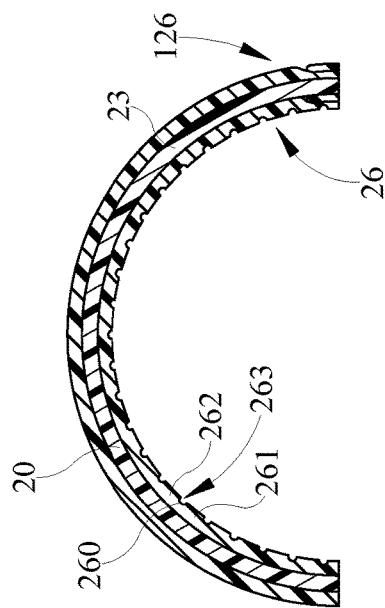
FIG. 9A is a view similar to FIG. 3D showing alternating thick and thin sections of the floor-retaining flange.
Figure 9B:
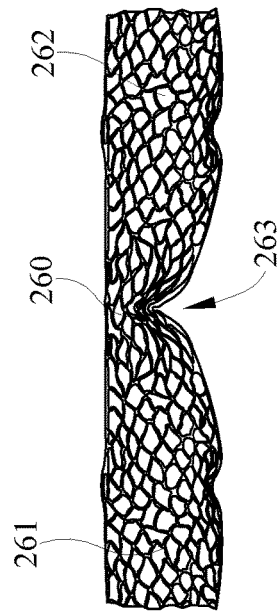
FIG. 9B is a dead section view of a portion of a floor-retaining flange in accordance with the present disclosure showing that a channel is formed between two neighboring thick sections of the floor-retaining flange.
Figure 9:
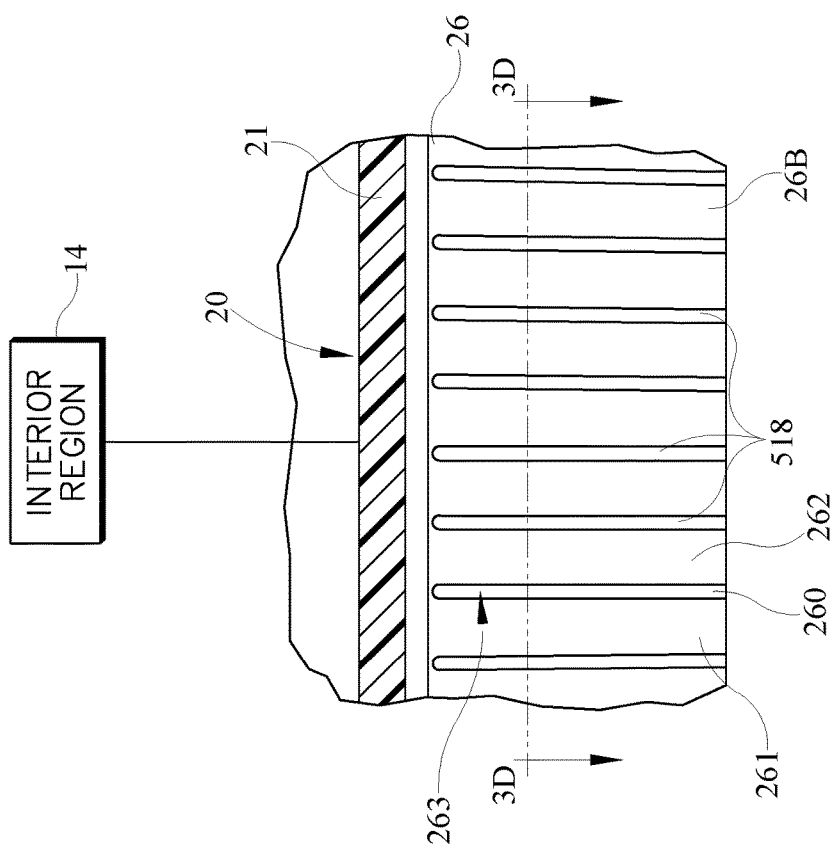
FIG. 9 is an enlarged partial elevation view of the insulative cup of FIGS. 1, 3 and 3D showing the fourth region of localized plastic deformation is formed in the floor-retaining flange and includes channels formed between neighboring thick sections of the floor-retaining flange.

Referring again to the embodiment of FIGS. 35 and 36, cup 710 is similar to insulative cup 10, but cup 710 is formed with depressions 718 formed on a surface 726A which corresponds to the surface 26A of insulative cup 10. Depressions 718 being formed on surface 726A leaves a smooth, un-interrupted surface 726B. Referring now to FIGS. 7A and 8, the interaction of retaining flange 726 and bottom portion 724 with floor ring 723 is shown as photographed to show the thickening and thinning of non-aromatic polymer material 624 and distortion of cells 614 as the cup 710 is assembled.

Figure 17:
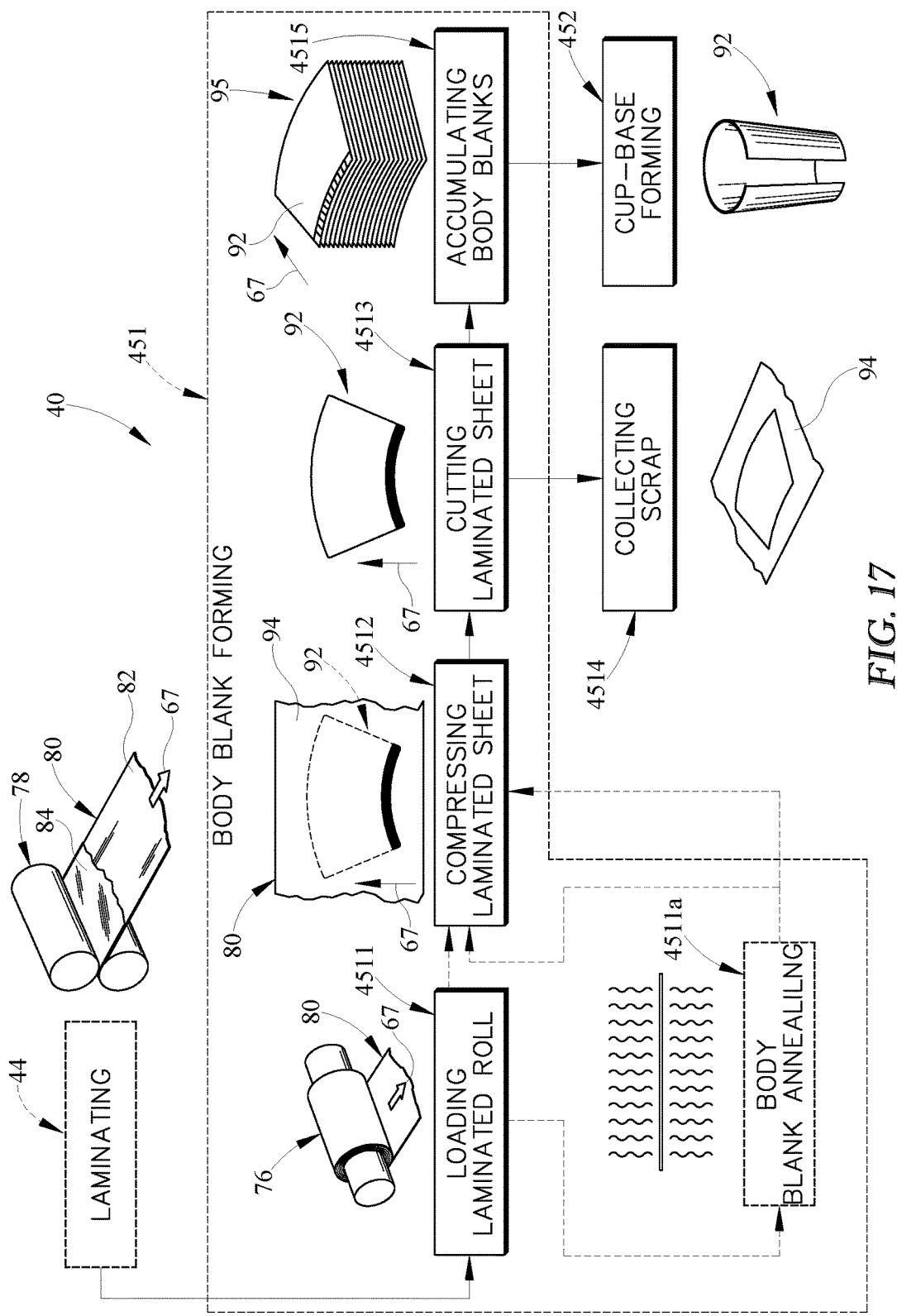
FIG. 17 is a perspective and diagrammatic view of the body blank forming stage showing that the body blank forming stage includes the steps of loading the laminated roll to provide the laminated sheet, annealing the laminated sheet, compressing the laminated sheet to form a compressed sheet, cutting the compressed sheet to form body blanks and scrap, collecting scrap, and accumulating the body blanks to form body blank stacks.
Figure 18:
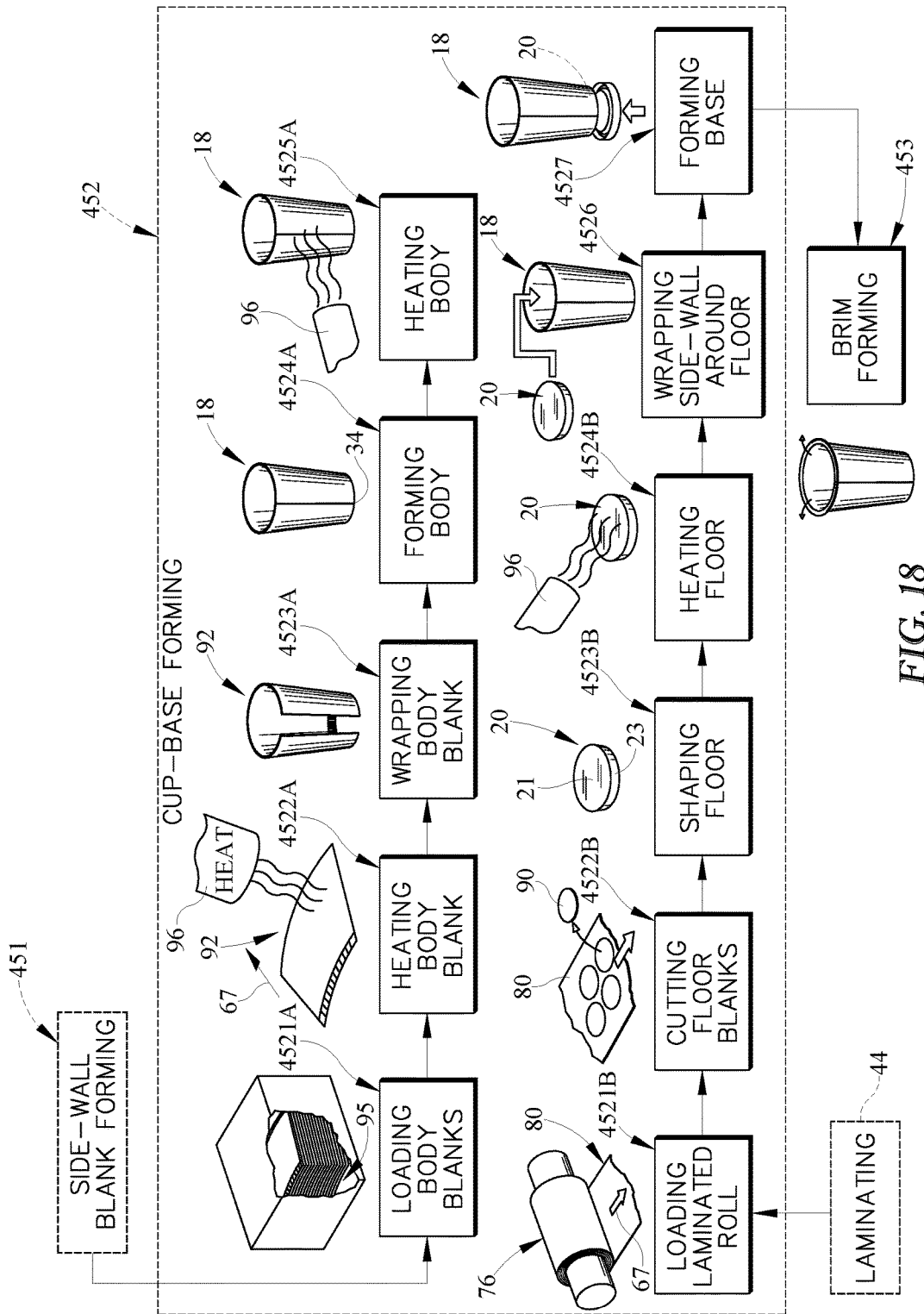
FIG. 18 is a perspective and diagrammatic view of the cup-base forming stage showing that the cup-base forming stage includes the steps of loading body blank stacks, heating the body blank, wrapping the body blank around a mandrel, forming a body, loading another laminated roll to provide the laminated sheet, cutting the laminated sheet to provide floor blanks and scrap, shaping the floor blanks into a floor, heating the floor, heating the body, wrapping the body around the floor, and coupling the floor to the base to establish a cup body.

As one illustrative example of a method of manufacturing, insulative cup 10 is made in accordance with cup-manufacturing process 40 as shown in FIGS. 16-20. As shown in FIGS. 16 and 17, laminated sheet 80 is a composite formed of a strip of insulative cellular non-aromatic polymeric material 82 onto which a skin 84 is laminated from a roll 78 at a laminating stage 44. Roll 86 of laminated sheet 80 is fed to the cup-forming stage 45. Cup-forming stage 45 illustratively includes a body blank forming step 451, an optional body blank annealing step 451a, a cup-base forming step 452, and a brim-forming step 453 as shown in FIG. 16. Body blank forming step 451 uses laminated sheet 80 to make a body blank 92 as shown in FIG. 17. Cup-base forming step 452 uses side wall blanks 92 along with another laminated sheet 80 provided by another laminated roll 86 to form a floor blank 90, form side wall 18, and join side wall 18 to floor 20 to establish base 12 as shown in FIG. 18. Brim-forming step 453 rolls top portion 22 of base 12 to form rolled brim 16 on base 12 as suggested in FIG. 19.

An unexpected property of laminated sheet 80 including a strip of insulative cellular non-aromatic polymeric material 82 is its ability to form noticeably smooth, crease and wrinkle free surfaces when bent to form a round article, such as insulative cup 10. Surface 106 is smooth and wrinkle free as is surface 108. The smoothness of the surfaces 106 and 108 of the present disclosure is such that the depth of creases or wrinkles naturally occurring when subjected to extension and compression forces during cup-manufacturing process 40 is less than 100 micron and even less than 5 micron in most instances. At less than 10 micron, the creases or wrinkles are not visible to the naked eye.

It has been found during development of the present disclosure that if the circumference of insulative cup 10 is aligned with the machine direction 67 of extruded insulative cellular non-aromatic polymeric material 82, deep creases with a depth in excess of 200 micron are typically formed on surface 108. Unexpectedly, it has been determined that if the circumference of insulative cup 10 is aligned generally perpendicular to machine direction 67 as shown in FIG. 16, no deep creases are formed on surface 108, indicating that the cross-direction 66 to machine direction 67 of extruded insulative cellular non-aromatic polymeric material 82 is resistant to compression forces during formation of insulative cup 10. It is believed that this is a result of the orientation of the polymer chains of extruded insulative cellular non-aromatic polymeric material 82 which are oriented and more tightly packed in machine direction 67.

Figure 19:
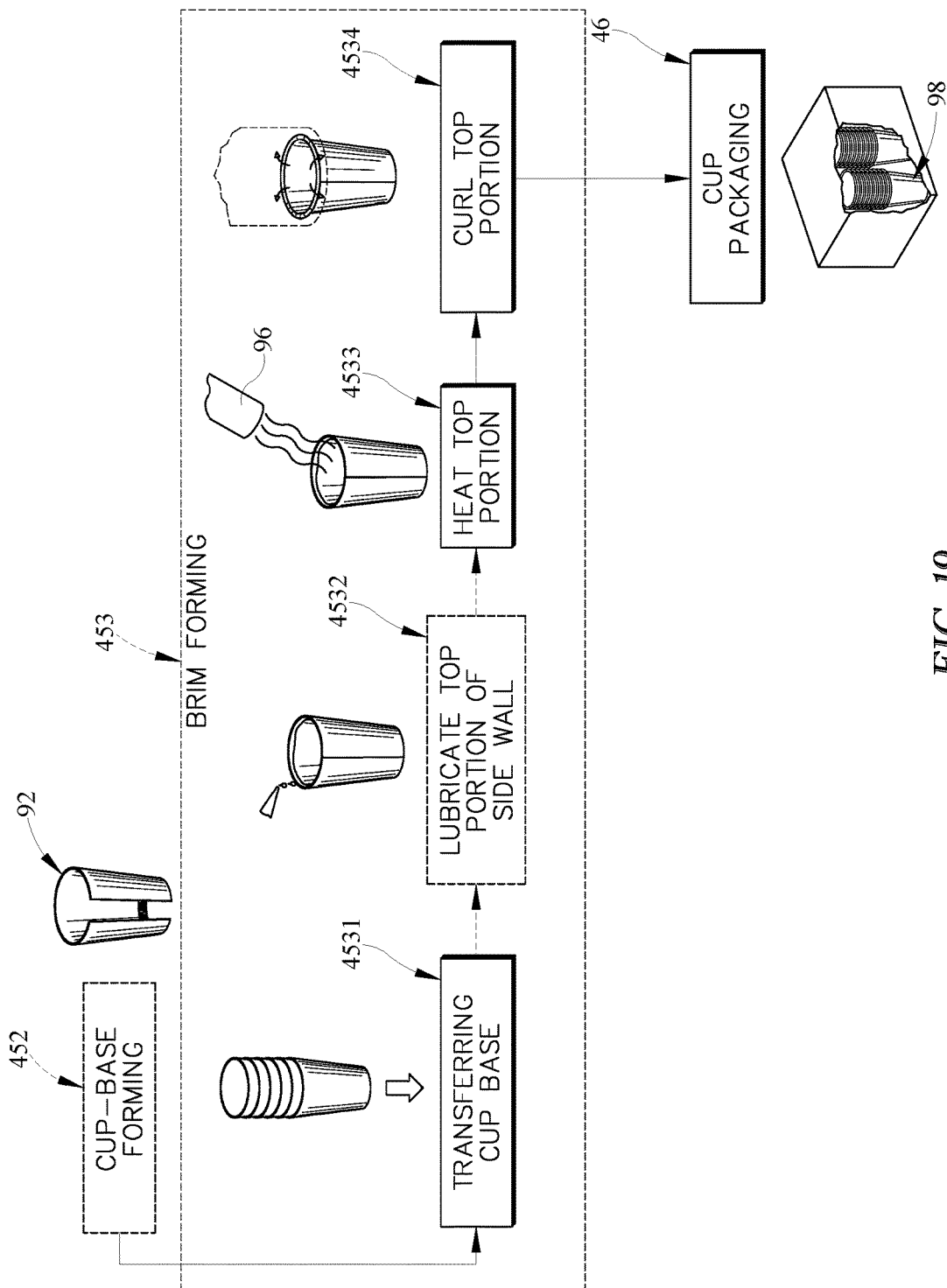
FIG. 19 is a perspective and diagrammatic view of the brim-forming stage showing that the brim-forming stage includes the steps of transferring the cup base to a brim-forming machine, optionally lubricating the top portion of the base, heating the top portion of the base, and rolling the top portion of the base to form an insulative cup having a rolled brim.

Body blank forming step 451 includes a laminated-roll loading step 4511, an optional annealing step 4511a, a compressing step 4512, a cutting step 4513, a collecting scrap step 4514, and an accumulating blanks step 4515 as shown in FIG. 17. Laminated-roll loading step 4511 loads laminated roll 76 onto a cutting machine such as a die cutting machine or metal-on-metal stamping machine. As a result, laminated sheet 80 is drawn into the cutting machine for processing. The optional annealing step 4511a heats laminated sheet 80 as it moves to the cutting machine so that stresses in the non-aromatic polymer structure of laminated sheet 80 are released to reduce creasing and wrinkling in surfaces 106 and 108 of insulative cup 10. Compressing step 4512 compresses portions of laminated sheet 80 to form a compressed sheet. As an example, compressing step 4512 forms fold line 516 and depressions 518 as shown in FIG. 12. Cutting step 4513 cuts compressed sheet to cause body blank 92 to be cut from a blank-carrier sheet 94. Collecting scrap step 4514 collects blank-carrier sheet 94 after cutting step 4513 is complete so that blank-carrier sheet 94 may be recycled. Accumulating blanks step 4515 accumulates each body blank 92 to form a body blank stack 95 for use in cup-base forming step 452 as shown in FIG. 19.

Cup-base forming step 452 includes a body blanks loading step 4521A, a heating body blank step 4522A, a wrapping body blank step 4523A, a forming side wall step 4524A, a laminated-roll loading step 4521B, a cutting floor blanks step 4522B, a shaping floor step 4523B, a heating floor step 4524B, a heating body step 4525A, a wrapping body step 4526, and a floor-seam forming step 4527 as shown in FIG. 18. Body blanks loading step 4521A loads body blank stack 95 into a cup-forming machine for further processing. Heating body blank step 4522A applies heat 96 to body blank 92. Wrapping body blank step 4523A wraps heated body blank 92 around a mandrel included in the cup-forming machine. Forming side wall step 4524A forms side wall 18 by compressing portions of side wall 18 using primary and auxiliary seam clamps included in the cup-forming machine. Primary and auxiliary seam clamps provide localize compression which results a portion of side wall 18 having thickness T2 and another portion having thickness T1 as shown in FIG. 4. An an example, thickness T2 is about about equal to thickness T1.

Laminated-roll loading step 4521B loads another laminated roll 76 onto the cup-forming machine to cause laminated sheet 80 to be drawn into cup-forming machine for processing. Cutting floor blanks step 4522B cuts laminated sheet 80 to cause floor blank 90 to be cut from a blank-carrier sheet 94. Blank-carrier sheet 94 may then be collected and recycled. Shaping floor step 4523B forms floor 20 by inserting floor blank 90 into the mandrel of the cup-forming machine. Heating floor step 4524B applies heat 96 to floor 20 at the same time heating body step 4525A applies heat 96 to side wall 18. Wrapping body 4526 wraps support structure 19 around platform-support member 23 of floor 20. Floor-seam forming step 4527 compresses floor 20 and side wall 18 to establish a floor seam or seal between floor 20 and side wall 18 to establish base 12 which is then ready for brim-forming step 453 as shown in FIG. 19.

The cup-base forming step 452 advantageously maintains the thickness T1 of the side wall 18 as compared to a thermoforming process. Rather than heating an insulative cellular non-aromatic polymeric material and working it over a mandrel in the thermoforming process, subjecting portions of the wall of the resulting cup to thinning and potentially reducing the insulative and structural properties thereof, cup-base forming step 452 is an assembly process that does not require the entire side wall 18 to be subjected to melting temperatures. This provides the advantage of maintaining consistency in thickness T1 of side wall 18 and, thereby, consistent and superior insulating properties as compared to vessels subjected to a deep draw thermoforming process.

Brim-forming step 453 includes a transferring cup-base step 4531, an optional lubricating top-portion step 4532, heating top-portion step 4533, and rolling top-portion step 4534 as shown in FIG. 19. Transferring cup-base step 4531 transfers base 12 from a cup-base forming machine to a brim-forming machine. Lubricating top-portion step 4532 lubricates top portion 22 of base 12. Heating top-portion step 4533 applies heat 96 to top portion 22 of base 12. Curling top-portion step 4534 curls top portion 22 away from interior region 14 to establish rolled brim 16 and form insulative cup 10.

Figure 20:
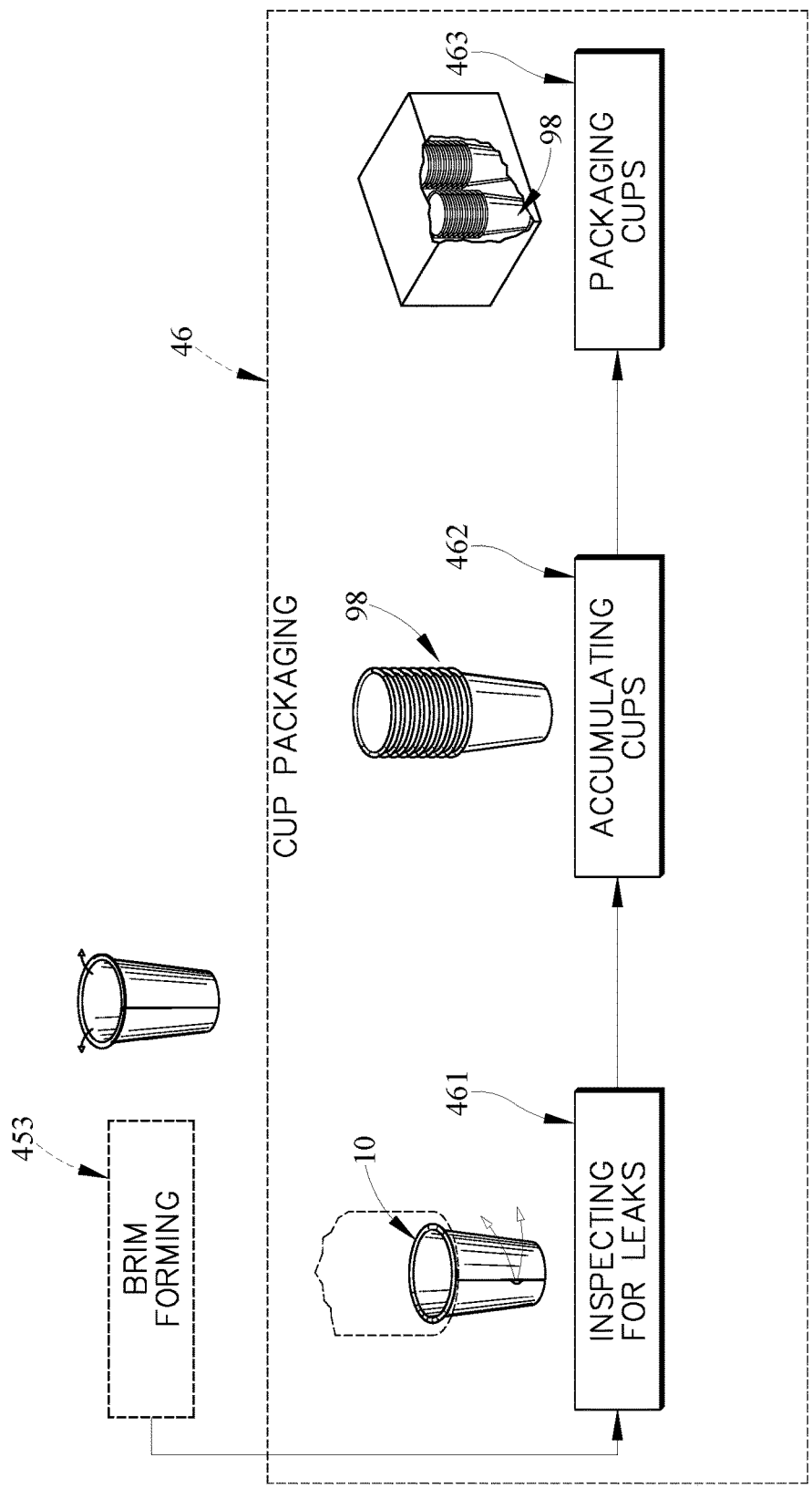
FIG. 20 is a perspective and diagrammatic view of the cup-packaging stage showing that the cup-packaging stage includes the steps of inspecting the insulative cup for leaks, accumulating the good cups to form stacks of insulative cups, and packaging the stacks of insulative cups for storage and transportation.

Cup-packaging stage 46 includes a leak inspecting step 461, an accumulating cups step 462, and a packaging cups step 463 as shown in FIG. 20. Leak inspecting step 461 inspects each insulative cup 10 formed during brim-forming step 453 for leaks. Those cups failing the leak inspection are collected and recycled owing to formation of those cups from insulative cellular non-aromatic polymeric material. Those cups passing the leak inspection are accumulated in accumulating cups step 462 to form a stack 98 of insulative cups. Packaging cups step 463 stores stack 98 of insulative cups for storage, use, or transportation as shown in FIG. 20.

Figure 21:
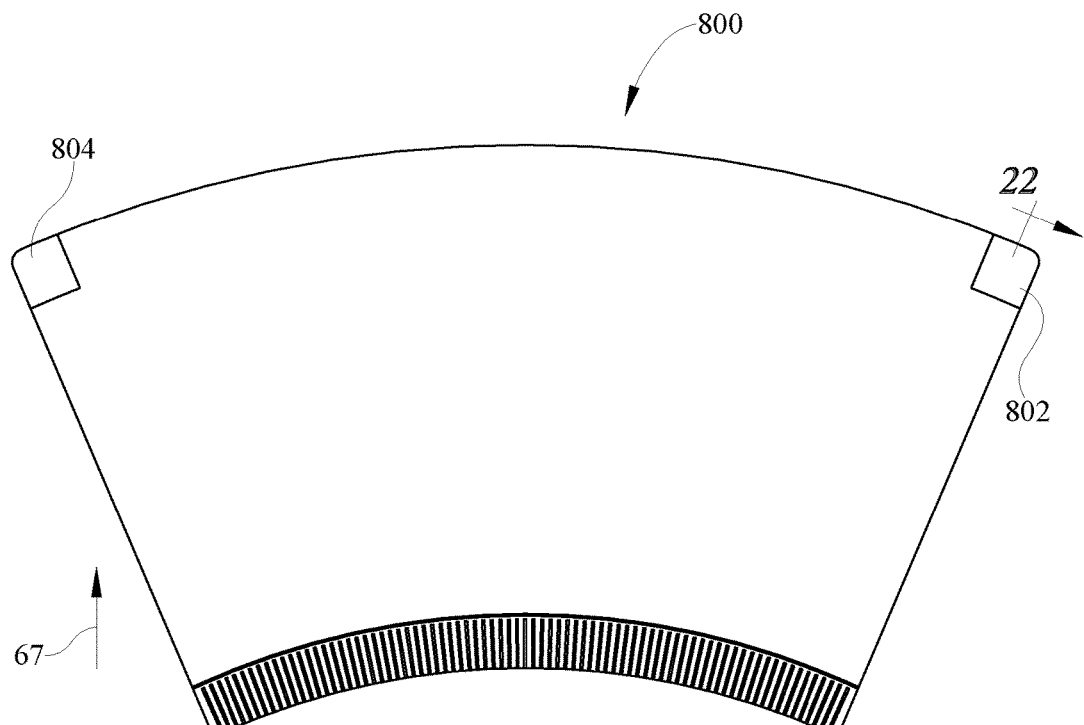
FIG. 21 is a plan view of another embodiment of a body blank in accordance with the present disclosure showing that the body blank includes a first upper arcuate edge, a second lower arcuate edge, an arcuate fold line therebetween, a series of spaced apart channels extending between the arcuate fold line and the second lower arcuate edge, and including brim tabs that are compressed to reduce the thickness of the insulative cellular non-aromatic polymeric material where portions of the body blank overlap to form a rolled brim.
Figure 22:
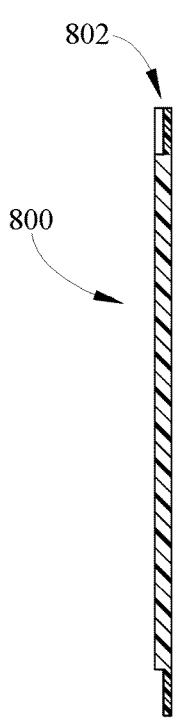
FIG. 22 is a sectional view taken along line 22-22 of FIG. 21.

While the ability of insulative cellular non-aromatic polymeric material of the present disclosure to be subjected to plastic deformation under exposure to pressure loads (with or without application of heat) such that the material takes a permanent set has been discussed above, another embodiment of a body blank 800 is shown in FIGS. 21 and 22. The body blank 800 takes advantage of the properties of the disclosed insulative cellular non-aromatic polymeric material when two reduced areas 802 and 804 are formed in body blank 800 to provide relief for the overlap of material when a brim, such as brim 16 is rolled on a cup. Body blank 800 is similar to body blank 500, with the addition of the reduced areas 802 and 804. As shown in FIG. 21, areas 802 and 804 are reduced in thickness by about 50% so that when a cup is formed from body blank 800, the thickness of the brim where areas 802 and 804 overlap is approximately the same as in areas where there is no overlap.

Figure 23:
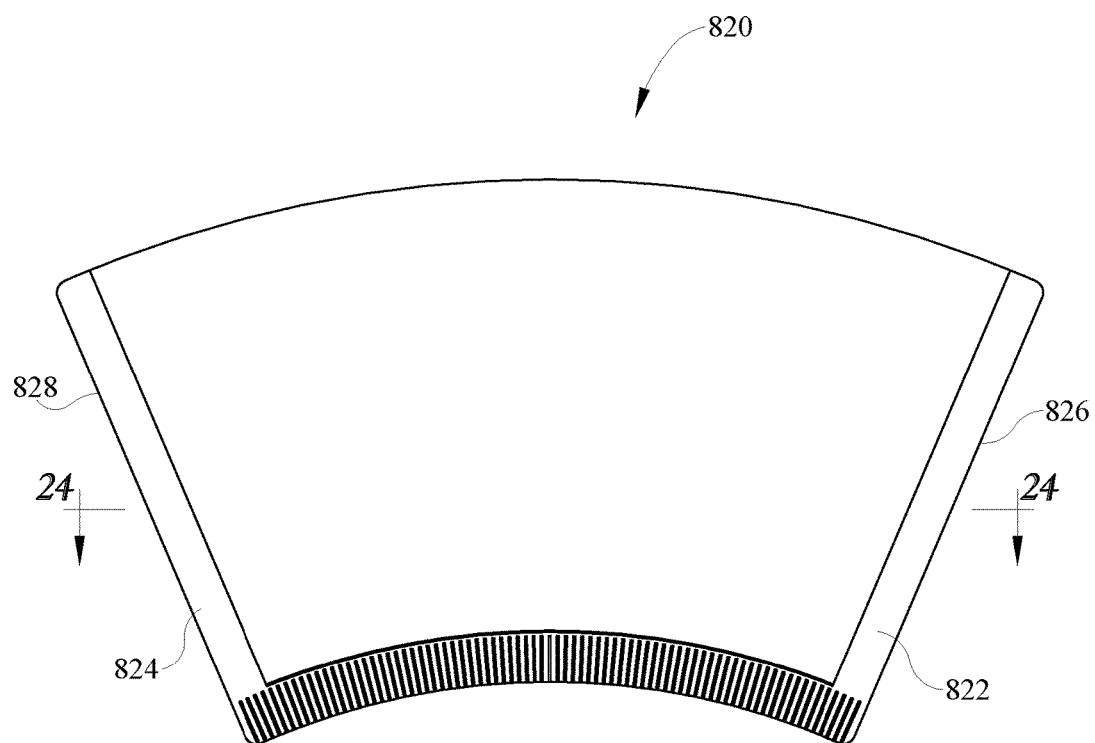
FIG. 23 is a plan view of yet another embodiment of a body blank in accordance with the present disclosure showing that the body blank includes a first upper arcuate edge, a second lower arcuate edge, an arcuate fold line therebetween, a series of spaced apart channels extending between the arcuate fold line and the second lower arcuate edge, and first and second tabs that have been compressed prior to body forming to reduce the thickness of the material where portions of the body blank overlap to form a bridge.
Figure 24:
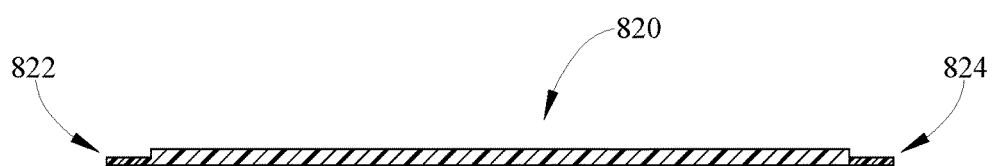
FIG. 24 is a sectional view taken along line 24-24 of FIG. 23.

In another embodiment, a body blank 820 includes reduced areas 822 and 824 along the linear sides 826 and 828 of the body blank 820 as shown in FIGS. 23 and 24. Reduced areas 822 and 824 are reduced in thickness by about 50% so that when reduced areas 822 and 824 are overlapped during cup-manufacturing process 40, the thickness at the overlapping seam is approximately the same as the remainder of the side wall of the cup formed from wall blank 820.

In yet another embodiment, a cup 830 includes a side wall 832 which is formed to include a number of ribs 834 extending from a reduced area 838 of side wall 832 as shown in FIGS. 25-27. A body blank 836 is reduced in areas 838, 840, 842, and 844 so that ribs 834 extend away from the reduced areas 838, 840, 842, and 844. Ribs 834 provide an air gap or spacing between a hand of user holding cup 830 and the remainder of the side wall 832, to reduce the contact area. Ribs 834 may also be contacted by a sleeve (not shown) placed on cup 830 to provide air gaps between the reduced areas 838, 840, 842, and 844 and the sleeve to insulate a user's hand.

In still yet another embodiment, a cup 850 shown in FIG. 28 includes ribs 852 formed in a side wall 854 through displacement of portions of a wall blank 856, shown in FIG. 29, as suggested by FIGS. 30 and 31. In earlier embodiments, insulative cellular non-aromatic polymeric material was plastically deformed to create permanent set to reduce a thickness. In the illustrative cup 850, material is displaced by permitting relief when the strip of insulative cellular non-aromatic polymeric material is acted upon by pressure loads so that the material moves as suggested by FIGS. 30 and 31, the strip of insulative cellular non-aromatic polymeric material deforms to create depressions 864 on one side and protruding ribs 852 on the opposite side. The strip of insulative cellular non-aromatic polymeric material deforms such that some thinning occurs in an area 858, while the thickness of the displaced wall 860 remains approximately equal to the thickness 862 of the side wall 854. Protrusions 852 serve a similar purpose as ribs 834 discussed above with regard to cup 830. The advantage of protrusions 852 is that the thickness of side wall 854 remains generally constant while continuing to provide the insulative properties of a full thickness wall and the advantages of ribs.

The embodiments discussed herein may be formed of raw insulative cellular non-aromatic polymeric material or any variation of composites using the insulative cellular non-aromatic polymer material as disclosed herein. This includes embodiments that laminate one or both sides with a polymeric film.

In another exemplary embodiment of a cup-forming process, the cup-manufacturing process 40 described hereinabove is modified by not laminating the film layer to the substrate. As a result, the film layer is entirely omitted and printing may done directly on the insulative cellular non-aromatic polymeric material layer.

The material of the present disclosure may also be formed into a deformable sheet which can be wrapped around other structures. For example, a sheet of the present material may be formed and wrapped around a pipe, conduit or other structure to provide improved insulation.

A potential feature of an insulative cup formed of insulative cellular non-aromatic polymeric material according to exemplary embodiments of the present disclosure is that the cup has low material loss. Furthermore, the material of the present disclosure may have markedly low off-gassing when subjected to heat from a conventional kitchen-type microwave oven for periods of time up to several minutes.

Another potential feature of an insulative cup formed of insulative cellular non-aromatic polymeric material according to the present disclosure is that the cup can be placed in and go through a conventional residential or commercial dishwasher cleaning cycle (top rack) without noticeable structural or material breakdown or adverse affect on material properties. This is in comparison to beaded expanded polystyrene cups or containers which can break down under similar cleaning processes. Accordingly, a cup made according to one aspect of the present disclosure can be cleaned and reused.

Another potential feature of an insulative cup formed of insulative cellular non-aromatic polymeric material according to various aspects of the present disclosure is that the insulative cup and scrap material can be recycled. Recyclable means that a material can be added (such as regrind) back into an extrusion or other formation process without segregation of components of the material. As an example, an insulative cup formed the insulative cellular non-aromatic polymeric material does not have to be manipulated to remove one or more materials or components prior to re-entering the extrusion process.

In another example, an insulative cup formed from a sheet including a printed film skin laminated to an exterior of an insulative cellular non-aromatic polymeric material may be recyclable if one does not need to separate out the film layer prior to the insulative cup being ground into particles. In contrast, a paper-wrapped expanded polystyrene cup may not be recyclable because the polystyrene material could not practicably be used as material in forming an expanded polystyrene cup, even though the cup material may possibly formed into another product.

As a further example, an insulative cup formed from a non-expanded polystyrene material having a layer of printed film adhered thereto may be considered non-recyclable because it would require the segregation of the film layer, which would not be desirable to introduce as part of the regrind into the extrusion process. Recyclability of articles formed using the insulative cellular non-aromatic polymeric material of the present disclosure minimize the amount of disposable waste created. In comparison, beaded expanded polystyrene cups that break up into beads and thus ordinarily cannot be reused easily in a manufacturing process with the same material from which the article was formed. In addition, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of an insulative cup formed of insulative cellular non-aromatic polymeric material according to one aspect (a non-laminate process) of the present disclosure is that the outside (or inside or both) wall surface of the insulative cellular polypropylene sheet (prior to being formed into an insulative cup, or during cup formation, depending on the manufacturing process employed) can accept printing of high-resolution graphics. In contrast, beaded expanded polystyrene cups have a surface which typically is not smooth enough to accept printing other than low-resolution graphics. Like beaded expanded polystyrene cups, uncoated paper cups also typically do not have a smooth enough surface for such high-resolution graphics. Paper cups have difficulty reaching insulation levels and require a designed air gap incorporated into or associated with the paper cup to achieve insulation. Such designed air gap may provided by a sleeve slid onto and over a portion of the paper cup.

A potential feature of an insulative cup formed of insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to minimize deformation of the cup as the cup is being handled by a user.

A potential feature of an insulative cup formed of insulative cellular non-aromatic polymeric material according to the present disclosure is that insulative cup is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. As a result, an insulative cup in accordance with the present disclosure may minimize the likelihood of puncture and leakage of hot liquid.

Insulative cup 10 of the present disclosure satisfies a long-felt need for a vessel that includes many if not all the features of insulative performance, ready for recyclability, high-quality graphics, chemical resistance, puncture resistance, frangibility resistance, stain resistance, microwavability, and resistance to leaching undesirable substances into products stored in the interior region of the drink cup as discussed above. Others have failed to provide a vessel that achieves combinations of these features as reflected in the appended claims. This failure is a result of the many features being associated with competitive design choices. As an example, others have created vessels that based on design choices are insulated but suffer from poor puncture resistance, lack of microwavability, and leech undesirable substances into products stored in the interior region. In comparison, insulative cup 10 overcomes the failures of others by using an insulative cellular non-aromatic polymeric material.

EXAMPLES

The following examples are set forth for purposes of illustration only. Parts and percentages appearing in such examples are by weight unless otherwise stipulated. All ASTM, ISO, and other standard test method citations referenced and other testing methodologies referred to in this disclosure are incorporated by reference in their entirety.

Example 1—Formulation and Extrusion

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:

79.9% Primary resin: high melt strength polypropylene Borealis WB140 HMS 15%

Secondary resin: F020HC (Braskem)

0.1% Primary nucleating agent: Clamant Hyrocerol CF-40E™ 2% Secondary nucleating agent: Talc 1% Colorant: $TiO_2$ PE (alternatively, PP can be used)

2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added:

1.1 lbs/hr $CO_2$ 0.7 lbs/hr R134a

The carbon dioxide with R134a was injected into the resin blend to expand the resin and reduce density. The mixture thus formed was extruded through a die head into a sheet. The sheet was then cut and formed into a cup.

Example 1—Test Results

The test results of the material formed according to Example 1 showed the material had a density of 0.1902 g/cc and a nominal sheet gauge of 0.089 inches.

Microwavability

Containers produced using this material filled with 12 ounces of room temperature water were heated in a FISO Microwave Station (1200 Watts) microwave oven for 2.5 min without burning or scorching or other visible effect on the cup. In comparison, paper cups heated in the same microwave oven scorched or burned in less than 90 seconds.

Rigidity

Test Method

Samples were at 73° F. and 50% relative humidity. The Cup Stiffness/Rigidity test was conducted with a horizontal force gauge containing a load cell to measure the resisting force of the cup when exposed to the following test conditions: (a) The test location on the cup was ⅓ down from the rim of the cup. (b) Testing travel distance is ¼ inches. (c) Testing travel time was 10 seconds.

Test Results

With an average wall thickness of 0.064 inches, average density of 0.1776 g/cc, and average cup weight of 9.86 g, the rigidity of the material are shown below in Tables 1-2.

TABLE 1

Rigidity Test Results

| Cup # | Rigidities (kg-F) | | |
|---|---|---|---|
| | Seam | 90° from Seam | Average |
| unlidded/unfilled | | | |
| 1 | 0.64 | 0.654 | 0.647 |
| 2 | 0.646 | 0.672 | 0.659 |
| 3 | 0.632 | 0.642 | 0.637 |
| 4 | 0.562 | 0.608 | 0.585 |
| 5 | 0.652 | 0.596 | 0.624 |
| | | | 0.630 |
| | | STD DEV | 0.028 |
| | | 3sigma | 0.085 |
| | | High Range | 0.716 |
| | | Low Range | 0.545 |
| lidded/unfilled | | | |

TABLE 1-continued

Rigidity Test Results

| Cup # | Rigidities (kg-F) | | |
|---|---|---|---|
| | Seam | 90° from Seam | Average |
| 6 | 0.89 | 0.83 | 0.860 |
| 7 | 0.954 | 0.904 | 0.929 |
| 8 | 0.846 | 0.808 | 0.827 |
| 9 | 0.732 | 0.826 | 0.779 |
| 10 | 0.87 | 0.792 | 0.831 |
| | | | 0.845 |
| | | STD DEV | 0.055 |
| | | 3sigma | 0.165 |
| | | High Range | 1.011 |
| | | Low Range | 0.680 |
| unlidded/filled 200° F. | | | |
| 11 | 0.274 | 0.290 | 0.282 |
| 12 | 0.278 | 0.326 | 0.302 |
| 13 | 0.264 | 0.274 | 0.269 |
| 14 | 0.300 | 0.270 | 0.285 |
| 15 | 0.252 | 0.280 | 0.266 |
| | | | 0.281 |
| | | STD DEV | 0.014 |
| | | 3sigma | 0.043 |
| | | High Range | 0.324 |
| | | Low Range | 0.238 |
| lidded/filled 200° F. | | | |
| 16 | 0.346 | 0.354 | 0.350 |
| 17 | 0.386 | 0.422 | 0.404 |
| 18 | 0.358 | 0.364 | 0.361 |
| 19 | 0.338 | 0.374 | 0.356 |
| 20 | 0.304 | 0.272 | 0.288 |
| | | | 0.352 |
| | | STD DEV | 0.042 |
| | | 3sigma | 0.125 |
| | | High Range | 0.476 |
| | | Low Range | 0.227 |
| unlidded/filled ice water | | | |
| 21 | 0.796 | 0.730 | 0.763 |
| 22 | 0.818 | 0.826 | 0.822 |
| 23 | 0.894 | 0.760 | 0.827 |
| 24 | 0.776 | 0.844 | 0.810 |
| 25 | 0.804 | 0.714 | 0.759 |
| | | | 0.796 |
| | | STD DEV | 0.033 |
| | | 3sigma | 0.098 |
| | | High Range | 0.894 |
| | | Low Range | 0.698 |
| lidded/filled ice water | | | |
| 26 | 1.044 | 0.892 | 0.968 |
| 27 | 1.146 | 1.018 | 1.082 |
| 28 | 0.988 | 1.054 | 1.021 |
| 29 | 1.012 | 1.106 | 1.059 |
| 30 | 0.826 | 1.058 | 0.942 |
| | | | 1.014 |
| | | STD DEV | 0.059 |
| | | 3sigma | 0.177 |
| | | High Range | 1.192 |
| | | Low Range | 0.837 |

TABLE 2

Summary of Rigidity Test Results

| | Unfilled Kg-F (kilograms-force) | | Hot Fill 200° F. Kg-F | | Ice Water Fill 35° F. Kg-F | | Wall Thickness | Density |
|---|---|---|---|---|---|---|---|---|
| | Unlidded | Lidded | Unlidded | Lidded | Unlidded | Lidded | Inches | g/cc |
| Test material | 0.630 | 0.845 | 0.281 | 0.352 | 0.796 | 1.014 | 0.064 | 0.1776 |

Insulation
  Test Method
  A typical industrial cup insulation test method as follows was used: s
    Attach the (cup exterior) surface temperature thermocouple to cup with glue.
    Tape attached thermocouple to cup with cellophane tape so that the thermocouple is in the middle of the cup opposite the seam.
    Heat water or other aqueous liquid to near boiling, such as in a microwave.
    Continually stir the hot liquid with a bulb thermometer while observing the liquid temperature.
    Record thermocouple temperature.
    When the liquid gets to 200° F. pour into cup to near full.
    Place lid on cup.
    Record surface temperature for a minimum of 5 minutes.
  A cup formed from the formulation noted above was used having a density of 0.1902 g/cm³ and a wall thickness of 0.089 inches (2.2606 mm). A hot liquid at 200° F. (93.3° C.) was placed in the cup.
  Test Results
  The temperature measured on the outside wall of the cup was about 140.5° F. (60.3° C.), i.e., a 59.5° F. (33° C.) drop. The maximum temperature over a five-minute period was observed to peak at 140.5° F. (60.3° C.).
  The lower the temperature, the better the insulation property of the cup material as the material reduces the heat transferring from the liquid to the cup material exterior.

Frangibility
  Frangibility can be defined as resistance to tear or punctures causing fragmentation.
  Test Method
  The Elmendorf test method described in ASTM D1922-93 was used. The radius of tear was 1.7 inches.
  Test Results
  The test results are shown in Tables 3-4 below. The material as formed in one exemplary embodiment of the present disclosure provides superior resistance to tear forces when compared to EPS.

TABLE 4

Summary of Test Results

| | | Sample ID | |
|---|---|---|---|
| | | Test material cup | Expanded polystyrene |
| Elmendorf Tear machine direction (MD) Arm | g (gram) | 800 | 800 |
| Elmendorf Tear MD | gf (gram force) | 282 | 112 |
| Elmendorf Tear transverse direction (TD) Arm | g | 800 | n/a |
| Elmendorf Tear TD | gf | 212 | n/a |

Note that there was no data obtained for the transverse direction test for EPS because EPS does not have a material orientation, i.e., a machine or transverse direction, as such. The range (calculated as: lower range=mean−(3×std dev); upper range=mean+(3×std dev)) for the tested material of the present disclosure was 213-351 g-f in the machine direction and 143-281 g-f in the transverse direction. In comparison, the range of the expanded polystyrene material tested was 103-121 g-f.

Puncture Resistance
  Test Method
  Determine the force and travel needed to puncture cup sidewall and bottom. An Instron instrument is used in compression mode set to 10 inches per minute travel speed. The cup puncture test fixture on base of Instron is used. This fixture allows the cup to fit over a shape that fits inside the cup with a top surface that is perpendicular to the travel of the Instron tester. The one inch diameter hole of the fixture should be positioned up. The portion of the Instron that moves should be fitted with a 0.300 inch (7.62 mm) diameter punch. The punch with the hole is aligned in the test fixture. The cup is placed over the fixture and the force and travel needed to puncture the cup sidewall is recorded. The sidewall puncture test is repeated in three evenly spaced locations while not puncture testing on the seam of the cup. The bottom of the cup is tested. This should be done in the same manner as the sidewall test except no fixture is used. The cup

TABLE 3

Test Results

| | Machine Direction (gram force) | | | | | | | Transverse Direction (gram force) | | | | | | |
|---|---|---|---|---|---|---|---|---|---|---|---|---|---|---|
| Tag | Test 1 | Test 2 | Test 3 | Test 4 | Test 5 | mean | std dev. | Test 1 | Test 2 | Test 3 | Test 4 | Test 5 | mean | std dev. |
| Test Material | 288 | 262 | 288 | 258 | 315 | 282 | 23 | 232 | 213 | 178 | 205 | 232 | 212 | 23 |
| EPS | 108 | 114 | 112 | 116 | 110 | 112 | 3 | * | | | | | | | is just placed upside down on the base of the Instron while bringing the punch down on the center of the cup bottom.

Test Results

Force curves and pictures of the typical sidewall puncture and the bottom puncture are shown in Table 5 below.

TABLE 5

Puncture Test Results

| Cavity # | Max Load (lbf) | Ext. @ Max Load (in) |
|---|---|---|
| Expanded polystyrene | 3.79 | 0.300 |
| TROPHY ® | 6.61 | 0.155 |
| tested insulative cellular non-aromoatic polymeric material (No Rim) | 22.18 | 0.292 |

Slow Puncture—Straw

Test Method

The material as formed in one exemplary embodiment of the present disclosure provides superior resistance to punctures when compared to EPS using the Slow Puncture Resistance Test Method as described in ASTM D-3763-86. The test results are shown in Tables 6-9 below.

Test Results

TABLE 6

Tested Insulative Cellular Non-Aromatic Polymeric Material

| Specimen # | Peak Load g(f) | Elongation At Break (mm) |
|---|---|---|
| 1 | 13876.49 | — |
| 2 | 13684.33 | — |
| 3 | 15121.53 | — |
| 4 | 15268.95 | 17 |
| 5 | 14970.47 | 20 |
| 6 | 13049.71 | — |
| 7 | 15648.44 | 17 |
| 8 | 15352.38 | 23 |
| 9 | 18271.37 | — |
| 10 | 16859.29 | — |
| Mean | 15210.30 | 19 |
| Std. Dev. | 1532.83 | 3 |

TABLE 7

Expanded Polystyrene

| Specimen # | Peak Load g(f) | Elongation At Break (mm) |
|---|---|---|
| 1 | 2936.73 | — |
| 2 | 2870.07 | 10 |
| 3 | 2572.62 | — |
| 4 | 2632.44 | — |
| 5 | 2809.70 | — |
| 6 | 2842.93 | — |
| 7 | 2654.55 | — |
| 8 | 2872.96 | — |
| 9 | 2487.63 | — |
| 10 | 2866.53 | — |
| 11 | 2803.25 | — |
| 12 | 2775.22 | — |
| 13 | 2834.28 | — |
| 14 | 2569.97 | — |
| Mean | 2752.06 | 10 |
| Std. Dev. | 140.42 | — |

TABLE 8

Paper Wrapped Expanded Polystyrene

| Specimen # | Peak Load g(f) | Elongation At Break (mm) |
|---|---|---|
| 1 | 7930.61 | — |
| 2 | 10044.30 | — |
| 3 | 9849.01 | — |
| 4 | 8711.44 | — |
| 5 | 9596.79 | — |
| 6 | 9302.99 | — |
| 7 | 10252.27 | — |
| 8 | 7785.64 | — |
| 9 | 8437.28 | — |
| 10 | 6751.98 | — |
| 11 | 9993.19 | — |
| Mean | 8968.68 | — |
| Std. Dev. | 1134.68 | — |

TABLE 9

Summary of Slow Puncture-Straw Test Results

| | Sample ID | | |
|---|---|---|---|
| | Tested insulative cellular non-aromatic polymeric material cup (mean) grams-force (gf) | Expanded polystyrene (mean) grams-force (gf) | Paper wrapped expanded polystyrene (mean) grams-force (gf) |
| Average gf: | 15210 | 2752 | 8969 |

Example 2—Formulation and Extrusion

The following formulation was used:
81.70% Borealis WB140HMS primary polypropylene
0.25% Amco A18035 PPRO talc filled concentrate
2% Ampacet 102823 Process Aid PE MB linear low density polyethylene slip agent
0.05% Hydrocerol CF-40E chemical foaming agent
1% Colortech 11933-19 colorant
15% Braskem F020HC high crystallinity homopolymer polypropylene
3.4 lbs/hour of $CO_2$ was introduced into the molten resin. Density of the sheet formed ranged from 0.155-0.182 g/cc The formulation was added to an extruder hopper. The extruder heated the formulation to form a molten resin mixture. To this mixture was added the $CO_2$ to expand the resin and reduce density. The mixture thus formed was extruded through a die head into a strip. The strip was then cut and formed into a cup.

Example 2—Test Results

Rigidity
Test Method
The test method is the same as described for rigidity testing in Example 1.
Test Results
The rigidity test results are shown in Table 10 below.

TABLE 10

| Sample# | unlidded/filled 200° F. Rigidities (kg's) | | | lidded/filled 200° F. Rigidities (kg's) | | | Gram Weights | Wall Thickness |
|---|---|---|---|---|---|---|---|---|
| | Seam | 90° from Seam | Average | Seam | 90° from Seam | Average | | |
| B1 | 0.354 | 0.380 | 0.367 | 0.470 | 0.528 | 0.499 | 12.6 | 0.0744 |
| B2 | 0.426 | 0.464 | 0.445 | 0.598 | 0.610 | 0.604 | 13.0 | |
| B3 | 0.526 | 0.494 | 0.510 | 0.628 | 0.618 | 0.623 | 12.4 | |
| B4 | 0.592 | 0.566 | 0.579 | 0.740 | 0.746 | 0.743 | 13.2 | |
| | | | | | | | 12.80 | |
| | | | 0.475 | | | 0.617 | | |
| | | | | | | | | Density 0.1817 |

Insulation
Test Method—Wall Temperature
A cup formed from the formulation noted above was used having a density of 0.18 g/cm³ and a wall thickness of 0.074 inches (1.8796 mm). A hot liquid at 200° F. (93.3° C.) was placed in the cup.
Test Results
The temperature measured on the outside wall of the cup was about 151° F. (66.1° C.), i.e., a 49.0° F. (27.2° C.) drop. The maximum temperature over a five-minute period was observed to peak at 151° F. (66.1° C.).
Insulation testing in the form of thermal conductivity was done.
Thermal Conductivity
Test Method
This test measures bulk thermal conductivity (W/m-K), measured at ambient temperature and at 93° C. A ThermTest TPS 2500 S Thermal Constants Analyzer instrument was used, employing the test method of ISO/DIS 22007-2.2 and using the Low Density/High Insulating option. The TPS sensor #5501 (6.403 mm radius) with Kapton® insulation was used for all measurements. A 20 second test was done, using 0.02 Watts power. Data using points 100-200 were reported.

Test Results
The test results shown in Table 11 below.

TABLE 11

Mean Thermal Conductivity Results

| Temp. (° C.) | Mean Thermal Conductivity (W/m-K) | Standard Deviation (W/m-K) |
|---|---|---|
| 21 | 0.05792 | 0.00005 |
| 93 | 0.06680 | 0.00025 |

The present disclosure relates to a container. For the purposes of non-limiting illustration only, a cup is described in the exemplary embodiments; however, the container may be embodied in any of a variety of possible vessel shapes or structures or for a variety of applications, such as, but not limited to, a conventional beverage cup, storage container, bottle, or the like. For the purpose of nonlimiting illustration only, a liquid beverage will be used as the material which can be contained by the container; however, a container in accordance with the present disclosure may hold liquids, solids, gels, combinations thereof, foodstuffs, or other material.

A method of forming a vessel in accordance with the present disclosure may include the steps of forming a blank for a side wall of the vessel, heating first and second portions of the blank, wrapping the blank such that the first and second portions overlap, and compressing the overlapped portions while they are heated to secure the first and second portions to form a side wall. The blank may include an insulative cellular non-aromatic polymeric material having a non-uniform density with areas of higher density formed in the blank to define depressions in the blank.

In some embodiments, the method of forming a vessel may include the steps of forming a floor blank for a floor of the vessel and placing the floor blank adjacent a first end of the elongated wall, securing the floor blank to the side wall, heating the floor blank prior to securing the floor blank to the side wall, and heating a portion of the side wall which contacts the floor blank prior to securing the floor blank to the side wall. In some embodiments, the method of forming a vessel may include the step of applying pressure to the floor blank and the portion of the side wall to secure the portion of the elongated wall with the floor blank.

In some embodiments, the method of forming a vessel may include the step of displacing a portion of the side wall that engages the floor blank to wrap the portion of the side wall around a portion of the floor blank. In some embodiments, the method of forming a vessel may include the step of compressing a portion of the side wall to increase the localized density of the compressed portion to define a fold line about which the displaced portion of the side wall is displaced.

In some embodiments, the method of forming a vessel may include the steps of heating the entire blank for a side wall to anneal the blank and allowing the blank to cool before heating first and second portions of the blank. In some embodiments, the method of forming a vessel may include the steps of forming a composite including an insulative cellular non-aromatic polymeric material, and at least one polymeric film adhered to the insulative cellular non-aromatic polymeric material, and forming the blank for the elongated wall of the vessel from the composite.

In some embodiments, the at least one polymeric film may include biaxially oriented polypropylene. In some embodiments, the method of forming a vessel may include the step of heating composite prior to forming the blank for a side wall to release stresses in the biaxially oriented polypropylene film. In some embodiments, the method of forming a vessel may include the step of applying adhesive to the floor blank prior to securing the blank to the side wall.

In some embodiments, the method of forming a vessel may include the steps of applying adhesive to a portion of the elongated wall which contacts the floor blank prior to securing the floor blank to the elongated wall, applying pressure to the floor blank and the portion of the side wall to secure the portion of the elongated wall with the floor blank, displacing a portion of the elongated wall that engages the floor blank to wrap the portion of the elongated wall around a portion of the floor blank, and compressing a portion of the elongated wall to increase the localized density of the compressed portion to define a fold line about which the displaced portion of the elongated wall is displaced.

The invention claimed is:

1. An insulative container comprising
a body including a side wall and
a floor coupled to the body to define an interior region bounded by the side wall and the floor,
wherein the body comprises a sheet comprising insulative cellular non-aromatic polymeric material that has localized plastic deformation in at least one selected region of the body to provide a plastically deformed first material segment having a first density located in a first portion of the selected region of the body and a second material segment having a second density lower than the first density located in an adjacent second portion of the selected region of the body,
wherein the body includes a floor mount coupled to a lower end of the side wall and to the floor to support the floor in a stationary position relative to the side wall to form the interior region and the floor mount includes an alternating series of upright thick and thin staves arranged in side-to-side relation, a first of the upright thin staves is configured to provide the first material segment in a first of the selected regions of the body, and a first of the upright thick staves is configured to provide the second material segment in the first of the selected regions of the body.

2. The insulative container of claim 1, wherein a second of the selected regions of the body in which localized plastic deformation is enabled by the insulative cellular non-aromatic polymeric material is in a rolled brim included in the body and coupled to an upper end of the side wall to lie in spaced-apart relation to the floor and to frame an opening into the interior region and wherein the rolled brim includes an inner rolled tab configured to provide the first material segment in the second of the selected regions of the body and coupled to an upper end of an upright outer tab included in the side wall, an outer rolled tab coupled to an upper end of an upright inner tab included in the side wall and to an outwardly facing exterior surface of the inner rolled tab, and a rolled lip arranged to interconnect oppositely facing side edges of each of the inner and outer rolled tabs and configured to provide the second material segment having the second density in the second of the selected regions of the body and cooperate with the inner and outer rolled tabs to form the rolled brim.

3. The insulative container of claim 2, wherein the inner rolled tab and the outer rolled tab cooperate to provide a first brim thickness, the rolled lip has a second brim thickness, and the first brim thickness is about equal to the second brim thickness to cause a smooth transition to be formed at a transition point where the inner rolled tab and the outer rolled tab overlap one another and couple to the rolled lip.

4. The insulative container of claim 3, wherein the first density is greater than about 0.3 g/cm$^3$ and the second density is from about 0.15 g/cm$^3$ to about 0.2 g/cm$^3$.

5. The insulative container of claim 3, wherein the plastically deformed first material segment is cellular and the second material segment is cellular.

6. The insulative container of claim 5, wherein the first material segment has a predetermined insulative characteristic.

7. The insulative container of claim 6, wherein the first density is from about 0.3 g/cm$^3$ to about 0.4 g/cm$^3$ and the second density is from about 0.15 g/cm$^3$ to about 0.2 g/cm$^3$.

8. The insulative container of claim 3, wherein the floor mount includes a support ring coupled to the lower end of the side wall and a floor-retaining flange coupled to the floor and arranged to be surrounded by the support ring and the floor-retaining flange includes the alternating series of upright thick and thin staves.

9. The insulative container of claim 8, wherein the floor mount further includes a web arranged to interconnect the floor-retaining flange and the web-support ring.

10. The insulative container of claim 8, wherein the first of the upright thick staves is configured to include a right side edge extending upwardly toward the interior region, a second of the upright thick staves is configured to include a left side edge arranged to extend upwardly toward the interior region and lie in spaced-apart confronting relation to the right side edge of the first of the upright thick staves, and a first of the upright thin staves is arranged to interconnect the right side edge of the first of the upright thick staves and the left side edge of the second of the upright thick staves and to cooperate with the left and right side edges to define therebetween a vertical channel.

11. The insulative container of claim 10, wherein the first density is from about 0.3 g/cm$^3$ to about 0.4 g/cm$^3$ and the second density is from about 0.15 g/cm$^3$ to about 0.2 g/cm$^3$.

12. The insulative container of claim 1, wherein a second of the selected regions of the body in which localized plastic deformation is enabled by the insulative cellular non-aromatic polymeric material is in a floor mount included in the body and coupled to a lower end of the side wall to lie in spaced-apart relation to the rolled brim and to the floor to support the floor in a stationary position relative to the side wall to form the interior region and wherein the floor mount includes a web-support ring coupled to the lower end of the side wall and configured to provide the second material segment having the second density in the second of the selected regions of the body, a floor-retaining flange coupled to the floor and arranged to be surrounded by the web-support ring, and a web arranged to interconnect the floor-retaining flange and the web-support ring and configured to provide the first material segment having the first density in the second of the selected regions of the body.

13. The insulative container of claim 12, wherein the first density is greater than about 0.3 g/cm³ and the second density is from about 0.15 g/cm³ to about 0.2 g/cm³.

14. The insulative container of claim 1, wherein a second of the selected regions of the body in which localized plastic deformation is enabled by the insulative cellular non-aromatic polymeric material is in the side wall and wherein the side wall includes an upright inner tab arranged to extend upwardly from the floor and configured to provide the first material segment having the first density in the first of the selected regions of the body, an upright outer tab arranged to extend upwardly from the floor and to mate with the upright inner tab along an interface therebetween, and an upright fence arranged to interconnect the upright inner and outer tabs and surround the interior region and configured to provide the second material segment having the second density in the second of the selected regions of the body and cooperate with the upright inner and outer tabs to form the side wall.

15. The insulative container of claim 1, wherein the first density is from about 0.3 g/cm³ to about 0.4 g/cm³.

16. The insulative container of claim 15, wherein the second density is from about 0.15 g/cm³ to about 0.2 g/cm³.

17. An insulative container comprising
a body including a side wall and
a floor coupled to the body to define an interior region bounded by the side wall and the floor,
wherein the body comprises a sheet comprising insulative cellular non-aromatic polymeric material that has localized plastic deformation in at least one selected region of the body to provide a plastically deformed first material segment having a first density located in a first portion of the selected region of the body and a second material segment having a second density lower than the first density located in an adjacent second portion of the selected region of the body,
wherein the sheet further comprises a skin coupled to the insulative cellular non-aromatic polymeric material,
wherein the body includes a floor mount coupled to a lower end of the side wall and to the floor to support the floor in a stationary position relative to the side wall to form the interior region and the floor mount includes a support ring coupled to the lower end of the side wall and a floor-retaining flange coupled to the floor and arranged to be surrounded by the support ring, a first of the selected regions of the body in which localized plastic deformation is enabled by the insulative cellular non-aromatic polymeric material is in the floor mount, and the skin is coupled to the support ring and the floor-retaining flange included in the floor mount,
wherein the sheet further includes an ink layer coupled to the skin,
wherein the ink layer is located between the skin and the insulative cellular non-aromatic polymeric material.

* * * * *